United States Patent
Park et al.

(10) Patent No.: US 12,211,402 B2
(45) Date of Patent: Jan. 28, 2025

(54) DISPLAY DEVICE HAVING SAGGING PREVENTION STRUCTURE

(71) Applicant: LG ELECTRONICS INC., Seoul (KR)

(72) Inventors: Heegun Park, Seoul (KR); Kyungmin Jeong, Seoul (KR); Taesung Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 17/758,054

(22) PCT Filed: Dec. 27, 2019

(86) PCT No.: PCT/KR2019/018570
§ 371 (c)(1),
(2) Date: Jun. 27, 2022

(87) PCT Pub. No.: WO2021/132770
PCT Pub. Date: Jul. 1, 2021

(65) Prior Publication Data
US 2023/0041205 A1      Feb. 9, 2023

(51) Int. Cl.
*G06F 1/16*     (2006.01)
*G09F 9/30*     (2006.01)

(52) U.S. Cl.
CPC .................... *G09F 9/301* (2013.01)

(58) Field of Classification Search
None
See application file for complete search history.

(56) References Cited

U.S. PATENT DOCUMENTS

| 9,924,603 B2* | 3/2018 | Cope .................. G09F 9/33 |
| 10,410,549 B1* | 9/2019 | Kim .................. G09F 9/301 |
| 10,564,676 B2* | 2/2020 | Kwon .................. H04N 5/64 |
| 11,229,128 B2* | 1/2022 | Kim .................. G02F 1/133305 |
| 2016/0029474 A1 | 1/2016 | Cho et al. |
| 2017/0044826 A1* | 2/2017 | Nakae .................. E06B 9/581 |
| 2017/0325343 A1* | 11/2017 | Seo .................. H05K 5/03 |
| 2018/0070467 A1* | 3/2018 | Kim .................. H10K 50/84 |

FOREIGN PATENT DOCUMENTS

| KR | 1020090060748 | 6/2009 |
| KR | 101121947 | 3/2012 |
| KR | 1020190054430 | 5/2019 |
| KR | 1020190092980 | 8/2019 |

OTHER PUBLICATIONS

PCT International Application No. PCT/KR2019/018570, International Search Report dated Sep. 17, 2020, 2 pages.

* cited by examiner

*Primary Examiner* — Anthony Q Edwards
*Assistant Examiner* — Rashen E Morrison
(74) *Attorney, Agent, or Firm* — LEE, HONG, DEGERMAN, KANG & WAIMEY

(57) ABSTRACT

A display device is disclosed. The display device of the present disclosure comprises: a housing extended to be long; a roller provided inside the housing; and a display panel which is wound around or unwound from the roller, wherein the housing includes first and second base frames assembled together with a lower frame, the lower frame is assembled together with or fixed to the first base frame and/or the second base frame by at least one fixed pin so as to prevent sagging caused by a weight increase.

16 Claims, 62 Drawing Sheets

DISPLAY DEVICE HAVING SAGGING PREVENTION STRUCTURE

CROSS-REFERENCE TO RELATED APPLICATION(S)

This application is the National Stage filing under 35 U.S.C. 371 of International Application No. PCT/KR2019/018570, filed on Dec. 27, 2019, the contents of which are all incorporated by reference herein in its entirety.

TECHNICAL FIELD

The present invention relates to relates to a display device having a sag prevention structure.

BACKGROUND ART

As the information society is developed, demands for display devices are increased in various forms. Accordingly, various display devices, such as a liquid crystal display device (LCD), a plasma display panel (PDP), an electro luminescent display (ELD), and a vacuum fluorescent display (VFD), are recently researched and used.

Among them, a display device using an organic light emitting diode (OLED) has advantages in that it can implement in a very thin form because a brightness characteristic and a view angle characteristic are excellent and a backlight unit is not required compared to the LCD.

Furthermore, a flexible display panel may be bent or wound on a roller. A display device unwound from the roller or wound on the roller by using the flexible display panel may be implemented. A lost of research of a structure for winding the roller on the flexible display panel or unwinding the roller therefrom is carried out.

Furthermore, as the size of the display device becomes larger, the flexible display panel may also be increased in size. Sag occurs because weight of the flexible display panel and the display device is also increased because the size of the flexible display panel and the display device is increased. Accordingly, there is a need for a structure capable of preventing the sag.

DISCLOSURE

Technical Problem

The present invention provides a sag problem according to increased weight and other problems.

The present invention may provide a display device having improved assembly convenience.

The present invention may provide a display device which improves a leakage phenomenon which may occur upon joint coupling.

The present invention may provide a joint structure which improves fatigue fracture.

Technical Solution

According to an aspect of the present disclosure for achieving the objects, there is provided a display device, including an elongated housing, a roller disposed within the housing, and a display panel wound on or unwound from the roller, wherein the housing includes a first base frame and a second base frame assembled with a lower frame, and the lower frame is assembled and fixed to at least one base frame of the first and second base frames by at least one fixing pin.

According to another aspect of the present disclosure, there is provided a display device in which the lower frame of the housing is assembled and fixed perpendicularly to at least one base frame of the first and second base frames by the fixing pin fastened to assembly fixing parts of the at least one base frame.

According to another aspect of the present disclosure, there is provided a display device in which the first base frame is disposed in a direction perpendicular to a width direction of front and rear surfaces of the lower frame and is assembled and fixed to the lower frame in a length direction of the lower frame.

According to another aspect of the present disclosure, there is provided a display device in which the lower frame includes at least one protrusion fixing part that protrudes in a direction in which the first and second base frames are disposed so that the at least one protrusion fixing part is assembled and fixed to at least one base frame of the first and second base frames and a first fixing recess part formed in the at least one protrusion fixing part so that the end of one side of each fixing pin is inserted into the at least one protrusion fixing part and the first fixing recess part is fixed by the each fixing pin.

According to another aspect of the present disclosure, there is provided a display device in which at least one base frame of the first and second base frames includes at least one fixing hole into which the end of the other side of each fixing pin is inserted so that the end of the other side of each fixing pin is fixed to the each assembly fixing part.

According to another aspect of the present disclosure, there is provided a display device in which at least one base frame of the first and second base frames includes at least one fixing hole into which the end of the other side of each fixing pin is inserted so that the end of the other side of each fixing pin is fixed to the each assembly fixing part.

According to another aspect of the present disclosure, there is provided a display device in which a diameter of the at least one fixing hole formed in the at least one base frame is smaller than a diameter of the first fixing recess part formed in the lower frame and an inside diameter of the end of the other side of each fixing pin inserted and fixed to the fixing hole is smaller than an inside diameter of the end of one side thereof inserted into the first fixing recess part.

According to another aspect of the present disclosure, there is provided a display device in which at least one base frame of the first and second base frames includes at least one protrusion assembly part that protrudes in an inside direction thereof from an outermost part coming into contact with the lower frame and the lower frame further includes a second fixing recess part formed in the at least one protrusion fixing part so that the at least one protrusion assembly part protruding from the at least one base frame is inserted and fastened to the second fixing recess part.

According to another aspect of the present disclosure, there is provided a display device in which at least one assembly fixing part that enables the at least one base frame and the lower frame 37 to be fastened by the each fixing pin is formed at least one location of a center location of the at least one base frame, outside locations at both ends of the at least one base frame in a length direction thereof, and ⅓ locations between the center location and the outside locations at both ends of the at least one base frame.

Advantageous Effects

Effects of the display device according to the present disclosure are described as follows.

According to at least one of embodiments of the present disclosure, there can be provided the display device capable of preventing sag although the size and weight of a display device are increased.

According to at least one of embodiments of the present disclosure, there can be provided the display device having improved assembly convenience.

According to at least one of embodiments of the present disclosure, there can be provided the display device which improves a leakage phenomenon which may occur upon joint coupling.

According to at least one of embodiments of the present disclosure, there can be provided the display device which improves fatigue fracture.

An additional scope of the applicability of the present disclosure will become evident from the following detailed description. However, various changes and modifications within the spirit and scope of the present disclosure may be evidently understood by those skilled in the art. Accordingly, it is to be understood that the detailed description and a specific embodiment, such as a preferred embodiment of the present disclosure, are merely given as examples.

MODE FOR INVENTION

Figure 1:
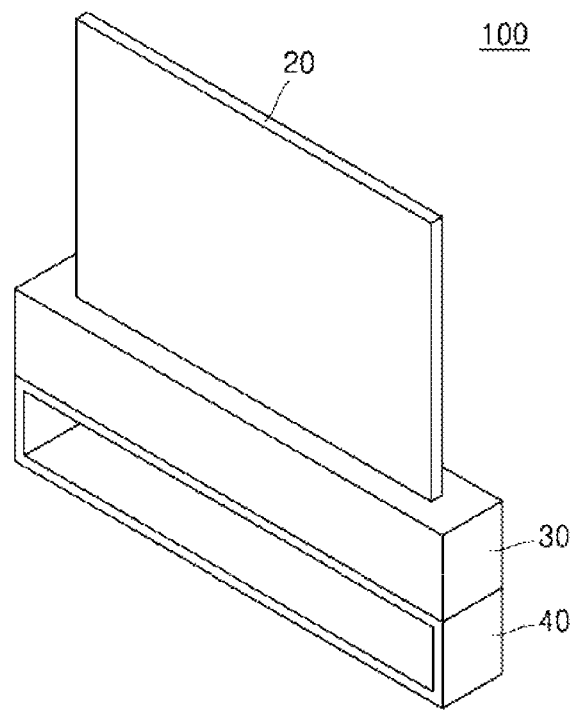
FIGS. 1 to 70 are diagrams illustrating examples of a display device according to embodiments of the present disclosure.
Figure 1:
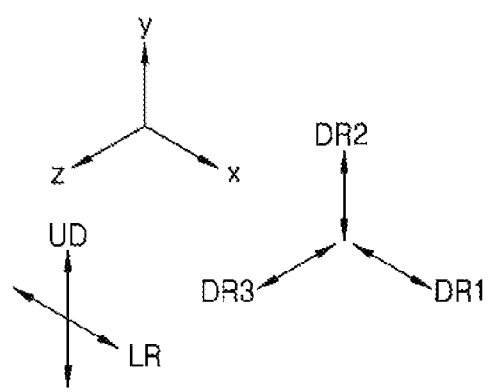

Hereinafter, embodiments disclosed in the present disclosure are described in detail with reference to the accompanying drawings. The same or similar element is assigned the same reference numeral regardless of its reference numeral, and a redundant description thereof is omitted.

The suffixes "module" and "unit" of elements used in the following description are assigned or interchangeable with each other by taking into consideration only the ease of writing this specification, but in themselves are not particularly given distinct meanings and roles.

Furthermore, in describing the embodiments of the present disclosure, a detailed description of a related known technology will be omitted if it is deemed to make the subject matter of the present disclosure unnecessarily vague. Furthermore, the accompanying drawings are merely intended to make easily understood the exemplary embodiments disclosed in the present disclosure, and the technical spirit disclosed in the present disclosure is not restricted by the accompanying drawings and includes all modifications, equivalents, and substitutions which fall within the spirit and technical scope of the present disclosure.

Terms, such as a "first" and a "second", may be used to describe various elements, but the elements are not limited by the terms. The terms are used to only distinguish one element from the other element.

When it is said that one component is "connected" or "coupled" to another component, it should be understood that one component may be directly connected or coupled" to another component, but a third component may exist between the two components. In contrast, when it is described that one component is "directly connected (or coupled)" or "brought into direct contact with" the other component, it should be understood that a third component does not exist between the two components.

An expression of the singular number may include an expression of the plural number unless clearly defined otherwise in the context.

In the following description, although an embodiment is described with reference to a specific figure, a reference numeral not illustrated in the specific figure may be mentioned, if necessary. The reference numeral not illustrated in the specific figure is used when the reference numeral is illustrated in the other figures.

Referring to FIG. 1, a display device 100 may include a display unit 20 and a housing 30. The housing 30 may be equipped with an internal space. At least a part of the display unit 20 may be disposed inside the housing 30. At least a part of the display unit 20 may be disposed outside the housing 30. The display unit 20 may display a screen.

The housing 30 including the display unit 20 may be disposed on a support frame set 40. The housing 30 may be mounted on the support frame set 40 or may be coupled or assembled with the support frame set 40.

A direction parallel to the length direction of the housing 30 and the support frame set 40 may be called a first direction DR1, a +x axis direction, a −x axis direction, a left direction, or a right direction. A direction in which the display unit 20 displays a screen may be called a +z axis, a front direction, or the front.

A direction parallel to the height direction of the display device 100 may be called a second direction DR2, a +y axis direction, a −y axis direction, an upper direction, or a lower direction.

A direction opposite to the direction in which the display unit 20 displays a screen may be called a −z axis, a rear direction, or the back. A third direction DR3 may be parallel to the +z axis direction or the −z axis direction.

The third direction DR3 may be a direction perpendicular to the first direction DR1 and/or the second direction DR2. The first direction DR1 and the second direction DR2 may be collectively called a horizontal direction. Furthermore, the third direction DR3 may be called a vertical direction. A left and right direction LR may be parallel to the first direction DR1, and an upper and down direction UD may be parallel to the second direction DR2.

Figure 2:
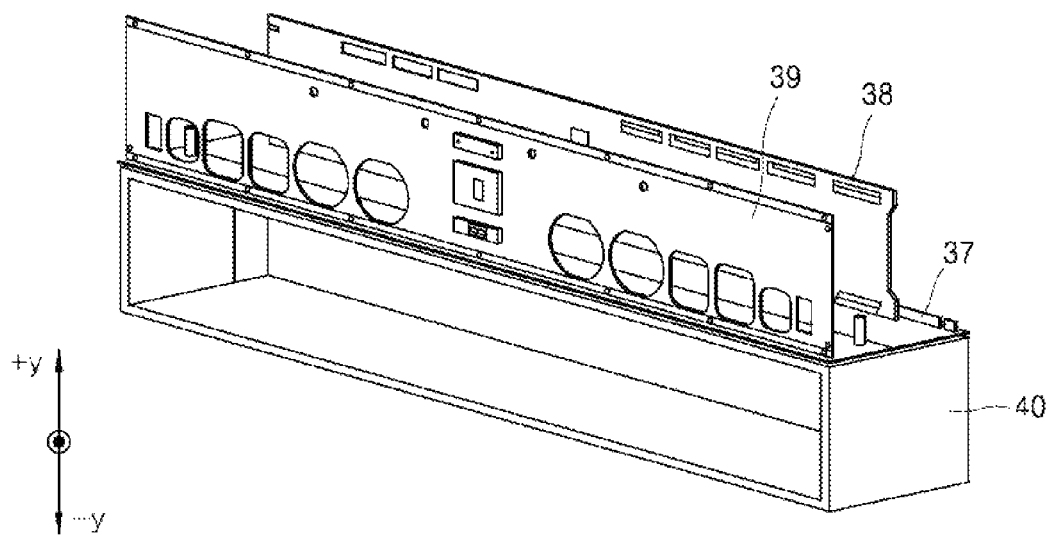

Referring to FIGS. 1 and 2, if the size of the display unit 20 and the housing 30 is increased, weight of the display unit 20 and the housing 30 themselves may be increased. If the weight of the display unit 20 and the housing 30 themselves is increased, the load of the display unit 20 and the housing 30 is applied in the lower direction, that is, in the −y axis direction.

In particular, if a low side surface (a side surface in the +x axis and −x axis direction) of the housing 30 is supported by the support frame set 40, the load of the display unit 20 and the housing 30 is inevitably further increased to a central part (a central part in the +x axis and −x axis direction) of the housing 30. Accordingly, the central part of the housing 30 sags in the lower direction, that is, in the −y axis direction. A central part of the upper plate of the support frame set 40 also inevitably sags in the lower direction, that is, in the −y axis direction.

Figure 3:
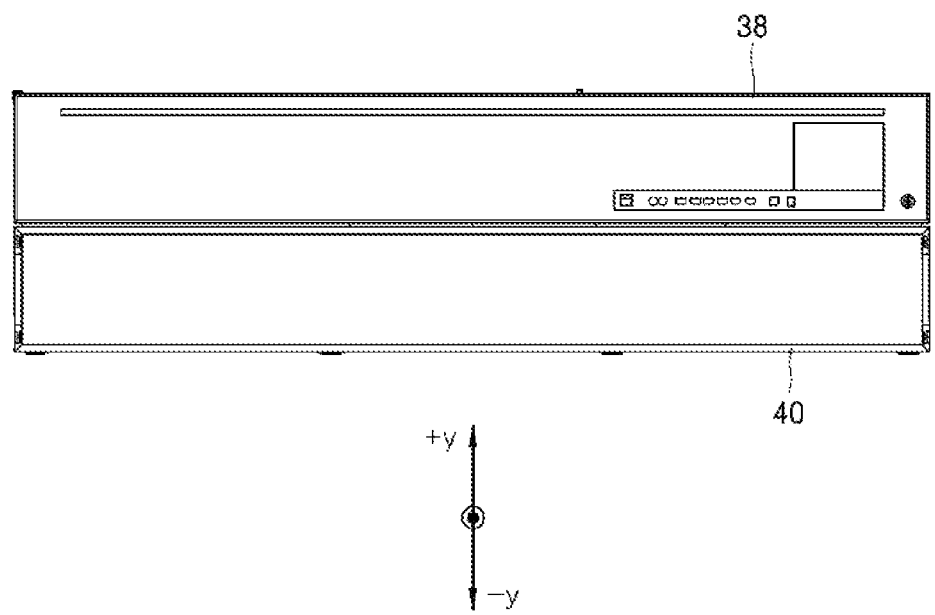

Referring to FIGS. 2 and 3, the housing 30 includes a first base frame 37 and a second base frame 39 assembled with a lower frame 37 of the housing 30. Accordingly, the lower frame 37 of the housing 30 is fixed to at least one base frame of the first base frame 37 and the second base frame 39, so that the sag of the lower frame 37 is prevented by at least one base frame of the first base frame 37 and the second base frame 39.

Figure 4:
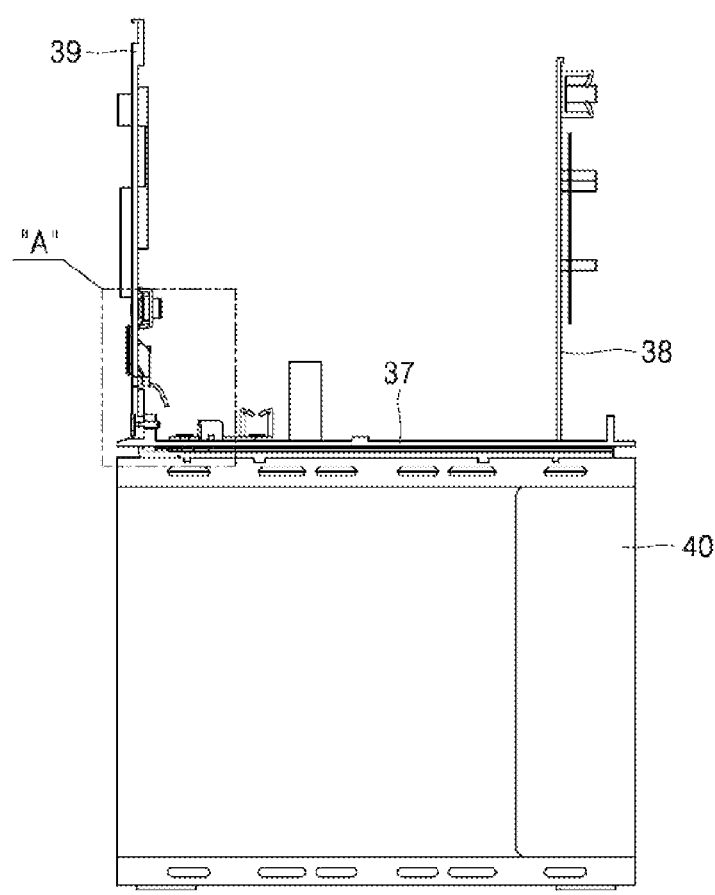

Referring to FIGS. 2 and 4, the first base frame 38 is disposed in a direction (the +y axis and −y axis direction) perpendicular to the width direction (the +z axis and −z axis direction) of front and rear surfaces of the lower frame 37, and is assembled and fixed to the lower frame 37 in the length direction (the +x axis and −x axis direction) of the lower frame 37.

The second base frame 39 is disposed in a direction (the +y axis and −y axis direction) perpendicular to the width direction (the +z axis and −z axis direction) of the front and rear surfaces of the lower frame 37, and is assembled and fixed to the lower frame 37 in the length direction (the +x axis and −x axis direction) of the lower frame 37, so that the second base frame 39 may be disposed in parallel to the first base frame 38 in a way to face the first base frame 38.

In FIG. 4, A indicates a location where the lower frame 37 and the second base frame 39 of the housing 30 are assembled and fixed.

An assembly and fixing structure of the lower frame 37 and second base frame 39 of the housing 30 is specifically described with reference to FIG. 5. The lower frame 37 of the housing 30 may be assembled and fixed to the second base frame 39 in a perpendicular direction thereof by a fixing pin 36 fastened to at least one assembly fixing part 39c of the second base frame 39.

The first base frame 38 may also be assembled and fixed to the lower frame 37 of the housing 30 as the same structure as the second base frame 39. Hereinafter, the assembly and fixing structure of the lower frame 37 and the second base frame 39 is described as an example, for convenience of description.

Figure 5:
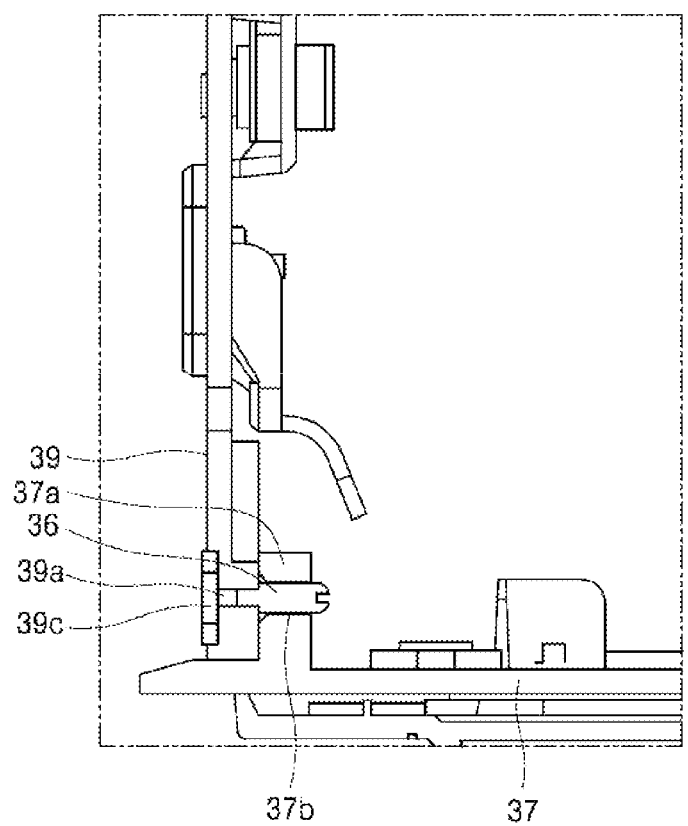
Figure 6:
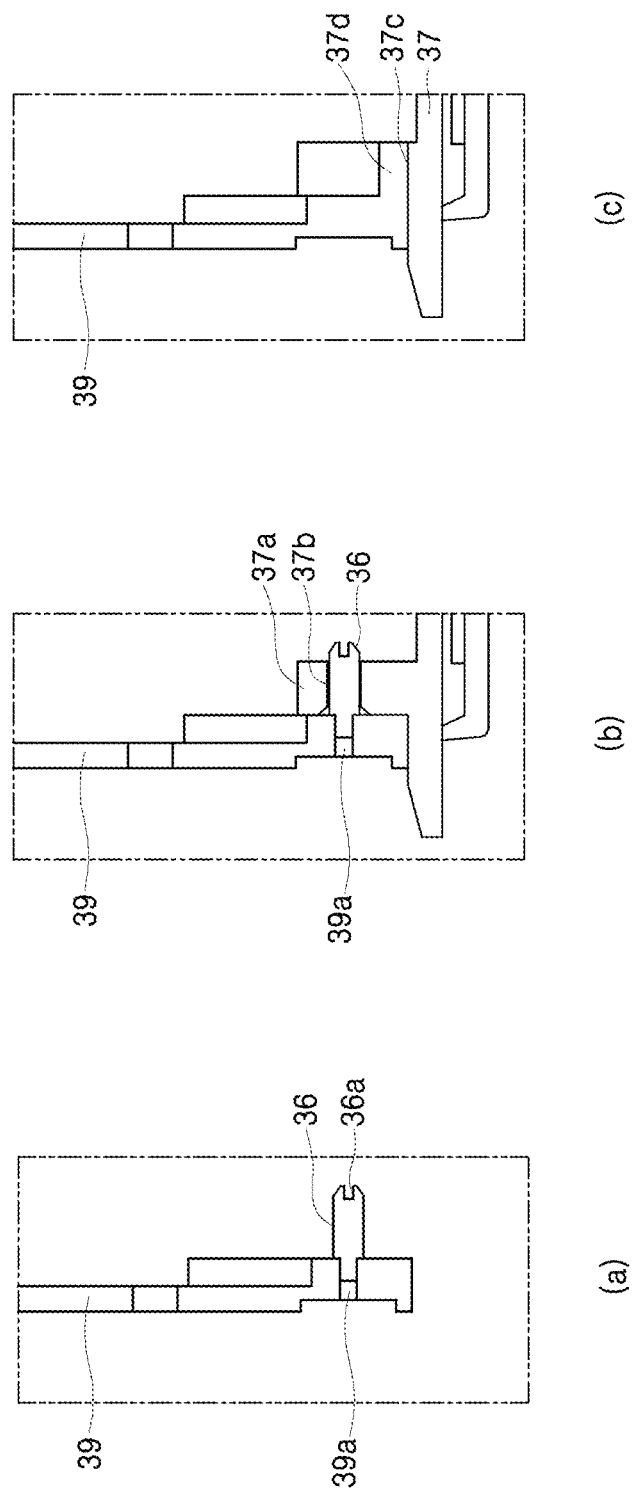

Referring to FIGS. 5 and 6, the lower frame 37 includes at least one protrusion fixing part 37a that protrudes in a direction (e.g., the +y axis direction) in which the first and second base frames 38 and 39 are disposed so that the lower frame 37 can be assembled and fixed to at least one base frame of the first and second base frames 38 and 39.

Furthermore, the lower frame 37 includes a first fixing recess part 37b formed in the protrusion fixing part 37a so that the end of one side of each fixing pin 36 can be at least inserted into the first fixing recess part 37b and the first fixing recess part 37b is fixed by the each fixing pin 36. Specifically, the first fixing recess part 37b is formed so that in the −z axis direction, the fixing pin 36 is inserted into each protrusion fixing part 37a that protrudes in the +y axis direction.

At least one base frame of the first and second base frames 38 and 39 includes at least one fixing hole 39c formed so that the end of the other side of each fixing pin 36 is inserted into the at least one fixing hole 39a in the +z axis direction and the end of the other side of each fixing pin 36 is fixed to each assembly fixing part 39c.

The end of the other side of each fixing pin 36 is fastened to the fixing hole 39a formed in the at least one base frame 38 and 39 in the +z axis direction, and the end of one side of each fixing pin 36 is inserted into the fixing recess part 37b of the lower frame 37 in the −z axis direction, so that at least one base frame and the lower frame 37 can be fixed.

Accordingly, since the protrusion fixing part 37a and first fixing recess part 37b of the lower frame 37 are fastened by the at least one fixing pin 36 fastened to at least one base frame of the first and second base frames 38 and 39, the lower frame 37 can be fixed to at least one base frame without sagging in the lower direction (the −y axis direction).

Referring to FIGS. 6(a) and 6(b), the diameter of the at least one fixing hole 39a formed in at least one base frame of the first and second base frames 38 and 39 is smaller than the diameter of the first fixing recess part 37b formed in the lower frame 37. Furthermore, the inside diameter of the end of the other side of each fixing pin 36 inserted and fixed to the fixing hole 39a is smaller than the inside diameter of the end of one side of each fixing pin 36 inserted into the first fixing recess part 37b.

Accordingly, after the end of the other side of each fixing pin 36 having a smaller inside diameter is inserted and fixed to the fixing hole 39a having a smaller diameter, the end of one side of each fixing pin 36 having a greater inside diameter may be inserted and fixed to the fixing recess part 37b of the lower frame 37. In this case, since each fixing pin 36 does not penetrate the fixing hole 39c, each fixing pin 36 is prevented from being pushed or protruding in the outside direction (the +z axis direction) of the first or second base frame 38 or 39.

Referring to FIG. 6(c), at least one base frame of the first and second base frames 38 and 39 further includes at least one protrusion assembly part 39d that protrudes from the outermost part of the base frame coming into contact with the lower frame 37 to the inside direction (the −z axis direction) thereof.

The at least one protrusion assembly part 39d may protrude in an inside direction (the −z axis direction) perpendicular to the first and second base frames 38 and 39 along a surface where the at least one protrusion assembly part 39d comes into contact with the lower frame 37.

The lower frame 37 may further include a second fixing recess part 37c formed in the at least one protrusion fixing part 37a so that the at least one protrusion assembly part 39d protruding from at least one base frame of the first and second base frames 38 and 39 can be inserted and fastened to the second fixing recess part 37c.

Accordingly, the at least one protrusion assembly part 39d formed in at least one base frame of the first and second base frames 38 and 39 is inserted and fastened to the second fixing recess part 37c formed in the protrusion fixing part 37a of the lower frame 37 in the inside direction (the −z axis direction), so that the lower frame 37 can be fixed thereto without sagging in the lower direction (the −y axis direction).

Figure 7:
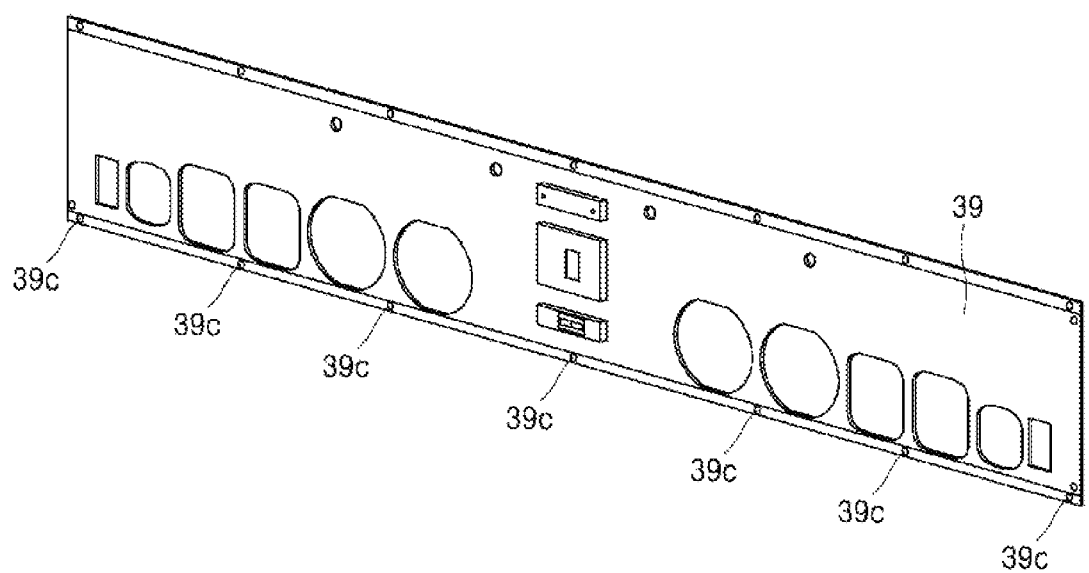

Referring to FIG. 7, the at least one assembly fixing part 39c that fastens at least one base frame and the lower frame 37 by each fixing pin 36 may be formed at a center location of the at least one base frame, outside locations at both ends thereof in the length direction (the +x axis and −x axis direction) of the base frame, and at least one of ⅓ locations between the center location of the base frame and outside locations of both ends thereof.

Furthermore, each assembly fixing part 39c may also be formed at ⅕ and ⅘ between the center location of the at least one base frame and at both ends of the outside locations thereof.

In order to prevent the lower frame 37 from sagging in the lower direction (the −y axis direction), it is most efficient that the at least one assembly fixing part 39c is formed at the center location of the base frame 38 and 39. Thereafter, if the at least one assembly fixing part 39c is formed at ⅓ locations between the center location of the base frame and the outside locations at both ends thereof, the stiffness of the lower frame 37 can be further increased. However, the more the assembly fixing parts 39c are formed, the more complicated a process of assembling the at least one base frame 38 and 39 and the lower frame 37.

Meanwhile, it is most efficient that fastening locations where the at least one protrusion assembly part 39d configured in the at least one base frame 38 and 39 and the protrusion fixing part 37a of the lower frame 37 are fastened are also formed at the center location of the base frame. Thereafter, if the at least one protrusion assembly part 39d and the protrusion fixing part 37a are formed at the ⅕, ⅗, ⅘ locations between the center location of the base frame and the outside locations at both ends thereof, the stiffness of the lower frame 37 can be further increased. Likewise, the more the fastening parts of the protrusion assembly part 39d and the protrusion fixing part 37a are formed, the more complicated a process of assembling the at least one base frame 38 and 39 and the lower frame 37.

Figure 8:
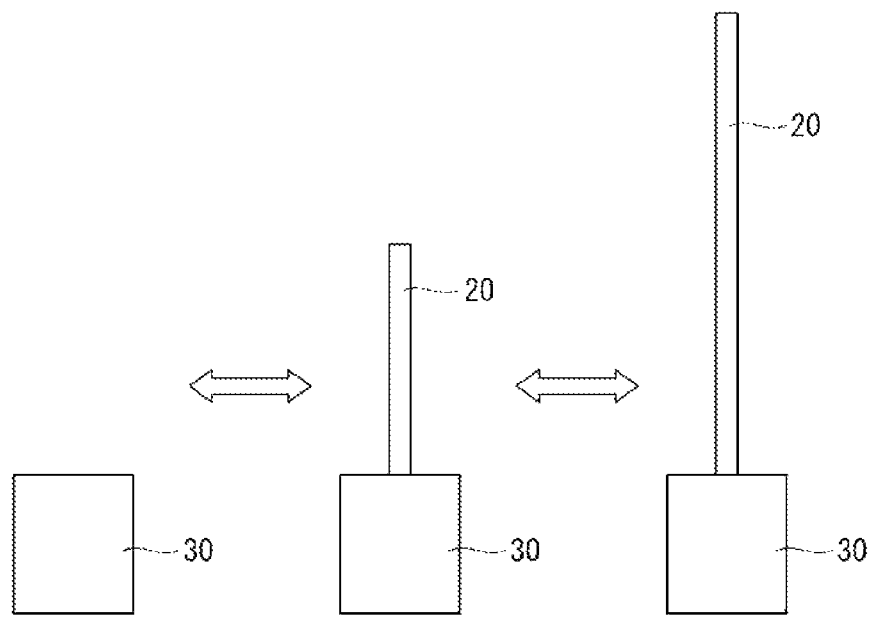

Referring to FIG. 8, the entire display unit 20 may be disposed within the housing 30. At least a part of the display unit 20 may be disposed outside the housing 30. A degree that the display unit 20 is exposed to the outside of the housing 30 may be adjusted, if necessary.

Figure 9:
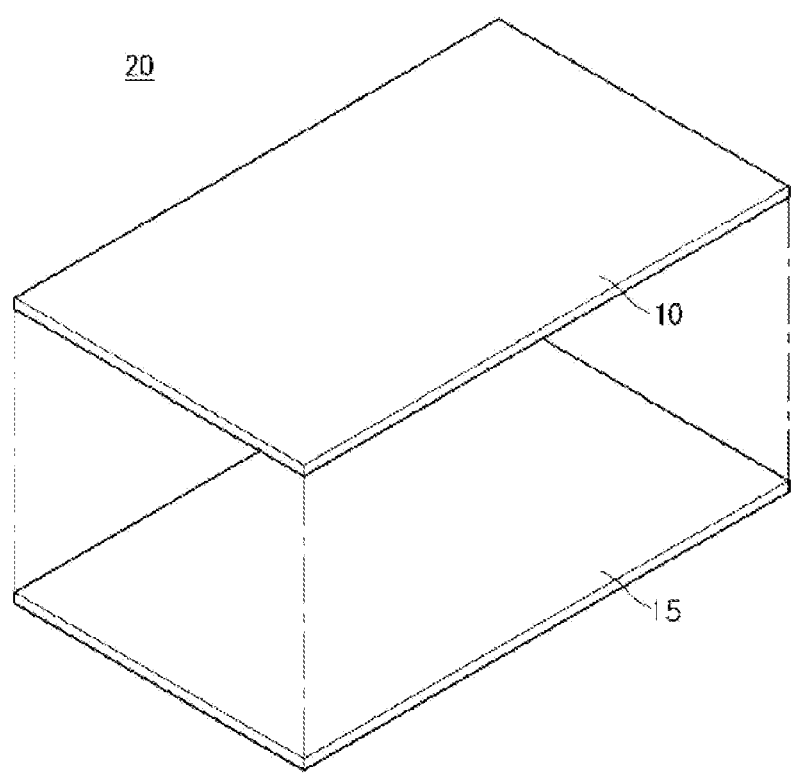

Referring to FIG. 9, the display unit 20 may include a display panel 10 and a plate 15. The display panel 10 may be flexible. For example, the display panel 10 may be an organic light emitting display (OLED).

The display panel 10 may have a front surface on which an image is displayed. The display panel 10 may have a rear surface opposite to the front surface. The front surface of the display panel 10 may be covered with a light-transparent material. For example, the light-transparent material may be synthetic resin or a film.

The plate 15 may be coupled, fastened or attached to the rear surface of the display panel 10. The plate 15 may include a metal material. The plate 15 may also be denoted as a module cover 15, a cover 15, a display panel cover 15, a panel cover 15, or an apron 15.

Figure 10:
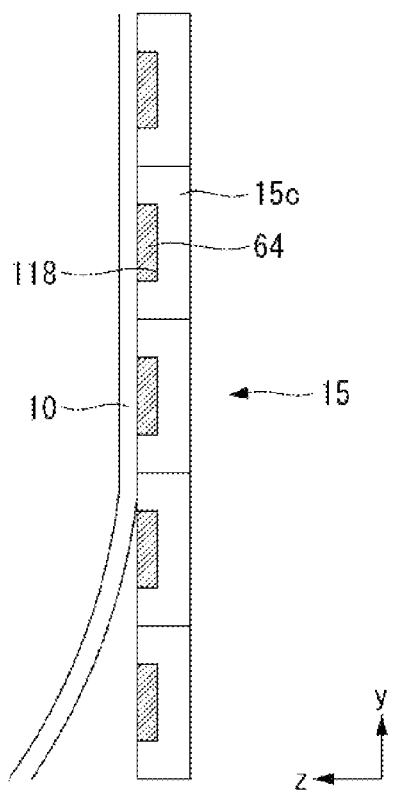

Referring to FIG. 10, the plate 15 may include a plurality of segments 15c. A magnet 64 may be disposed within a recess 118 of the segment 15c. The recess 118 may be disposed in a surface that faces the display panel 10 of the segment 15c. The recess 118 may be disposed in the front surface of each segment 15c. Since the magnet 64 is accommodated in the recess 118, the magnet 64 may not protrude to the outside of the segment 15c. The display panel 10 may be flat without being crumpled although the display panel 10 comes into contact with the segments 15c.

Figure 11:
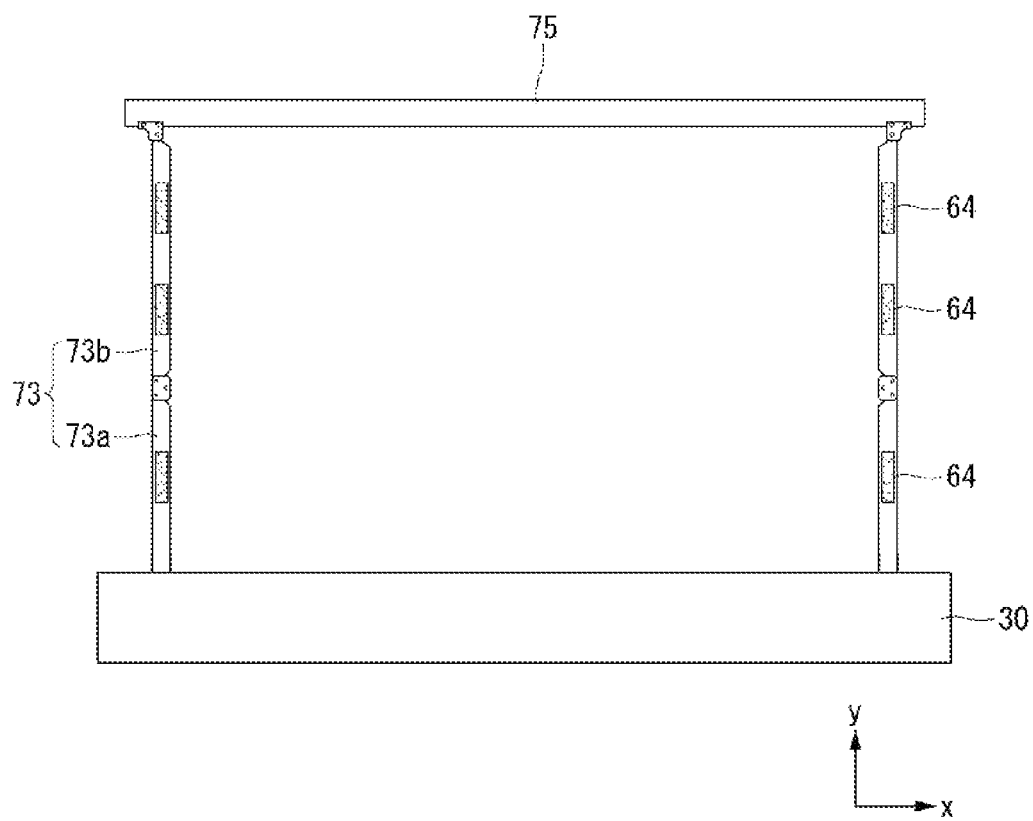

Referring to FIG. 11, the plurality of magnets 64 may be disposed on a link 73. For example, the at least one magnet 64 may be disposed on a first arm 73a, and the at least one magnet 64 may be disposed on a second arm 73b. The plurality of magnets 64 may be spaced apart from each other.

Figure 12:
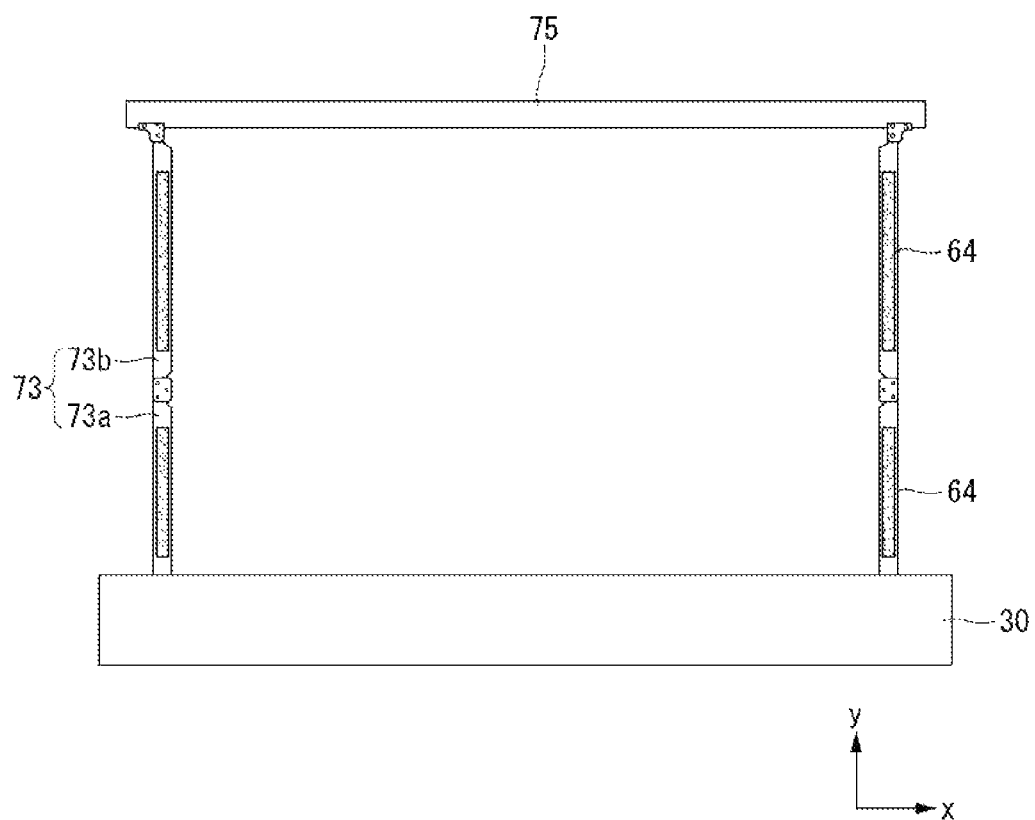

Referring to FIG. 12, one magnet 64 may be disposed on each of the first arm 73a and the second arm 73b. The magnet 64 may have a shape that elongates in the long-side direction of the first arm 73a and the second arm 73b. Since the magnet 64 has a shape that elongates in the long-side direction of the first arm 73a and the second arm 73b, the area of a portion where the link 73 is closely attached to the display panel and the module cover can be increased. Accordingly, adhesive power between the link 73 and the display panel and the module cover can be increased.

Figure 13:
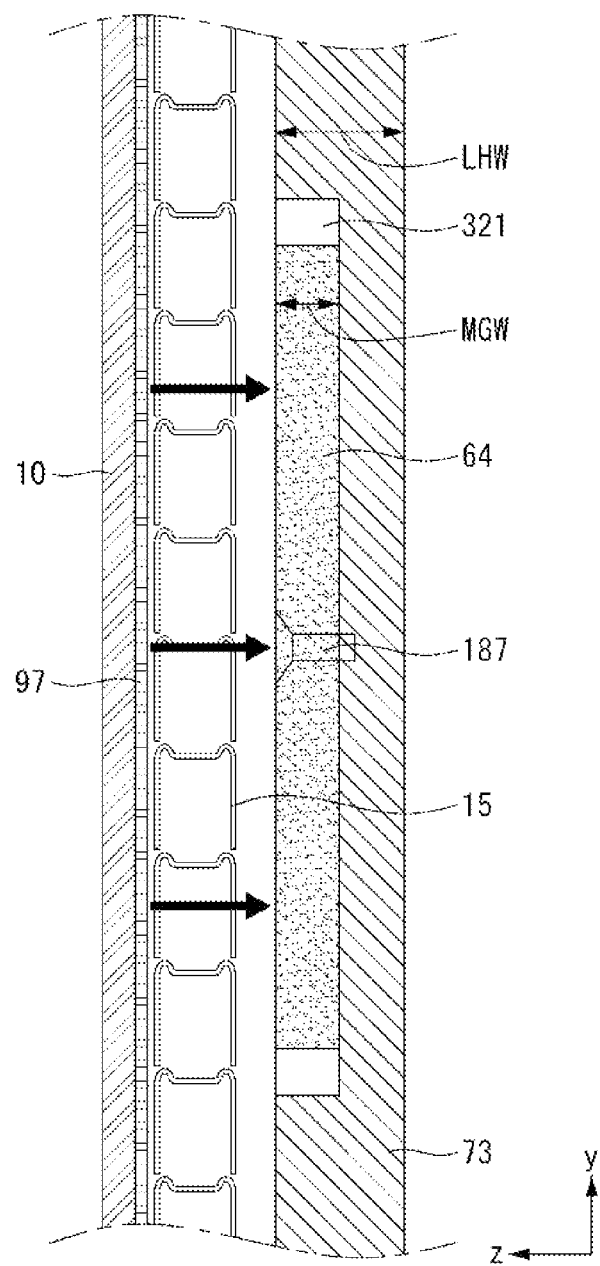

Referring to FIG. 13, the magnet 64 may be disposed in a dented part 321 formed in the link 73. The dented part 321 may have a shape dented toward the inside of the link 73. The magnet 64 may be coupled with the link 73 through at least one screw 187.

The width LHW of the dented part 321 dented toward the inside of the link 73 may be equal to or greater than the thickness MGW of the magnet 64. When the thickness MGW of the magnet 64 is greater than the width LHW of the dented part 321, the display panel 10 and the module cover 15 may not be closely attached to the link 73. In this case, the display panel 10 may be crumpled or may not be flat.

A panel protection part 97 may be disposed in the rear surface of the display panel 10. The panel protection part 97 can prevent damage applied to the display panel 10 due to friction with the module cover 15. The panel protection part 97 may include a metal material. The panel protection part 97 may have a very thin thickness. For example, the panel protection part 97 may have a thickness of about 0.1 mm.

The panel protection part 97 and the magnet 64 may attract each other because the panel protection part 97 includes a metal material. Accordingly, the module cover 15 disposed between the panel protection part 97 and the link 73 can be closely attached to the magnet 64 although it does not include a metal material.

Figure 14:
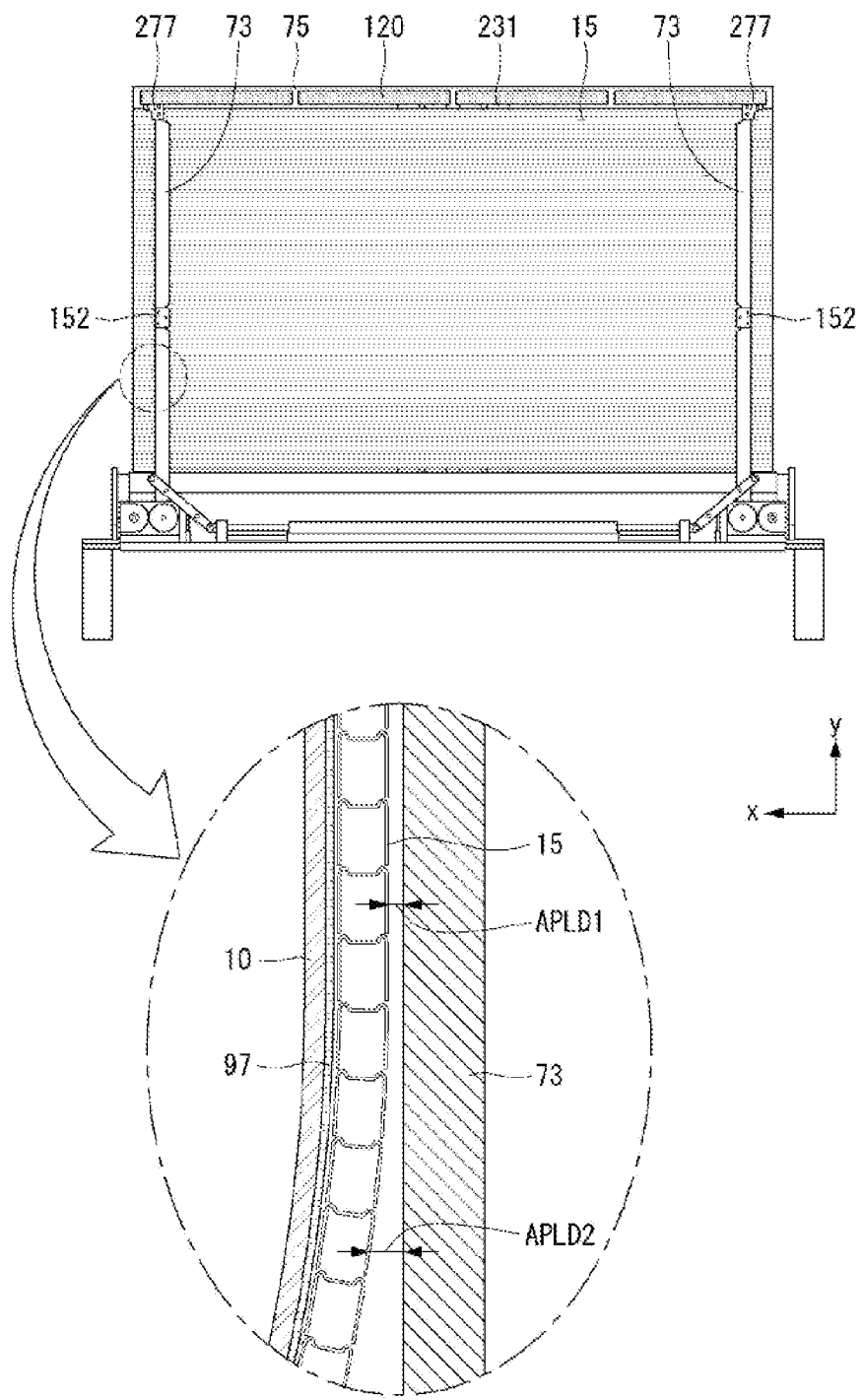

Referring to FIG. 14, the module cover 15 may be closely attached to the link 73 by an upper bar 75 on the upper side thereof and a guide bar 234 (refer to FIG. 21) on the lower side thereof. A part of the link 73 between the upper bar 75 and the guide bar 234 may not be closely attached to the module cover 15. Alternatively, a central part of the link 73 may not be closely attached to the module cover 15. The central part of the link 73 may be near an arm joint 152. In this case, distances APRD1 and APLD2 between the module cover 15 and the link 73 may not be constant. In this case, the display panel 10 ○l may be bent or crooked.

Figure 15:
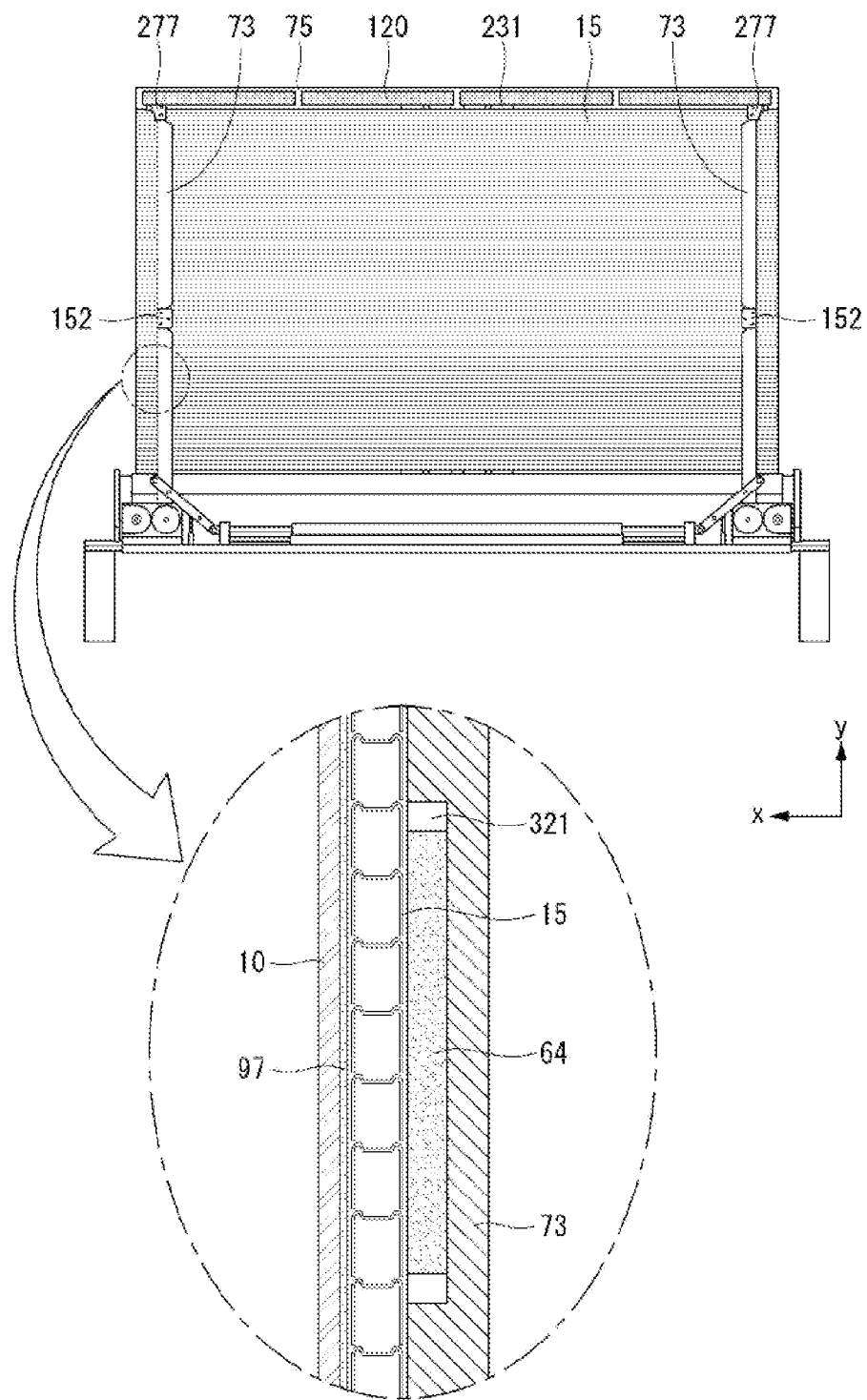

Referring to FIG. 15, if the magnet 64 is disposed in the dented part 321 of the link 73, the magnet 64 attracts the panel protection part 97, so that the module cover 15 may also be closely attached to the magnet 64 at the same time. That is, the central part of the link 73 may be closely attached to the module cover 15.

Figure 16:
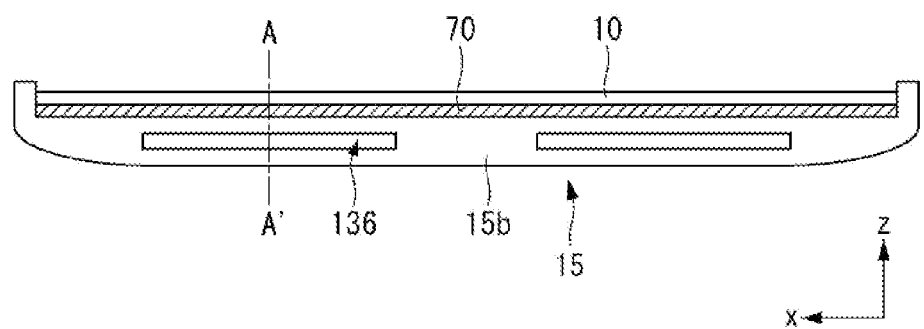
Figure 16:
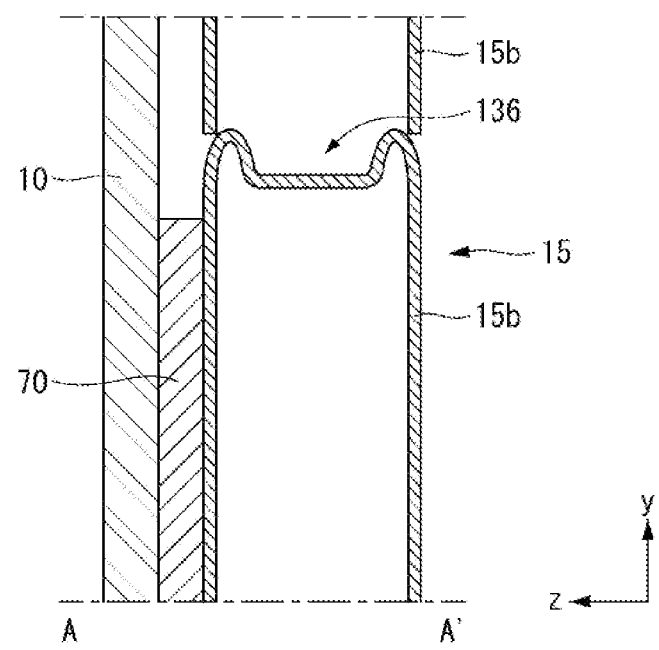

Referring to FIG. 16, a bead 136 may be formed on the top of a segment 15b. The bead 136 may have a shape dented toward the inside of the segment 15b. The bead 136 may have a shape dented in the −y axis direction. For example, the bead 136 may be formed by pressing the segment 15b. The bead 136 may be formed on the segment 15b in plural. The plurality of beads 136 may be spaced apart from each other. The bead 136 can improve the stiffness of the segment 15b. The bead 136 can prevent a shape of the segment 15b from being deformed due to an external impact.

Figure 17:
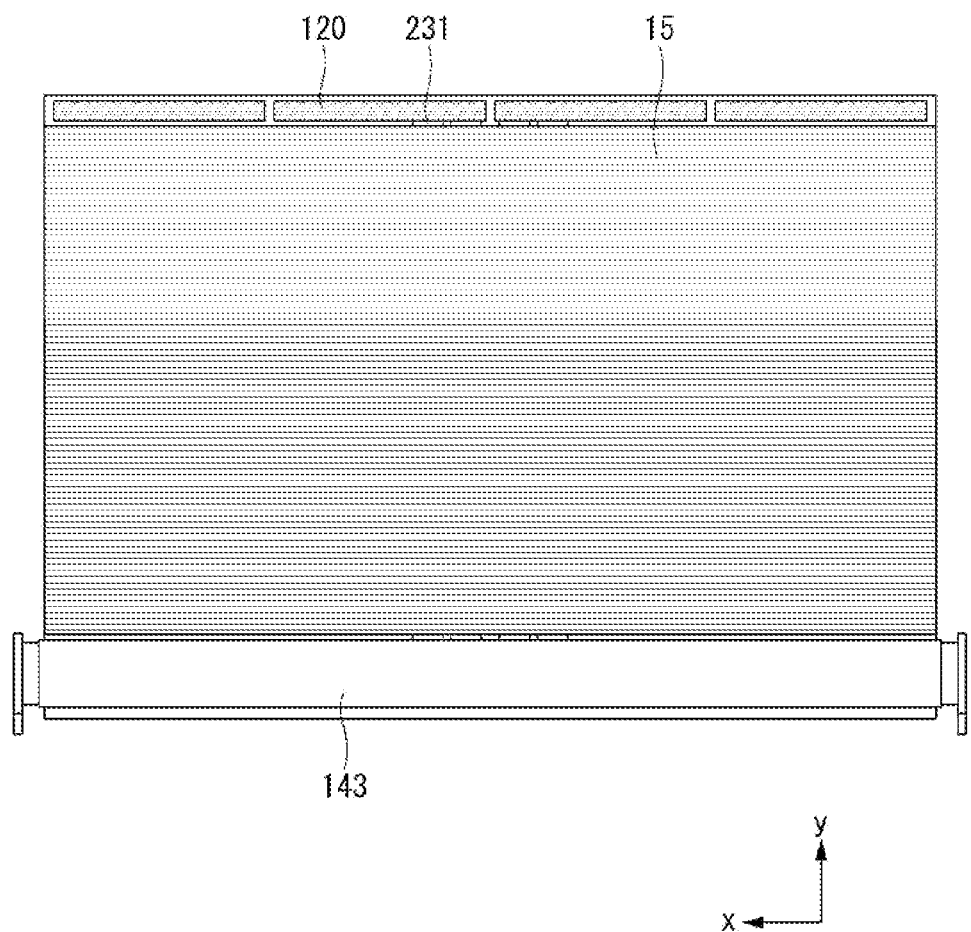

Referring to FIG. 17, a source PCB 120 may be disposed over the module cover 15. When the source PCB 120 is rolled up or rolled down, a location of the source PCB 120 may be changed along with a movement of the module cover 15. An FFC cable 231 may be disposed at a central part of the module cover 15 on the basis of the first direction. The FFC cable 231 may be disposed at both ends of the module cover 15 on the basis of the first direction.

Figure 18:
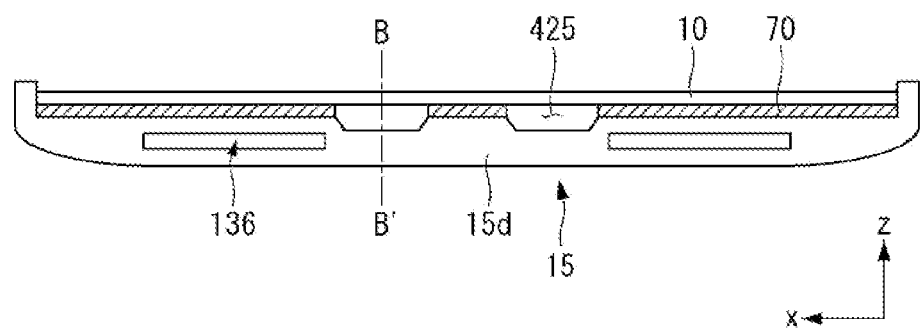
Figure 18:
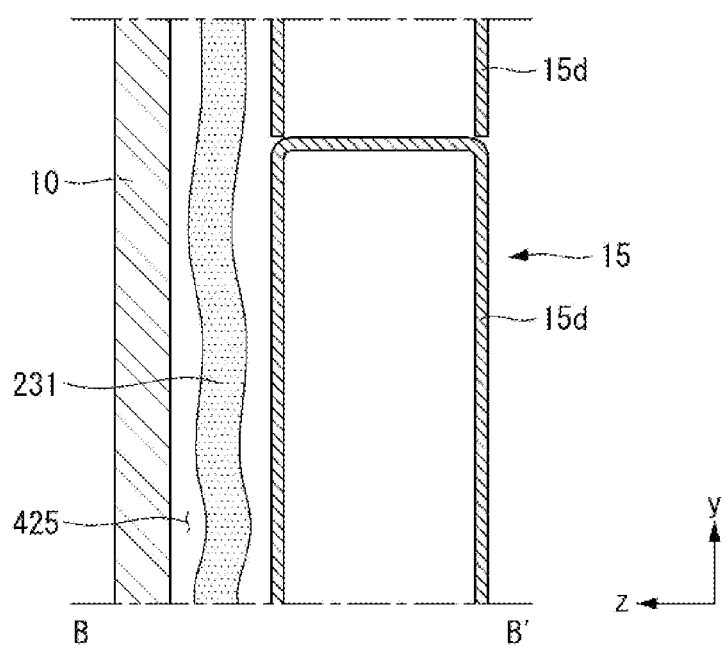

Referring to FIG. 18, a segment 15d may include a dented part 425 dented in the −z axis direction. The dented part 425 may form a space between the display panel 10 and the module cover 15. The FFC cable 231 may be accommodated in the space formed by the dented part 425. Furthermore, the dented part 425 can improve the stiffness of the segment 15d.

The bead 136 may be disposed in the segment 15d other than a part where the dented part 425 is disposed. A thickness of the segment 15d in the third direction becomes thin at the part where the dented part 425 is disposed, so that the bead 136 may not be disposed at the part where the dented part 425 is disposed.

Figure 19:
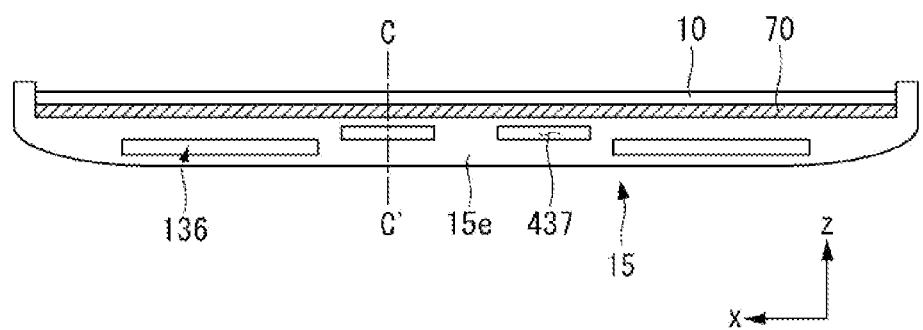
Figure 19:
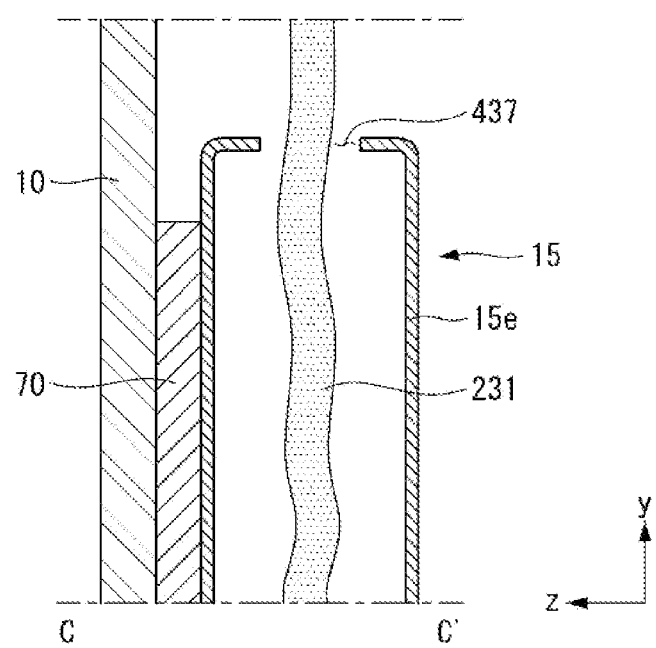

Referring to FIG. 19, a penetration part 437 may be disposed at a central part of a segment 15e on the basis of the first direction. The penetration part 437 may penetrate the central part of the segment 15e in the second direction.

That is, the penetration part 437 may be a hole placed in the segment 15e. The penetration part 437 may be a part in which the FFC cable 231 is disposed. The penetration part 437 is formed in the segment 15e, so that the thickness of the segment 15e can be reduced compared to a case where the FFC cable 231 is disposed in the dented part 425.

The bead 136 may be disposed on the segment 15e other than a pat where the penetration part 437 is disposed. A thickness of the segment 15e in the third direction becomes thin in the part where the penetration part 437 is disposed, so that the bead 136 may not be disposed in the part where the penetration part 437.

Figure 20:
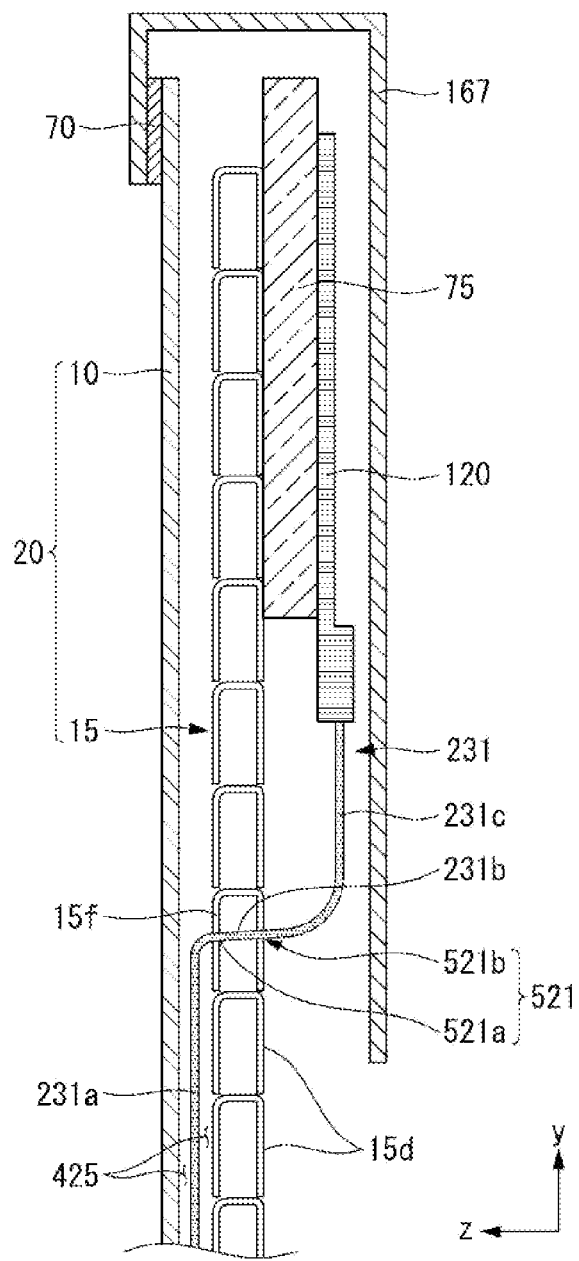

Referring to FIG. 20, a top case 167 may cover the source PCB 120 and an upper bar 75 as well as the display panel 10 and the module cover 15. The upper bar 75 may have one surface coupled with the rear surface of the module cover 15 and have the other surface coupled with the source PCB 120. The upper bar 75 may be fixed to the module cover 15, and may support the source PCB 120.

The bottom of the FFC cable 231 may be connected to a timing controller board 105 (refer to 21) within a panel roller 143 (refer to 21). The FFC cable 231 may be wound on or unwound from the panel roller 143 along with the display unit 20.

A part of the FFC cable 231 may be disposed between the display panel 10 and the module cover 15. A portion that belongs to the FFC cable 231 and that is disposed between the display panel 10 and the module cover 15 may be denoted as a first portion 231a. The first portion 231a may be disposed in the dented part 425 formed by the plurality of segments 15d. Alternatively, the first portion 231a may be accommodated in the dented part 425 formed by the plurality of segments 15d.

A part of the FFC cable 231 may penetrate a segment 15f. A portion that belongs to the FFC cable 231 and that penetrates the segment 15f may be denoted as a second portion 231b. The segment 15f may include a first hole 521a formed in the front surface thereof and a second hole 521b formed in the rear surface thereof. The first hole 521a and the second hole 521b may be connected to form one hole 521. The hole 521 may penetrate the segment 15f in the third direction. The second portion 231b may pass through the hole 521. The hole 521 may also be called a connection hole 521.

The top of the FFC cable 231 may be electrically connected to the source PCB 120. A part of the FFC cable 231 may be disposed on the rear surface of the module cover 15. A portion that belongs to the FFC cable 231 and that is disposed on the rear surface of the module cover 15 may be denoted as a third portion 231c. The third portion 231c may be electrically connected to the source PCB 120.

The third portion 231c may be covered by the top case 167. Accordingly, the third portion 231c may not be exposed to the outside.

Figure 21:
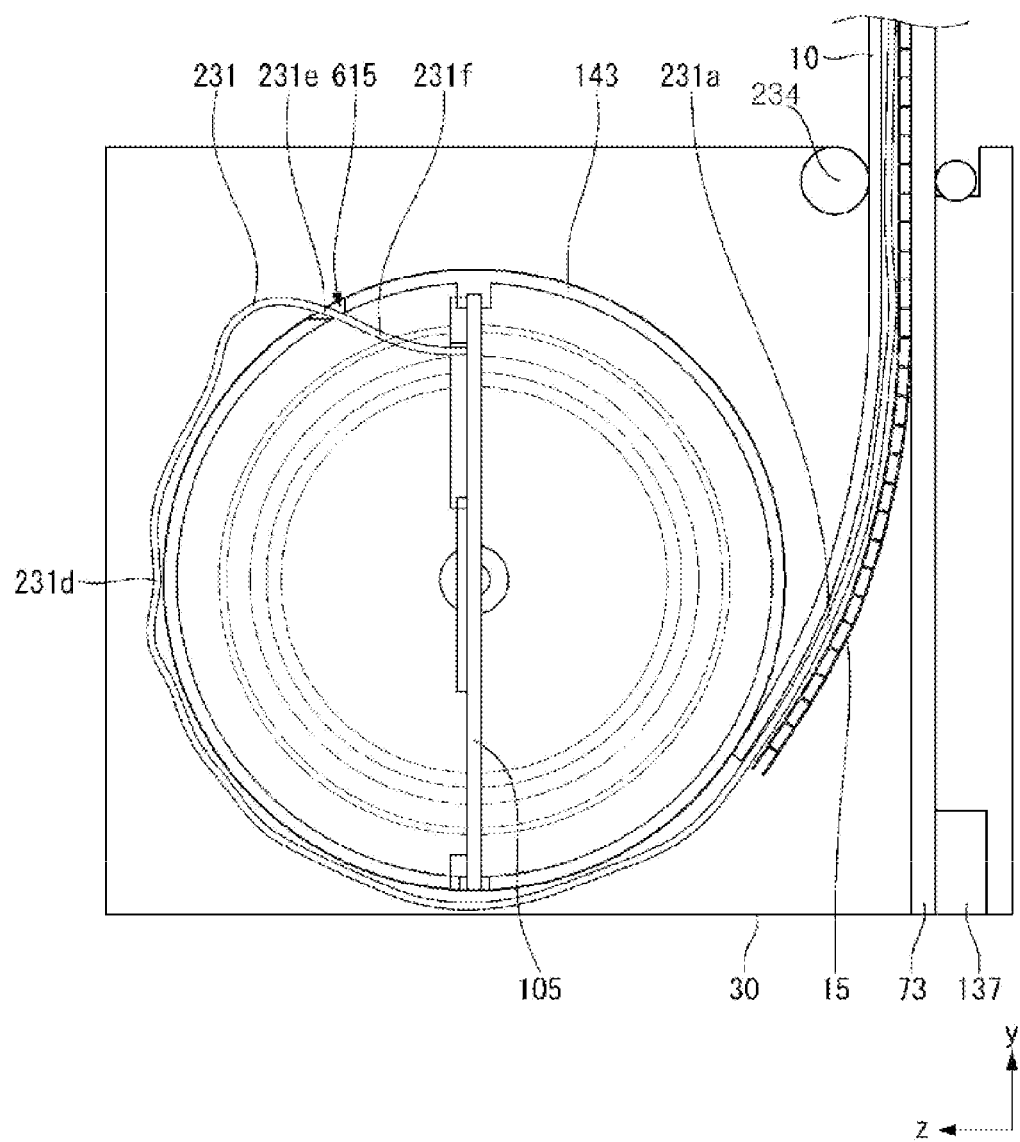

Referring to FIG. 21, the FFC cable 231 may be connected to the timing controller board 105 mounted on the panel roller 143. A penetration hole 615 may be formed in the panel roller 143. The FFC cable 231 may be connected to the timing controller board 105 through the penetration hole 615.

The penetration hole 615 may be disposed on one side of the panel roller 143, and may penetrate the outer circumference part of the panel roller 143. The FFC cable 231 may be connected to one side of the timing controller board 105 through the penetration hole 615.

Although the FFC cable 231 is disposed on the outer circumference of the panel roller 143, the FFC cable 231 can maintain a connection with the timing controller board 105 due to the penetration hole 615. Accordingly, the FFC cable 231 may not be twisted due to rotation with the panel roller 143.

A part of the FFC cable 231 may be wound on the panel roller 143. A portion that belongs to the FFC cable 231 and that is wound on the panel roller 143 may be denoted as a fourth portion 231d. The fourth portion 231d may come into contact with the outer circumference surface of the panel roller 143.

A part of the FFC cable 231 may pass through the penetration hole 615. A portion that belongs to the FFC cable 231 and that passes through the penetration hole 615 may be denoted as a fifth portion 231e.

The bottom of the FFC cable 231 may be electrically connected to the timing controller board 105. A part of the FFC cable 231 may be disposed within the panel roller 143. A portion that belongs to the FFC cable 231 and that is disposed within the panel roller 143 may be denoted as a sixth portion 231f. The sixth portion 231f may be electrically connected to the timing controller board 105.

Figure 22:
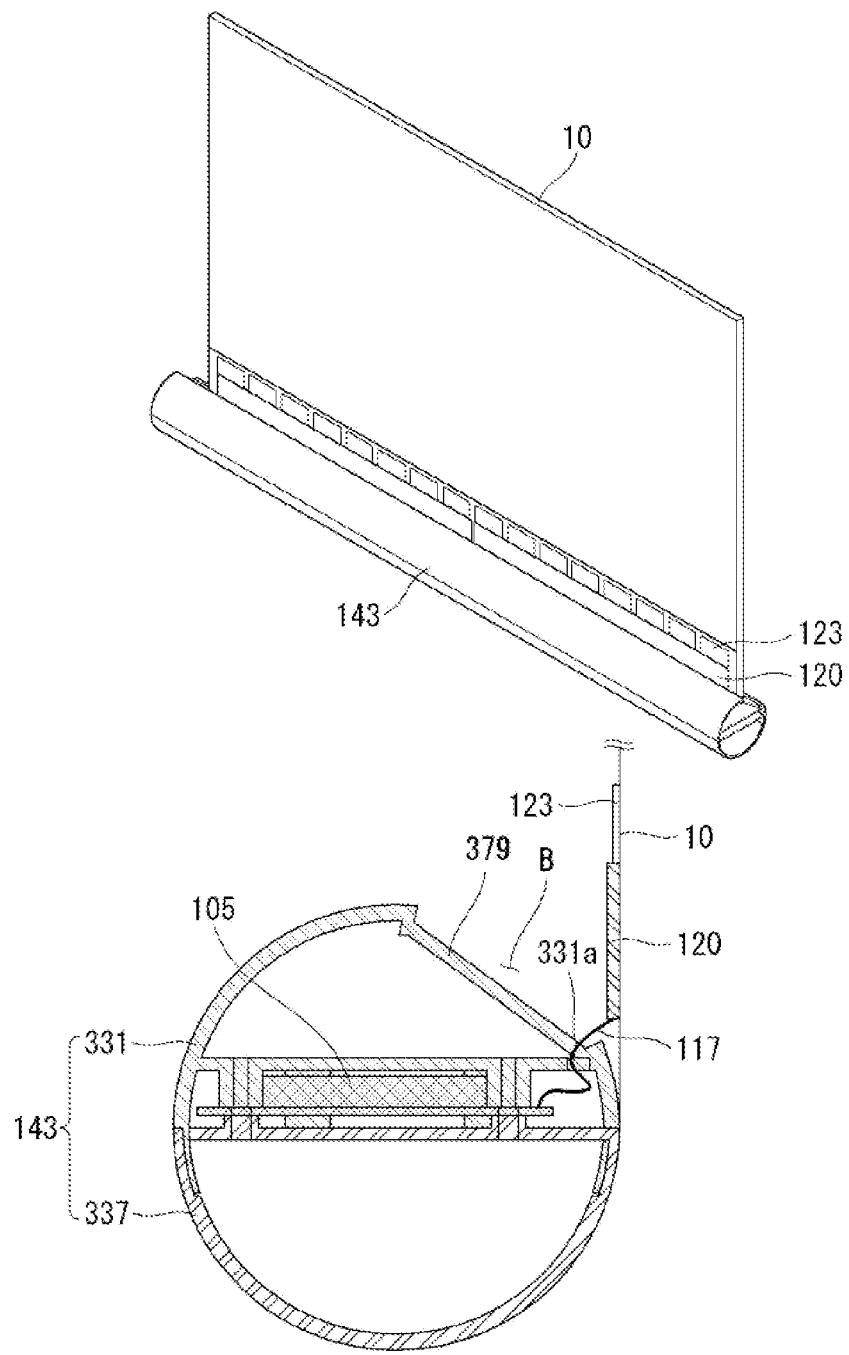

Referring to FIG. 22, the bottom of the display panel 10 may be connected to the roller 143. The display panel 10 may be wound on or unwound from the roller 143. The front surface of the display panel 10 may be coupled with the plurality of source PCBs 120. The plurality of source PCBs 120 may be spaced apart from each other.

A source chip on film (COF) 123 may connect the display panel 10 and the source PCB 120. The source COF 123 may be disposed on the front surface of the display panel 10. The roller 143 may include a first part 331 and a second part 337. The first part 331 and the second part 337 may be fastened by a screw. The timing controller board 105 may be mounted within the roller 143.

The source PCB 120 may be electrically connected to the timing controller board 105. The timing controller board 105 may deliver digital video data and a timing control signal to the source PCB 120.

A cable 117 may electrically connect the source PCB 120 and the timing controller board 105. For example, the cable 117 may be a flexible flat cable (FFC). The cable 117 may pass through a hole 331a. The hole 331a may be formed in a seated part 379 or the first part 331. The cable 117 may be disposed between the display panel 10 and the second part 337.

The seated part 379 may be formed on the outer circumference of the first part 331. A part of the outer circumference of the first part 331 may be stepped to form the seated part 379. The seated part 379 may form a space B. When the display unit 20 is wound on the roller 143, the source PCB 120 may be accommodated in the seated part 379. The source PCB 120 may not be bent or crooked because it is accommodated in the seated part 379, and durability thereof can be improved.

The cable 117 may electrically connect the timing controller board 105 and the source PCB 120.

Figure 23:
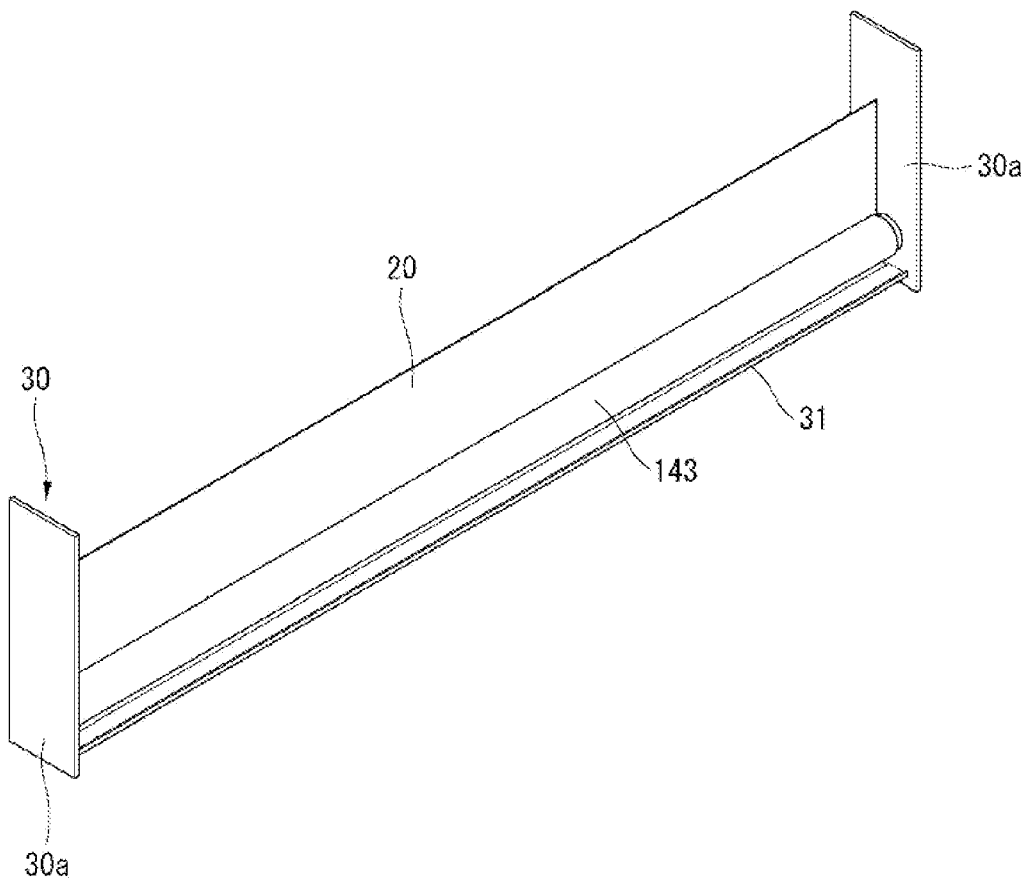

Referring to FIG. 23, the roller 143 on which the display unit 20 is wound may be installed in a first base 31. The first base 31 may be the base side of the housing 30. The roller 143 may elongate in the length direction of the housing 30. The first base 31 may be connected to a side surface 30a of the housing 30.

Figure 24:
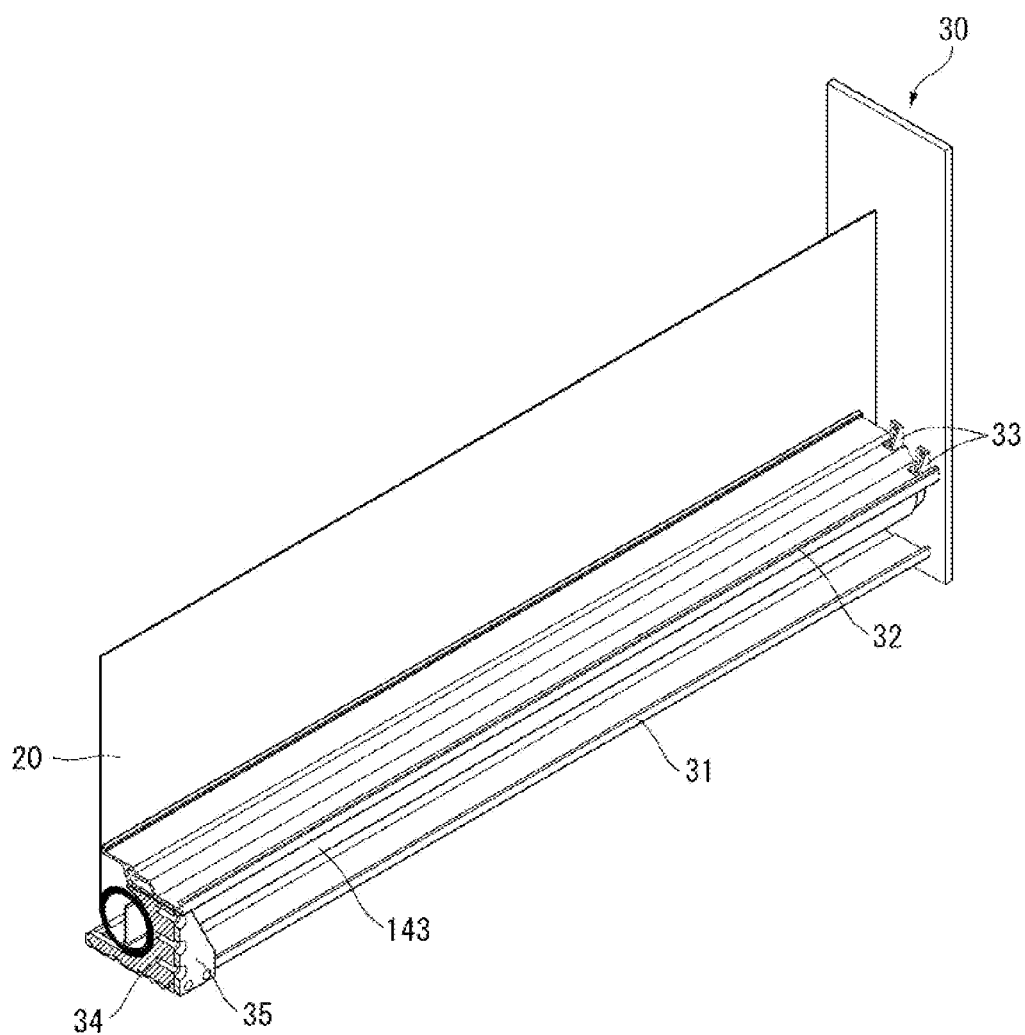
Figure 25:
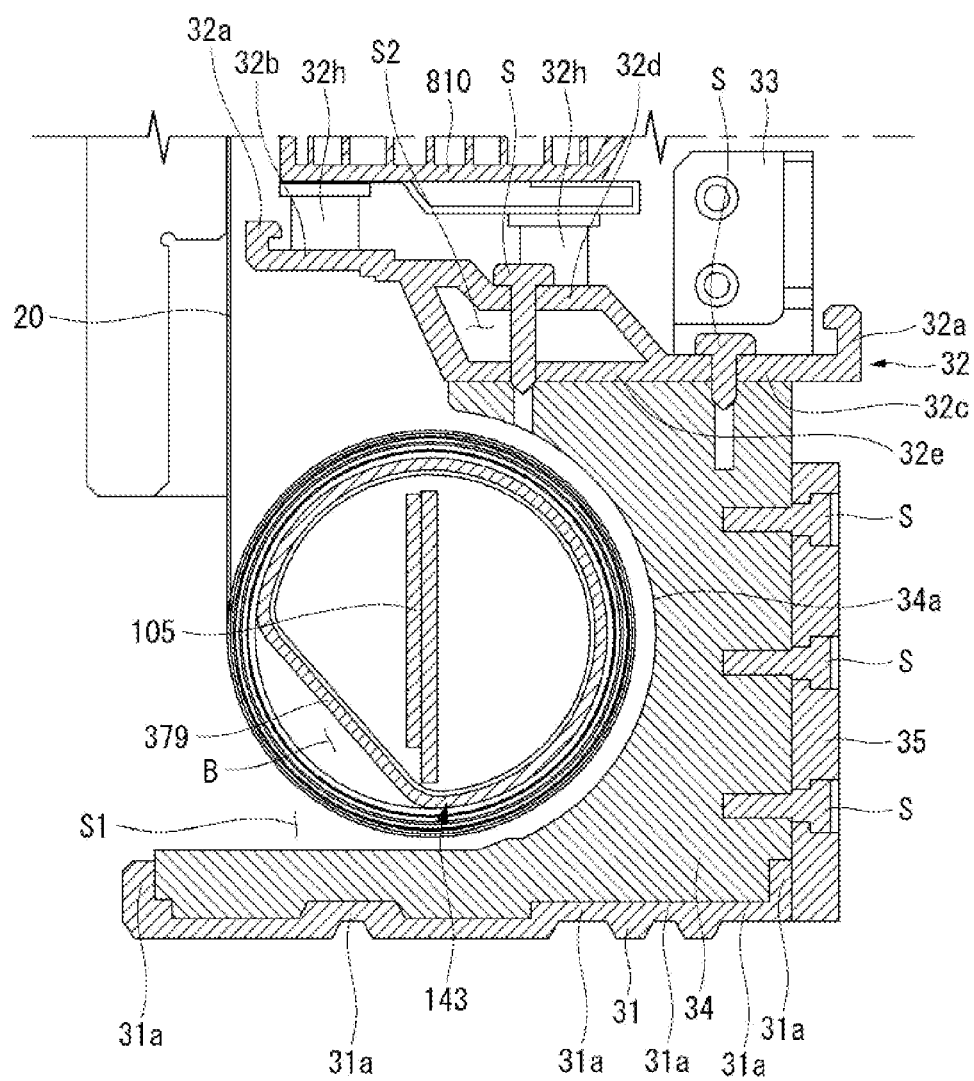

Referring to FIGS. 24 and 25, a beam 31a may be formed in the first base 31. The beam 31a can improve bending or twisting stiffness of the first base 31. Many parts may be installed in the first base 31, and the first base 31 may be subjected to a heavy load. The stiffness of the first base 31 is improved, so the sag of the first base attributable to the load can be prevented. For example, the beam 31a may be formed by a press process.

A second base 32 may be spaced apart from the first base 31 upward from the first base 31. A space S1 may be formed in the first base 31 and the second base 32. The roller 143 on which the display unit 20 is wound may be accommodated in the space S1. The roller 143 may be disposed between the first base 31 and the second base 32.

The second base 32 may be connected to the side surface 30a of the housing 30. A bracket 33 may be fastened to the top of the first base 31. The bracket 33 may be fastened to the side surface 30a of the housing 30.

A beam 32a may be formed in the second base 32. The beam 32a can improve bending or twisting stiffness of the second base 32. For example, the beam 32a may be formed by a press process.

A third part 32d may be connected to a first part 32b and a second part 32c. A fourth part 32e may be connected to the first part 32b and the second part 32c. A space S2 may be formed between the third part 32d and the fourth part 32e. Accordingly, bending or twisting stiffness of the second base 32 can be improved. The third part 32d may be called a reinforcement rib 32d or a rib 32d. The fourth part 32e may be called a reinforcement rib 32e or a rib 32e.

Many parts may be installed in the second base 32, so that the second base 32 may be subjected to a heavy load. The stiffness of the second base 32 is improved, so that the sag of the second base 32 attributable to the load can be prevented.

A first reinforcement plate 34 may be disposed between the first base 31 and the second base 32. The first reinforcement plate 34 and the second base 32 may be fastened by a screw. The first reinforcement plate 34 may support the second base 32. The first reinforcement plate 34 can prevent the sag of the second base 32. The first reinforcement plate 34 may be disposed at a central part of the first base 31 or at a central part of the second base 32. The first reinforcement plate 34 may include a curved surface part 34a. The curved surface part 34a may be formed along the roller 143. The curved surface part 34a may not come into contact with the roller 143 or the display unit 20 wound on the roller 143. The curved surface part 34a can maintain a given interval with the roller 143 in order not to hinder the rotation of the roller 143.

A second reinforcement plate 35 may be fastened to the first base 31 and the first reinforcement plate 34. The second reinforcement plate 35 may support the first reinforcement plate 34. The second reinforcement plate 35 may be disposed behind the first reinforcement plate 34. The second reinforcement plate 35 may be disposed behind the first base 31. The second reinforcement plate 35 may be disposed perpendicularly to the first base 31. The second reinforcement plate 35 may be fastened to the beam 31a of the first base 31. The second base 32 may face the front surface or rear surface of the housing 30.

Figure 26:
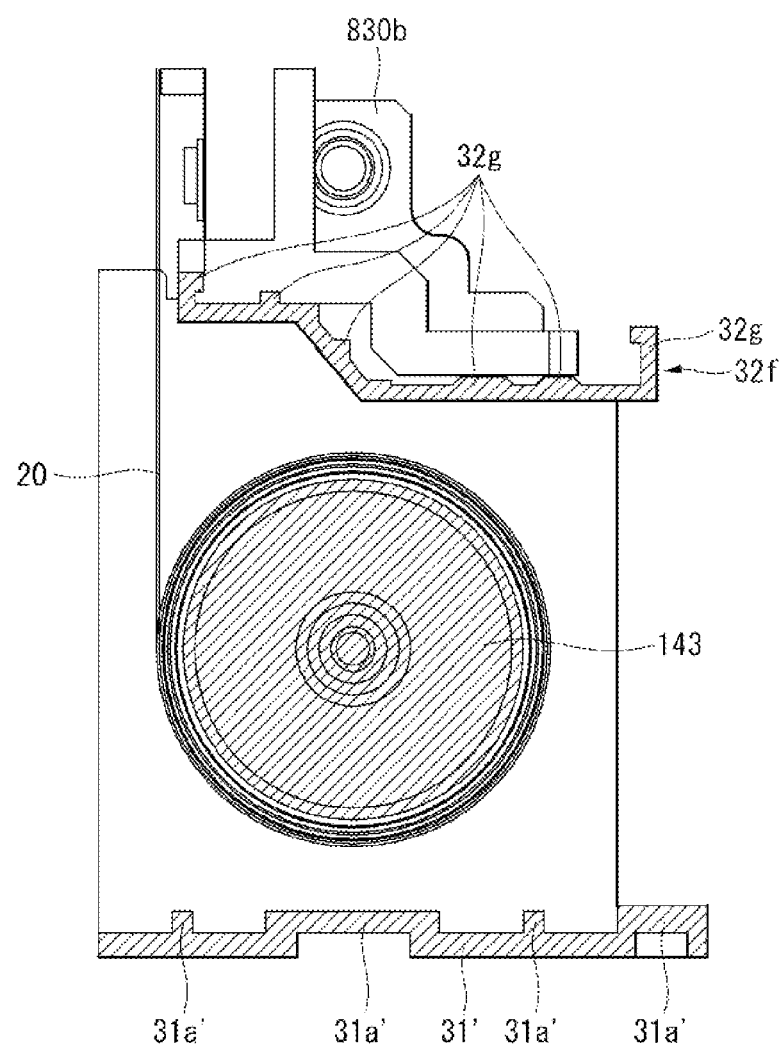

Referring to FIG. 26, a second base 32f may not form a space. If a load applied to the second base 32f is not great, the second base 32f may have sufficient stiffness if the second base has only to include the beam 32g. A first base 31' may include a beam 31a'.

Figure 27:
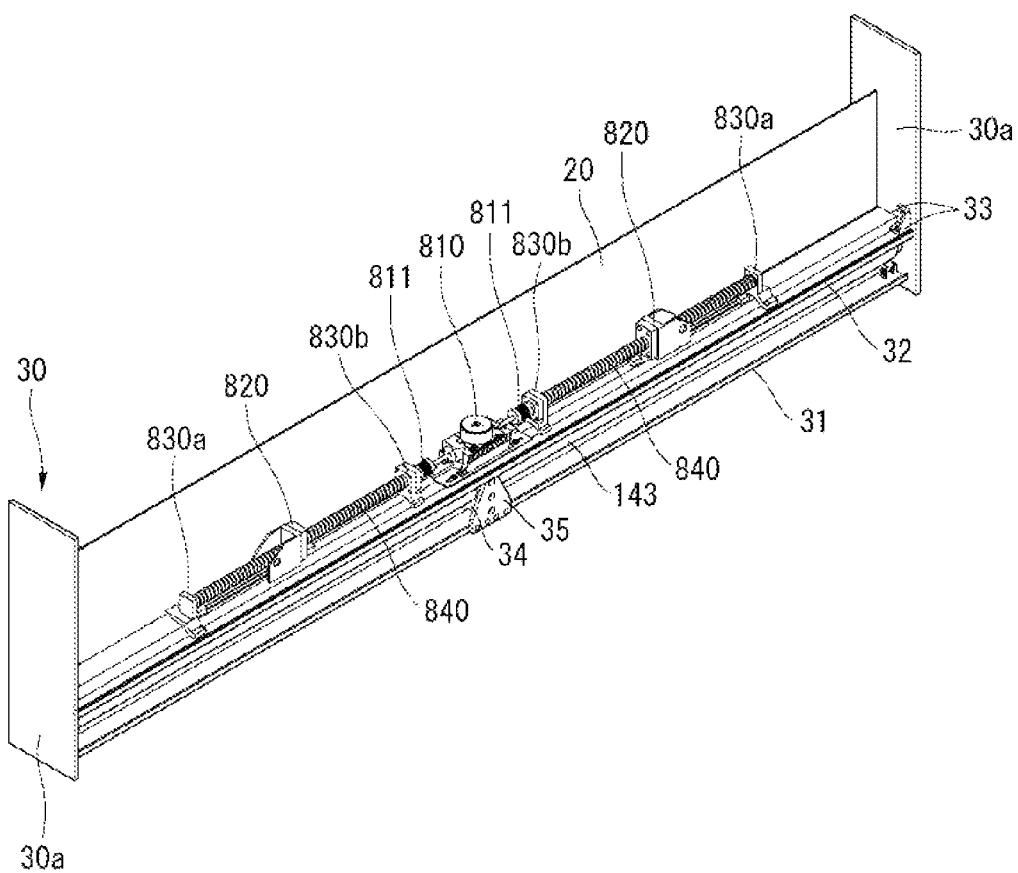
Figure 28:
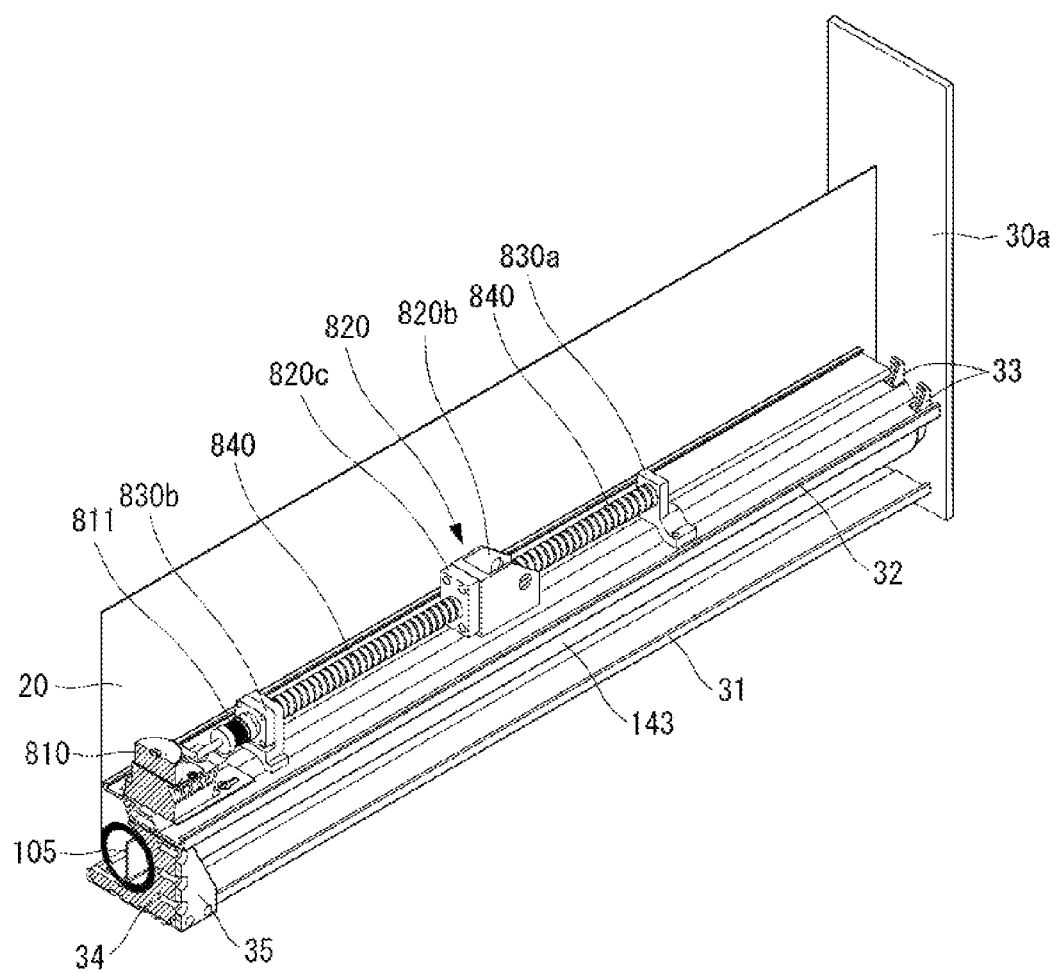

Referring to FIGS. 27 and 28, a motor assembly 810 may be installed in the second base 32. Driving shafts of the motor assembly 810 may be formed at both sides of the motor assembly 810. The right driving shaft and left driving shaft of the motor assembly 810 may be rotated in the same direction. Alternatively, the right driving shaft and left driving shaft of the motor assembly 810 may be rotated in opposite directions.

The motor assembly 810 may include a plurality of motors. The plurality of motors may be connected in series. The motor assembly 810 may output high torque because the plurality of motors is connected in series.

Lead screws 840 may be disposed on the left and right of the motor assembly 810, respectively. The motor assembly 810 may be connected to the lead screws 840. A coupling 811 may connect the lead screw 840 and the driving shaft of the motor assembly 810.

The lead screws 840 may have screw threads formed in the length direction. A direction of the screw thread formed in the right lead screw 840 and a direction of the screw thread formed in the left lead screw 840 may be opposite to each other. A direction of the screw thread formed in the right lead screw 840 and a direction of the screw thread formed in the left lead screw 840 may be equal to each other. Pitches of the left lead screw 840 and the right lead screw 840 may be equal to each other.

A bearing 830a, 830b may be installed in the second base 32. The bearing 830a, 830b may support both sides of the lead screw 840. The bearing 830a, 830b may include an inside bearing 830b disposed close to the motor assembly 810 and an outside bearing 830a disposed far from the motor assembly 810. The lead screw 840 may be stably rotated by the bearing 830a, 830b.

A slide 820 may be engaged with the lead screw 840. The slide 820 may advance or retreat in the length direction of the lead screw 840 by the rotation of the lead screw 840. The slide 820 may move between the outside bearing 830a and the inside bearing 830b. The slides 820 may be disposed in the left lead screw 840 and the right lead screw 840, respectively. The left slide 820 may be engaged with the left lead screw 840. The right slide 820 may be engaged with the right lead screw 840.

The left slide 820 and the right slide 820 may be disposed symmetrically to the motor assembly 810. By the driving of the motor assembly 810, the left slide 820 and the right slide 820 may become distant from each other or become close to each other by the same distance.

Figure 29:
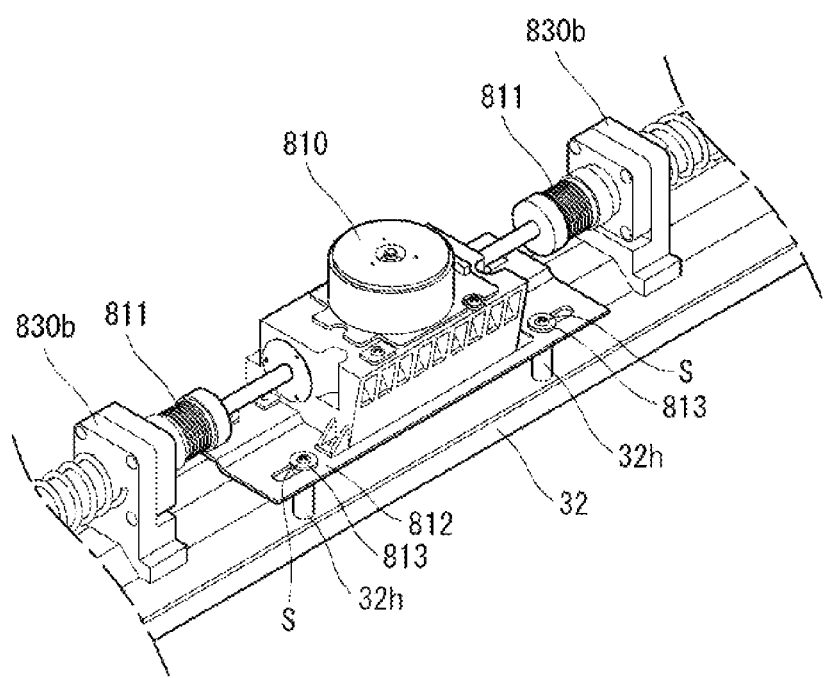

Referring to FIG. 29, the motor assembly 810 may include a plate 813. The plate 813 may be called a mount plate 813 or a motor mount plate 813. A coupling part 32h may be formed in the top of the second base 32. The plate 813 may be fastened to the coupling part 32h through a screw S. The motor assembly 810 may be spaced apart from the top of the second base 32. A washer 813 may be disposed between the top of the plate 813 and the screw S. The washer 813 may include a rubber material. The washer 813 can reduce vibration occurring in the motor assembly 810. The washer 813 can improve the driving safety of the display device 100.

Figure 30:
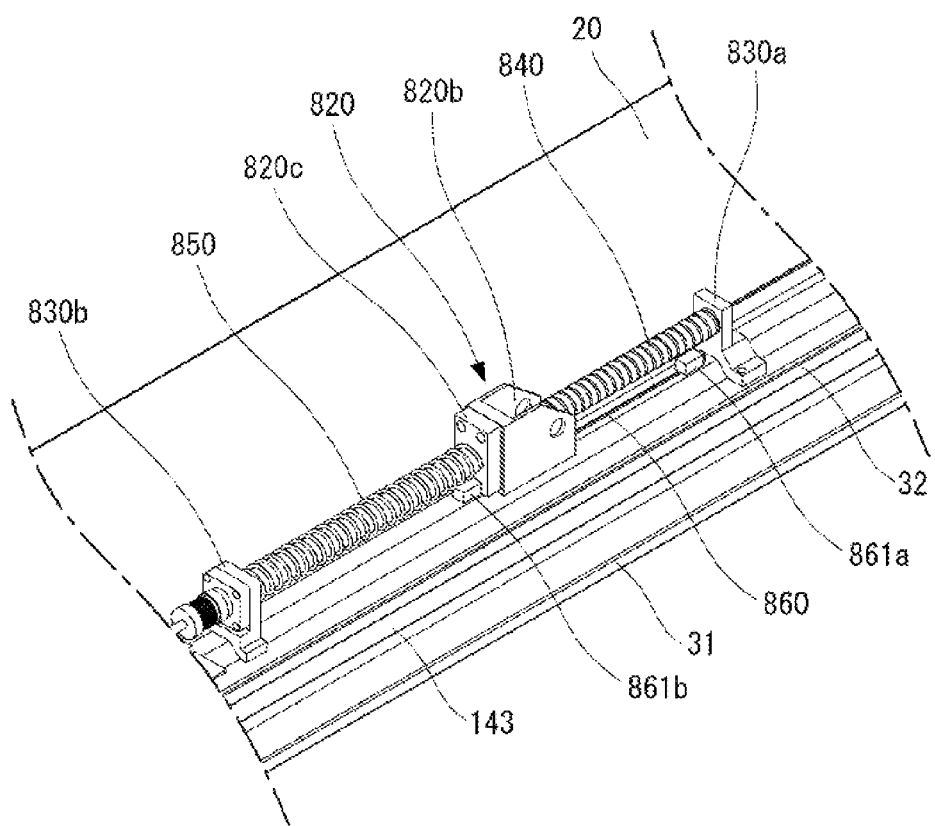

Referring to FIG. 30, a guide rail 860 may be installed in the second base 32. The guide rail 860 may be disposed in parallel to the lead screw 840. The slide 820 may be engaged with the guide rail 860. A first stopper 861b may be disposed on one side of the guide rail 860. A second stopper 861a may be disposed on the other side of the guide rail 860. A range in which the slide 820 may move may be limited between the first stopper 861b and the second stopper 861a.

A spring 850 may surround the lead screw 840. The lead screw 840 may penetrate the spring 850. The spring 850 may be disposed between the inside bearing 830b and the slide 820. One side of the spring 850 may come into contact with the inside bearing 830b. The other side of the spring 850 may come into contact with the slide 820. The spring 850 may provide the slide 820 with an elastic force.

When the slide 820 is trapped at the first stopper 861b, the spring 850 may be compressed to a maximum extent. When the slide 820 is trapped at the first stopper 861b, the length of the spring 850 may be a minimum. When the slide 820 is trapped at the first stopper 861b, the distance between the slide 820 and the inside bearing 830b may be a minimum.

Figure 31:
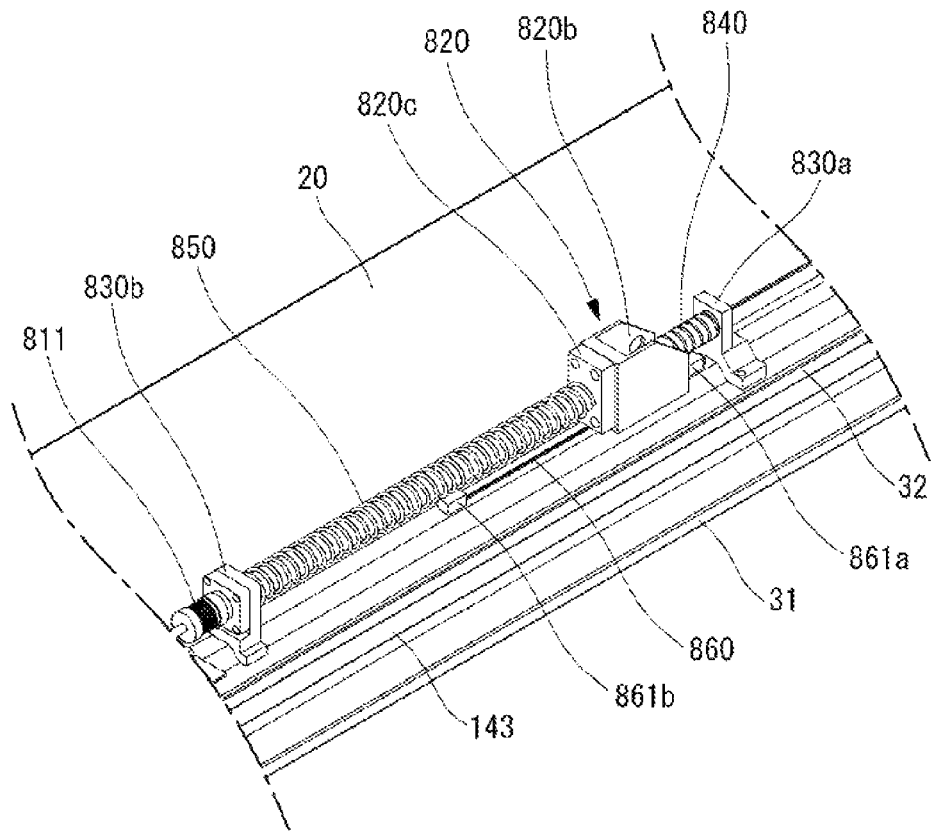

Referring to FIG. 31, when the slide 820 is trapped at the second stopper 861a, the spring 850 may be extended to a maximum extent. When the slide 820 is trapped at the second stopper 861b, the length of the spring 850 may be a maximum. When the slide 820 is trapped at the second stopper 861a, the distance between the slide 820 and the inside bearing 830b may be a maximum.

Figure 32:
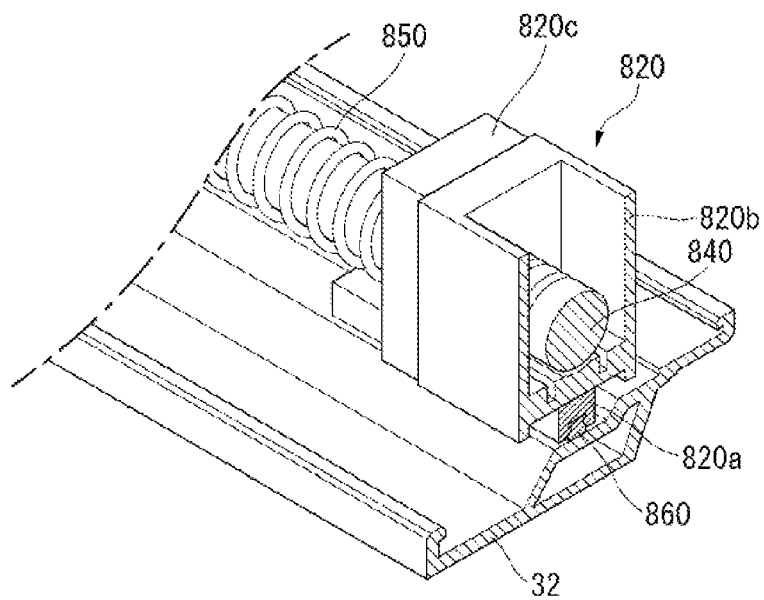

Referring to FIG. 32, a first part 820a may be engaged with the guide rail 860. The first part 820a may move along the guide rail 860. A movement of the first part 820a may be restricted to the length direction of the guide rail 860. A second part 820b may be disposed over the first part 820a. The first part 820a and the second part 820b may be fastened through a screw. The second part 820b may be spaced apart from the guide rail 860. The lead screw 840 may penetrate the second part 820b. For example, the second part 820b may include a male screw thread engaged with a female screw thread of the lead screw 840. Accordingly, although the lead screw 840 is rotated, the slide 820 can stably advance or retreat along the guide rail 860 without rotating.

A third part 820c may be coupled with one side of the second part 820b. The third part 820c may come into contact with the spring 850. The third part 820c may be provided with an elastic force from the spring 850.

Figure 33:
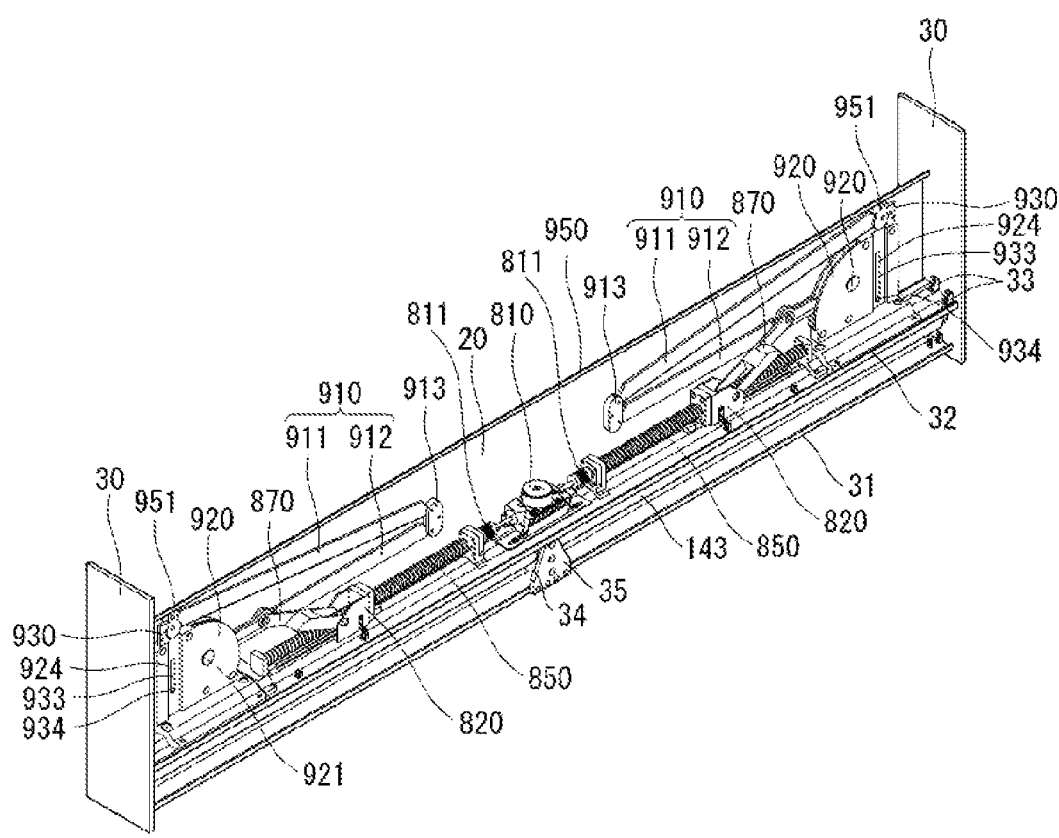
Figure 34:
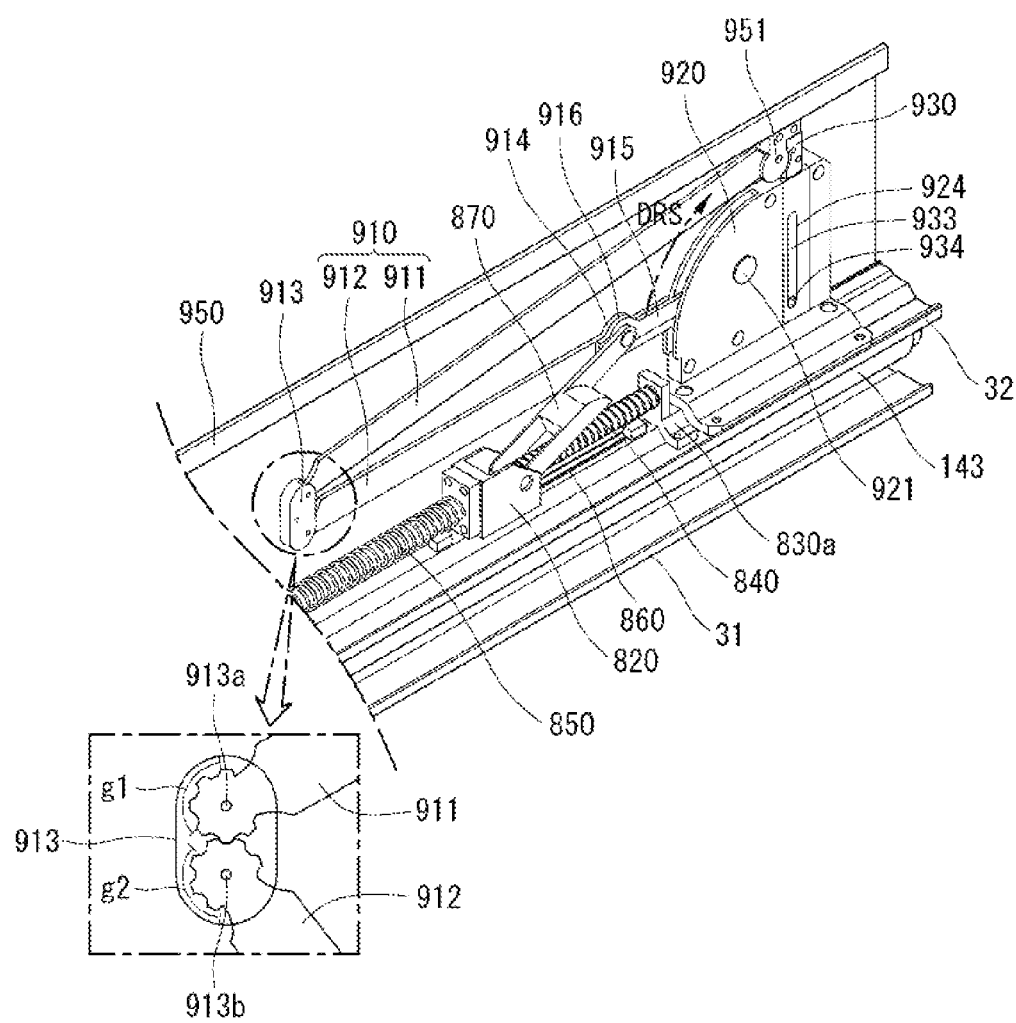

Referring to FIGS. 33 and 34, a link mount 920 may be installed in the second base 32. One side of a second arm 912 may be pivotedly connected to the link mount 920. The other side of the second arm 912 may be pivotedly connected to a joint 913. The other side of the second arm 912 may be pivotedly connected to a second shaft 913b. One side of a rod 870 may be pivotedly connected to the slide 820. The other side of the rod 870 may be pivotedly connected to the second arm 912 or a third arm 915. One side of the third arm 915 may be pivotedly connected to the link mount 920. The other side of the third arm 915 may be pivotedly connected to the other side of the rod 870. The link mount 920 may include a shaft 921. The second arm 912 or the third arm 911 may be pivotedly connected to the shaft 921.

A link bracket 951 may be called a link cap 951. The link bracket 951 may be coupled with a top case 950. The top case 950 may be called a case top 950, an upper bar 950, a top 950, or a bar 950. The top case 950 may be disposed on the top of the display unit 20. The display unit 20 may be fixed to the top case 950.

One side of a first arm 911 may be pivotedly connected to the joint 913. One side of the first arm 911 may be pivotedly connected to a first shaft 913a. The other side of the first arm 911 may be pivotedly connected to the link bracket 951 or the top case 950.

A gear g1 may be formed on one side of the first arm 911. A gear g2 may be formed on the other side of the second arm 912. The gear g1 of the first arm 911 and the gear g2 of the second arm 912 may be engaged with each other.

When the slide 820 moves to become close to the outside bearing 830a, the second arm 912 or the third arm 915 may stand up. In this case, a direction in which the second arm 912 or the third arm 915 stands up may be called a standing direction DRS.

The second arm 912 may include a protrusion part 914 that protrudes in the standing direction DRS. The protrusion part 914 may be called a connection part 914. The third arm 915 may include a protrusion part 916 that protrudes in the standing direction DRS. The protrusion part 916 may be called a connection part 916. The protrusion part 914 of the second arm 912 and the protrusion part 916 of the third arm 915 may face or come into contact with each other. The other side of the rod 870 may be fastened to the protrusion part 914 of the second arm 912 or the protrusion part 916 of the third arm 915.

A link 910 may include the first arm 911, the second arm 912, the third arm 915 and/or the joint 913.

Figure 35:
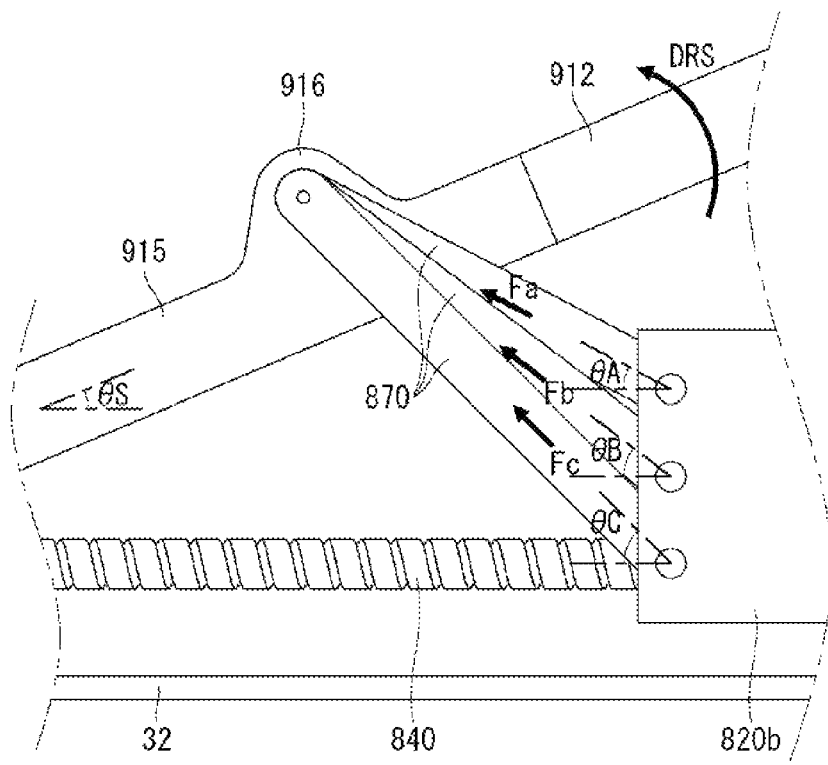
Figure 36:
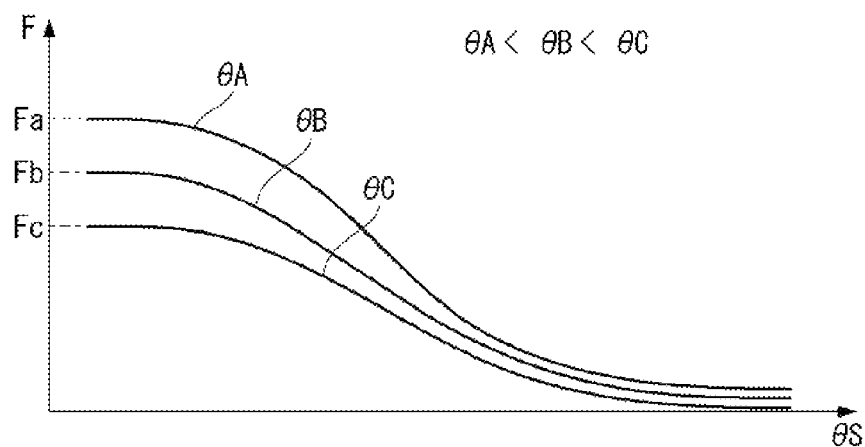

Referring to FIGS. 35 and 36, an angle formed by the second arm 912 or the third arm 915 and the second base 32 may be called theta S. When the rod 870 is connected to the upper side of the second part 820b, an angle formed by the rod 870 and the second base 32 may be called theta A, and a minimum force for enabling the rod 870 to make the second arm 912 or the third arm 915 stand up may be called Fa. When the rod 870 is connected to the middle of the second part 820b, an angle formed by the rod 870 and the second base 32 may be called theta B, and a minimum force for enabling the rod 870 to make the second arm 912 or the third arm 915 stand up may be called Fb. When the rod 870 is connected to the lower side of the second part 820b, an angle formed by the rod 870 and the second base 32 may be called theta C, and a minimum force for enabling the rod 870 to make the second arm 912 or the third arm 915 stand up may be called Fc.

A relation "theta A<theta B<theta C" may be established with respect to the same theta S. Furthermore, a relation "Fc<Fb<Fa" may be established with respect to the same theta S. If an angle formed by the second arm 912 or the third arm 915 and the second base 32 is the same, the more the angle formed by the rod 870 and the second base 32, the less the force required to make the second arm 912 or the third arm 915 stand up. The rod 870 can reduce a load applied to the motor assembly 810 because the rod is connected to the lower side of the second part 820b.

Figure 37:
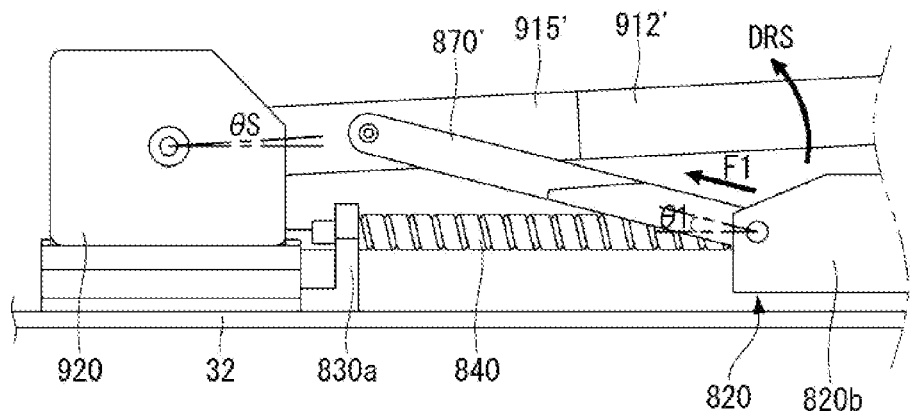

Referring to FIG. 37, a rod 870' may not be connected to a protrusion part of a second arm 912' or a protrusion part of a third arm 915'. If an angle formed by the second arm 912' or the third arm 915' and the second base 32 is theta S, an angle formed by the rod 870' and the second base 32 may be called theta 1, and a minimum force for enabling the rod 870' to make the second arm 912' or the third arm 915' stand up may be called F1.

Figure 38:
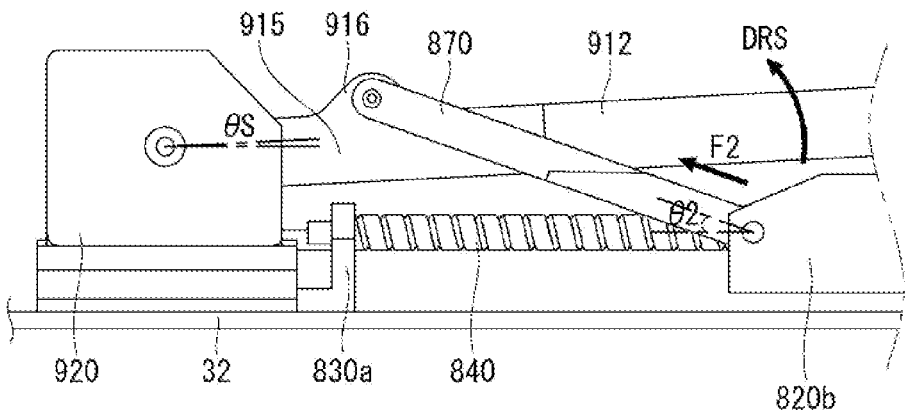

Referring to FIG. 38, the rod 870 may be connected to the protrusion part 914 of the second arm 912 or the protrusion part 916 of the third arm 915. If an angle formed by the second arm 912 or the third arm 915 and the second base 32 is theta S, an angle formed by the rod 870 and the second base 32 may be called theta 2, and a minimum force for enabling the rod 870 to make the second arm 912 or the third arm 915 stand up may be called F2.

Figure 39:
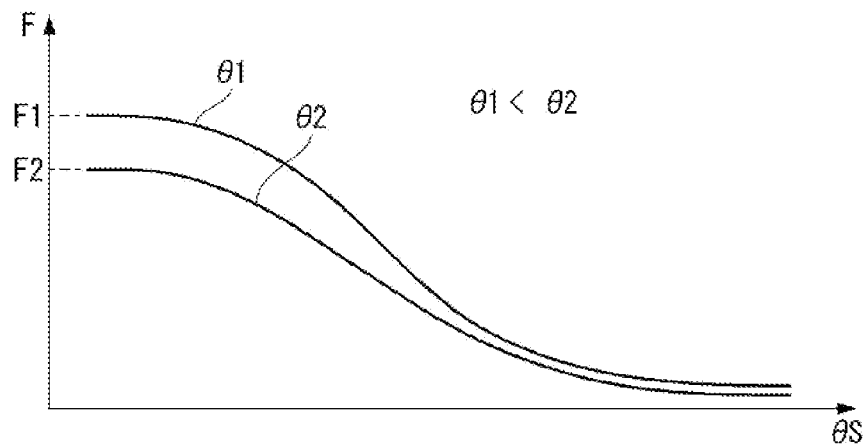

Referring to FIG. 39, if theta S is the same, theta 2 may be greater than theta 1. If theta S is the same, F1 may be greater than F2. If an angle formed by the second arm 912, 912' and the second base 32 is the same, the more the angle formed by the rod 870, 870' and the second base 32, the less the force required to make the second arm 912, 912' stand up. Since the rod 870 is connected to the protrusion part 914, 916, the second arm 912 can be made to stand up by a small force compared to a case where the rod 870' is not connected to the protrusion part. The rod 870 can reduce a load applied to the motor assembly 810 because the rod is connected to the protrusion part 914, 916.

Figure 40:
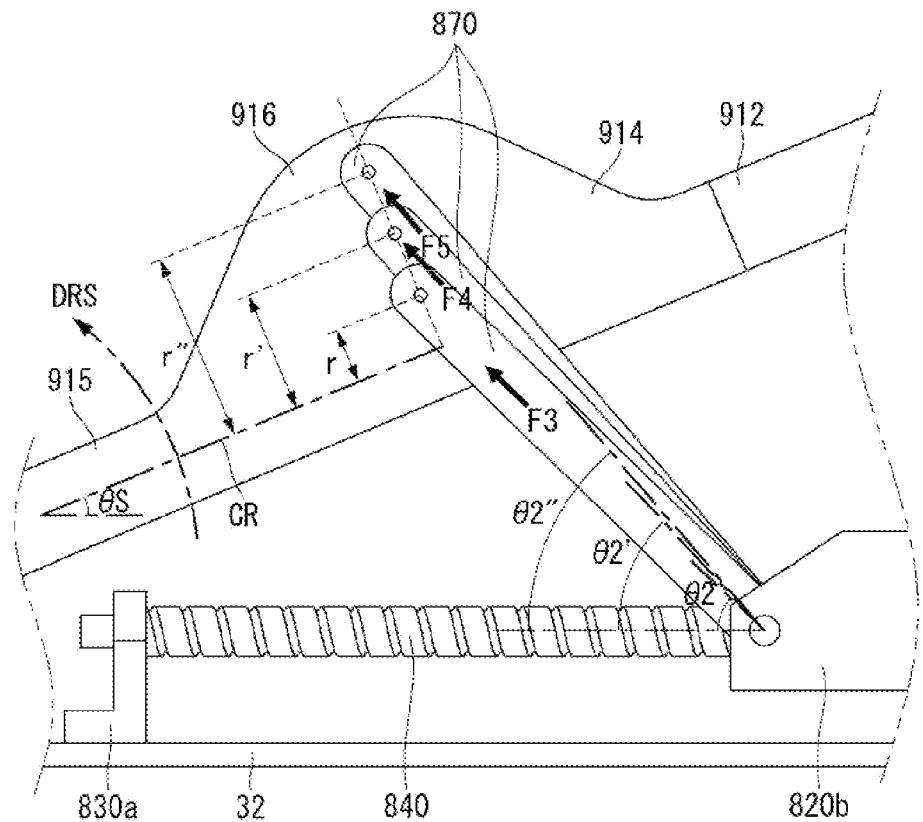

Referring to FIG. 40, the second arm 912 or the third arm 915 may have a central axis CR. If the rod 870 is spaced apart from the central axis CR by a distance r and fastened to the second arm 912, an angle formed by the rod 870 and the second base 32 may be called theta 2, and a minimum force for enabling the rod 870 to make the second arm 912 or the third arm 915 stand up may be called F3. If the rod 870 is spaced apart from the central axis CR by a distance r' and fastened to the second arm 912, an angle formed by the rod 870 and the second base 32 may be called theta 2', and a minimum force for enabling the rod 870 to make the second arm 912 or the third arm 915 stand up may be called F4. If the rod 870 is spaced apart from the central axis CR by a distance r" and fastened to the second arm 912, an angle formed by the rod 870 and the second base 32 may be called theta 2", and a minimum force for enabling the rod 870 to make the second arm 912 or the third arm 915 stand up may be called F5.

Figure 41:
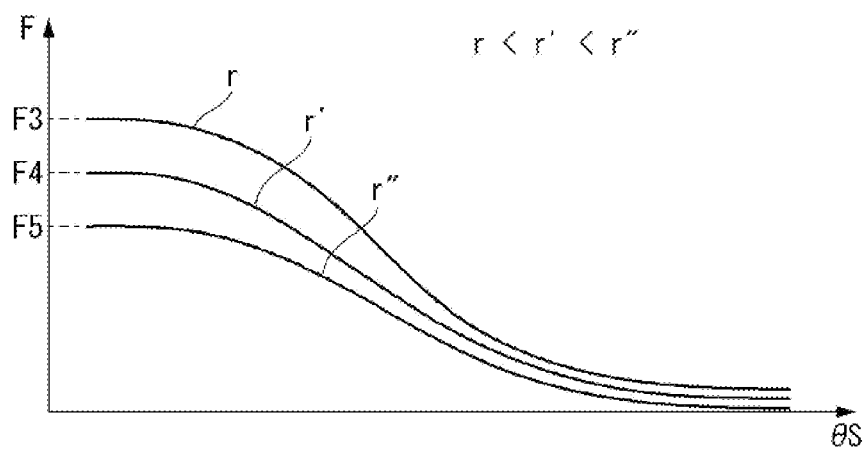

Referring to FIG. 41, if theta S is the same, theta 2" may be greater than theta 2', and theta 2' may be greater than theta 2. If theta S is the same, F3 may be greater than F4, and F4 may be greater than F5. The more the rod 870 is far away from the central axis CR and fastened thereto, the less the force required to make the second arm 912 stand up. The rod 870 can reduce a load applied to the motor assembly 810 because the rod is far away from the central axis CR and fastened thereto.

Figure 42:
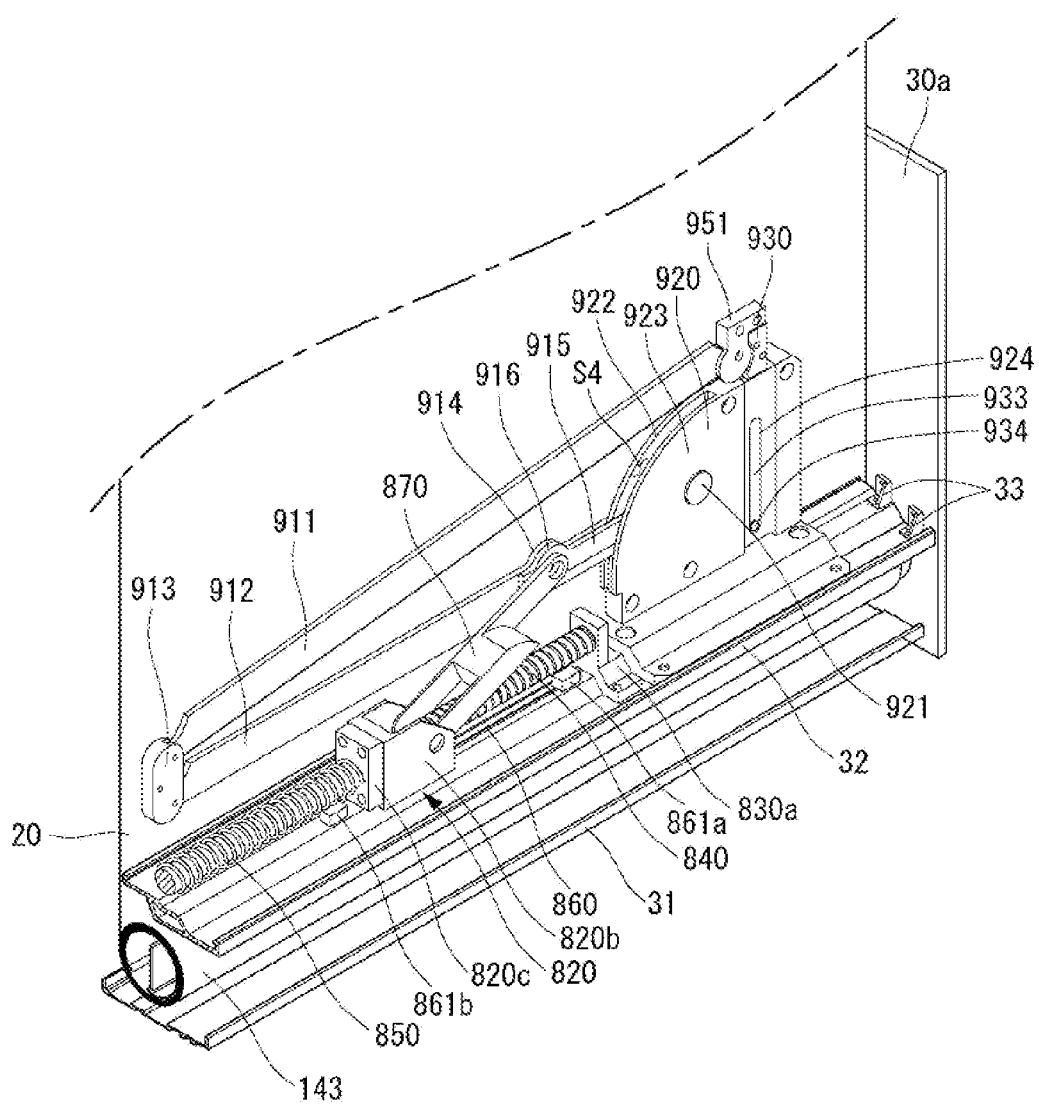

Referring to FIG. 42, the first arm 911 and the second arm 912 may be disposed on the rear surface of the display unit 20 in a way to come into contact with or be close to the rear surface of the display unit 20. As the first arm 911 and the second arm 912 are disposed on the rear surface of the display unit 20 in a way to come into contact with or be close to the rear surface of the display unit 20, the display unit 20 can be stably wound on or unwound from the roller. The link mount 920 may include a first part 922 and a second part 923. The first part 922 and the second part 923 may face each other. A space S4 may be formed between the first part 922 and the second part 923. The first part 922 may face the display unit 20. The first part 922 may be disposed closer in the display unit 20 than in the second part 923. The second arm 912 may be pivotedly connected to a front surface of the first part 922. A part of the third arm 915 may be accommodated in the space S4 and may be pivotedly connected to the first part 922 or the second part 923.

Figure 43:
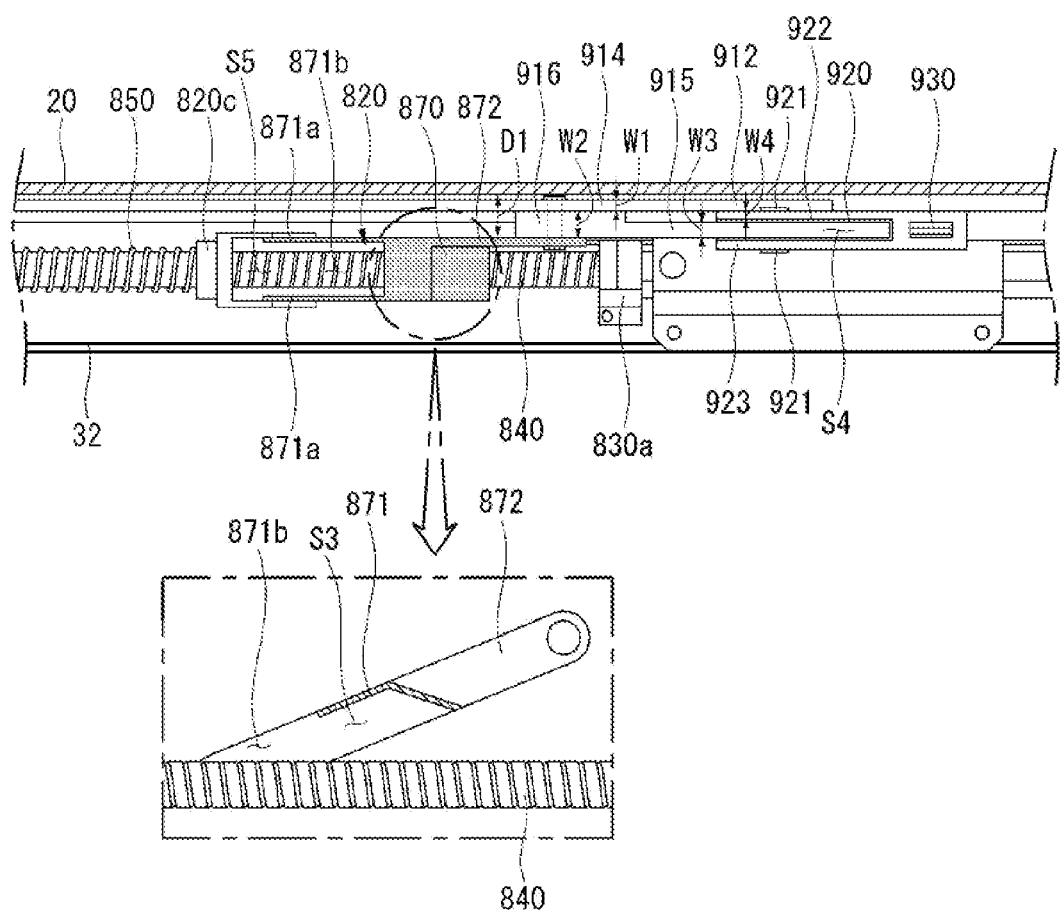

Referring to FIG. 43, the rod 870 may include a first part 871 and a second part 872. The first part 871 may include a connection part 871a on one side thereof. The second part 872 of the slide 820 may form a space S5. The connection part 871a may be inserted into the space S5. The connection part 871a may be pivotedly connected to a second part 820b (refer to FIG. 36) of the slide 820. The other side of the first part 871 may be connected to one side of the second part 872. The other side of the second part 872 may be pivotedly connected to the second arm 912 or the third arm 915. The first part 871 may form the space S3 therein. The first part 871 may include a hole 871b. The lead screw 840 may be accommodated in the hole 871b or the space S3.

The distance between the second part 872 and the display unit 20 may be D1. The second arm 912 may have a thickness W1. A portion that belongs to the third arm 915 and that is accommodated in the space S4 may have a thickness W3. The thickness W3 may be the same as the distance between the first part 922 and the second part 923.

A portion that belongs to the third arm 915 and that is not accommodated in the space S4 may have a thickness W2. The first part 922 may have a thickness W4. The thickness W2 may be greater than the thickness W3. The thickness W2 may be the same as the sum of the thickness W3 and the thickness W4. D1 may be the sum of the thickness W1 and the thickness W2.

The second arm 912 may be disposed on the rear surface of the display unit 20 in a way to come into contact with or to be close to the rear surface of the display unit 20. The third arm 915 may be disposed between the second arm 912 and the second part 872. The second part 872 can stably deliver motive power for making the second arm 912 stand up by the third arm 915. In order to make the second arm 912 or the third arm 915 stably stand up, the second part 872 may be moved forward with respect to the rotation axis of the lead screw 840 and connected to the first part 871. Accordingly, a gap between the second arm 912 and the second part 872 can be minimized.

Figure 44:
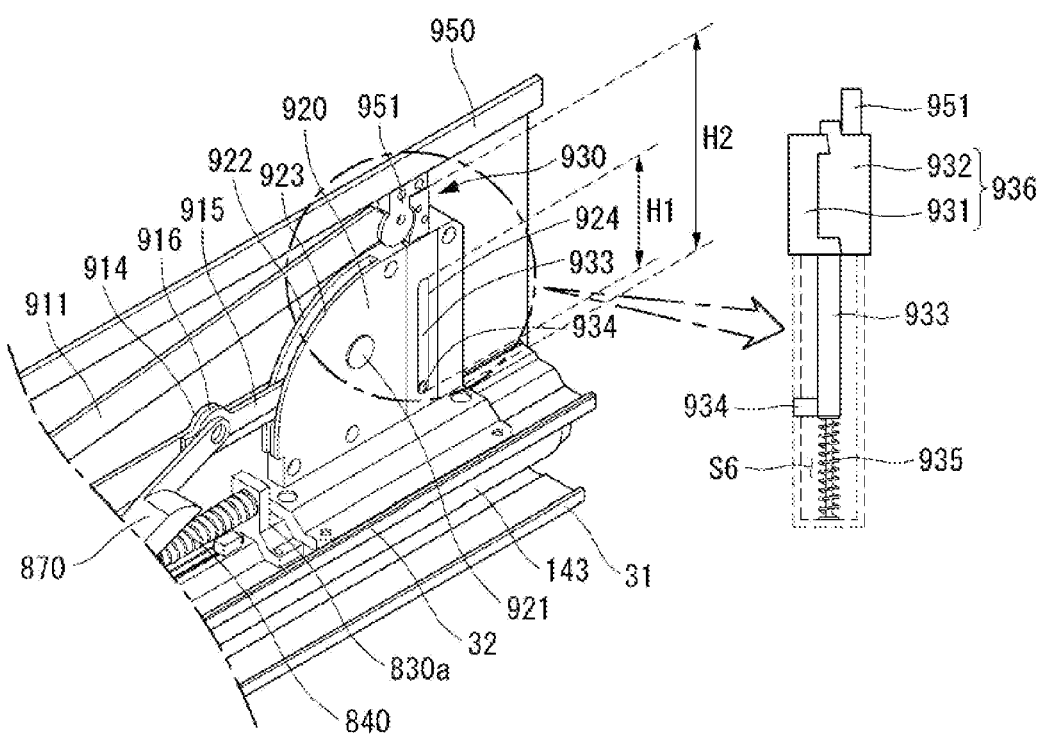

Referring to FIG. 44, a pusher 930 may be mounted on the link mount 920. The pusher 930 may be called a lifter 930. The second part 932 may be fastened to a first part 931. A second part 932 may come into contact with or may be separated from the link bracket 951. The second part 932 may be a material having high elasticity. The first part 931 may be a material having lower elasticity than that of the second part 932. The first part 931 may be a material having higher stiffness than that of the second part 932. The first part 931 and the second part 932 may be collectively called a head 936. The head 936 may be disposed on the upper side of the link mount 920.

A third part 933 may be connected to the first part 931. Alternatively, the third part 933 may be extended downward from the first part 931. The third part 933 may be called a tail 933. A fourth part 934 may protrude from the third part 933. The link mount 920 may form a space S6. The third part 933 may be accommodated in the space S6. The space S6 may be upward opened. The space S6 in which the third part 933 is accommodated may be adjacent to the space S4 (refer to FIG. 37) in which the third arm 915 is accommodated. The second part 932 of the link mount 920 may include a hole 924. The hole 924 may be a long hole that is lengthily formed in the perpendicular direction. The length of the hole 924 may be H1. The fourth part 934 may be inserted into the hole 924. A spring 935 may be accommodated in the space S6. The spring 935 may be disposed at the bottom of the third part 933. The spring 935 may provide the third part 933 with an elastic force in the perpendicular direction.

The head 936 may be greater than the diameter of the space S6. When the head 936 is trapped at the top of the space S6, the height of the head 936 from the second base 32 may be a minimum. The minimum height of the head 936 may be called H2. If the height of the head 936 is a minimum, the fourth part 934 may be trapped at the bottom of the space S6. If the height of the head 936 is a minimum, the spring 935 may be compressed to a maximum extent. If the height of the head 936 is a minimum, an elastic force provided by the spring 935 may be a maximum. If the height of the head 936 is a minimum, the height of the top case 950 may be a minimum.

The pusher 930 may provide an elastic force to the link bracket 951 while coming into contact with the link bracket 951. Accordingly, in order to make the link 910 stand up, a load applied to the motor assembly 810 may be reduced.

Figure 45:
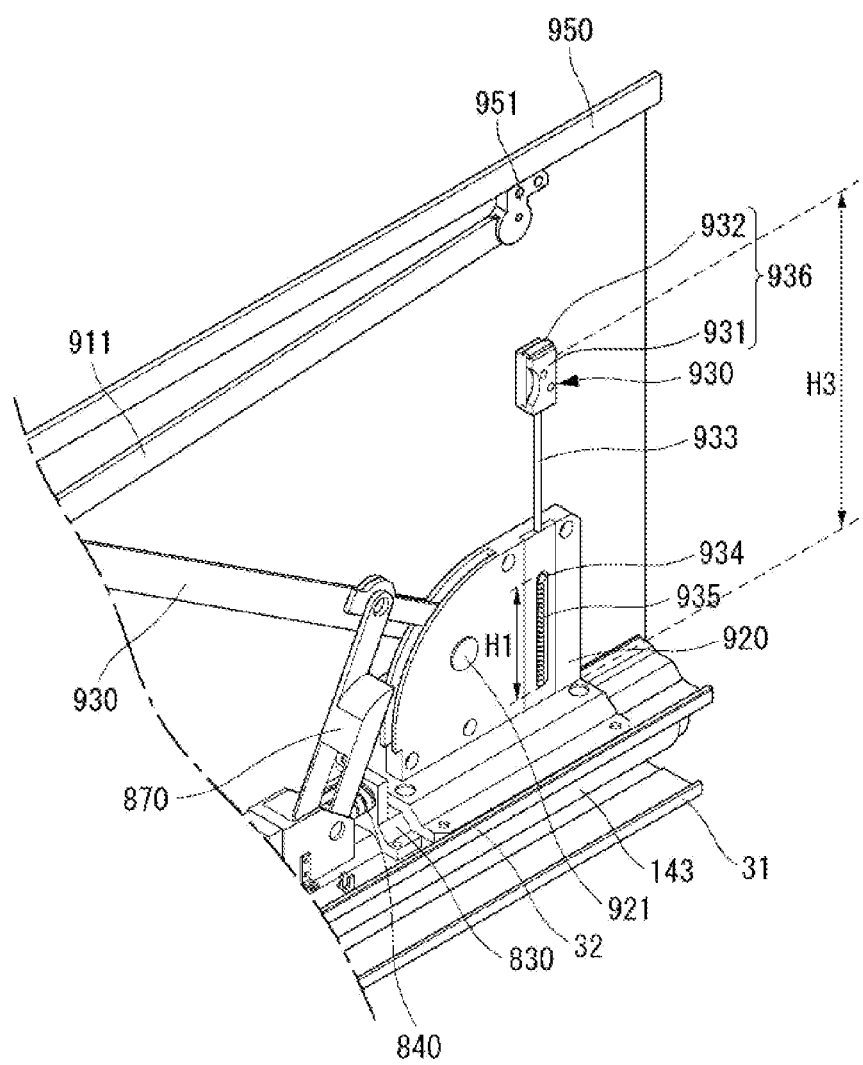

Referring to FIG. 45, when the link 910 sufficiently stands up, the pusher 930 may be separated from the link bracket 951. When the pusher 930 is separated from the link bracket 951, the height of the head 936 from the second base 32 may be a maximum. The maximum height of the head 936 may be called H3. When the height of the head 936 is a maximum, the fourth part 934 may be trapped at the top of the hole 924 (refer to FIG. 38). When the height of the head 936 is a maximum, the spring 935 may be extended to a maximum extent. When the height of the head 936 is a maximum, an elastic force provided by the spring 935 may be a minimum. The maximum height H3 of the head 936 may be substantially the same as the sum of the minimum height H2 of the head 936 and the length H1 of the hole.

Figure 46:
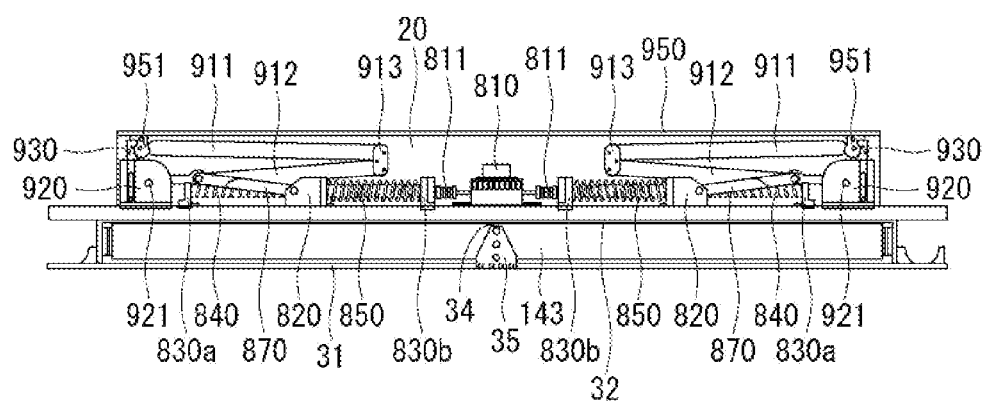

Referring to FIG. 46, a state of the display unit 20 may be the state in which the display unit 20 has been wound on the roller 143 to a maximum extent. The display device 100 may be left and right symmetrical to the motor assembly 810. The height of the top case 950 may be a minimum. The slide 820 may be disposed at a location closest to the inside bearing 830b to a maximum extent. A state of the slide 820 may be the state in which the slide has been trapped at the first stopper 861b. A state of the spring 850 may be the state in which the spring has been compressed to a maximum extent. The pusher 930 may come into contact with the link bracket 951. The height of the pusher 930 may be a minimum.

Figure 47:
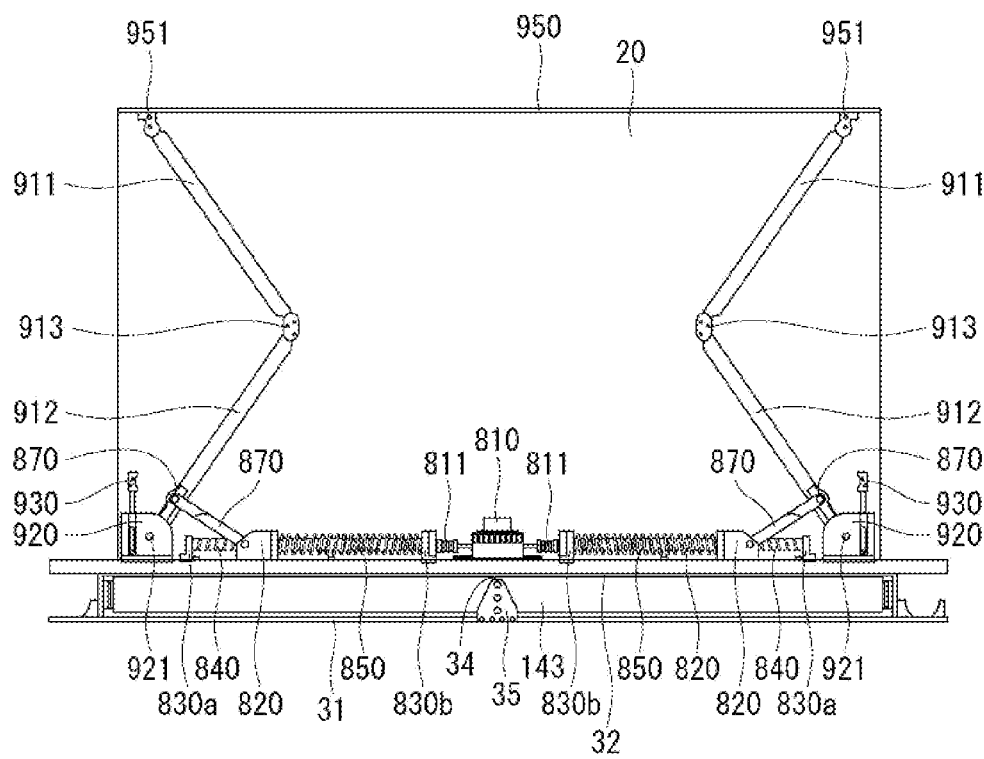

Referring to FIG. 47, a state of the display unit 20 may be the state in which about half the display unit has been wound on the roller 143. The display device 100 may be left and right symmetrical to the motor assembly 810. A state of the display unit 20 may be the state in which about half the display unit has been unwound from the roller 143. The slide 820 may be disposed between the first stopper 861b and the second stopper 861a. The pusher 930 may be separated from the link bracket 951. The height of the pusher 930 may be a maximum.

Figure 48:
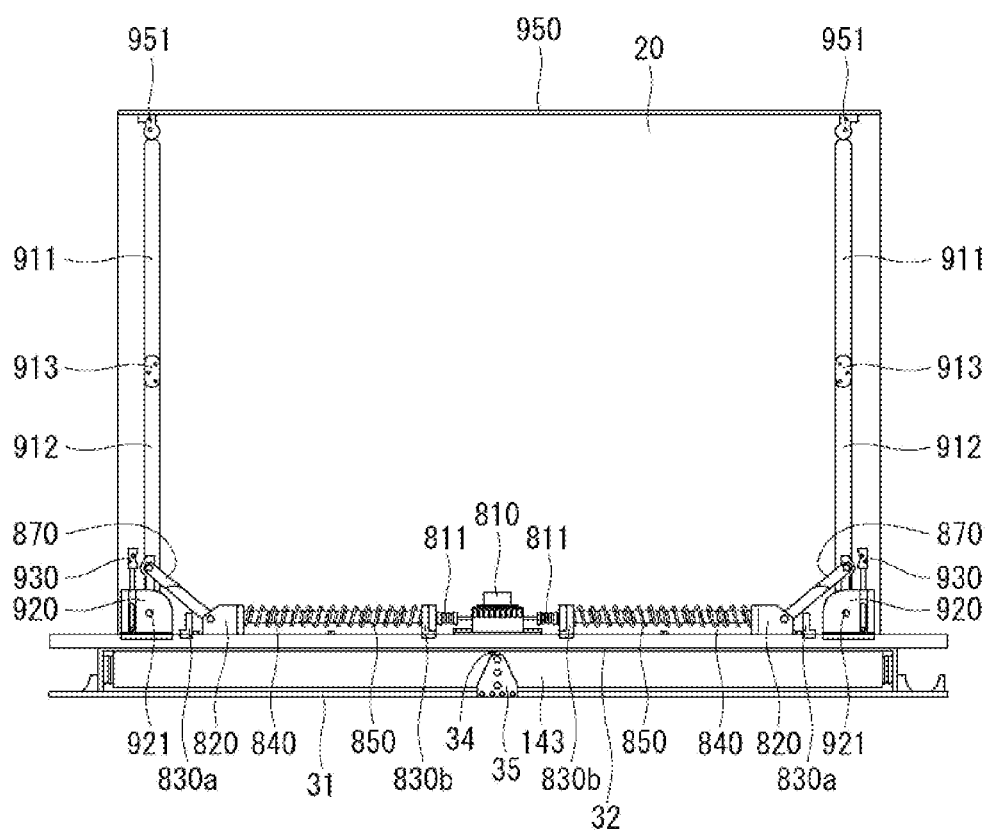

Referring to FIG. 48, a state of the display unit 20 may be the state in which the display unit has been unwound from the roller 143 to a maximum extent. The display device 100 may be left and right symmetrical to the motor assembly 810. The height of the top case 950 may be a maximum. The slide 820 may be disposed at a location closest to the outside bearing 830a to a maximum extent. A state of the slide 820 may be the state in which the slide has been trapped at the second stopper 861a. A state of the spring 850 may be the state in which the spring has been extended to a maximum extent. The pusher 930 may be separated from the link bracket 951. The height of the pusher 930 may be a maximum.

Figure 49:
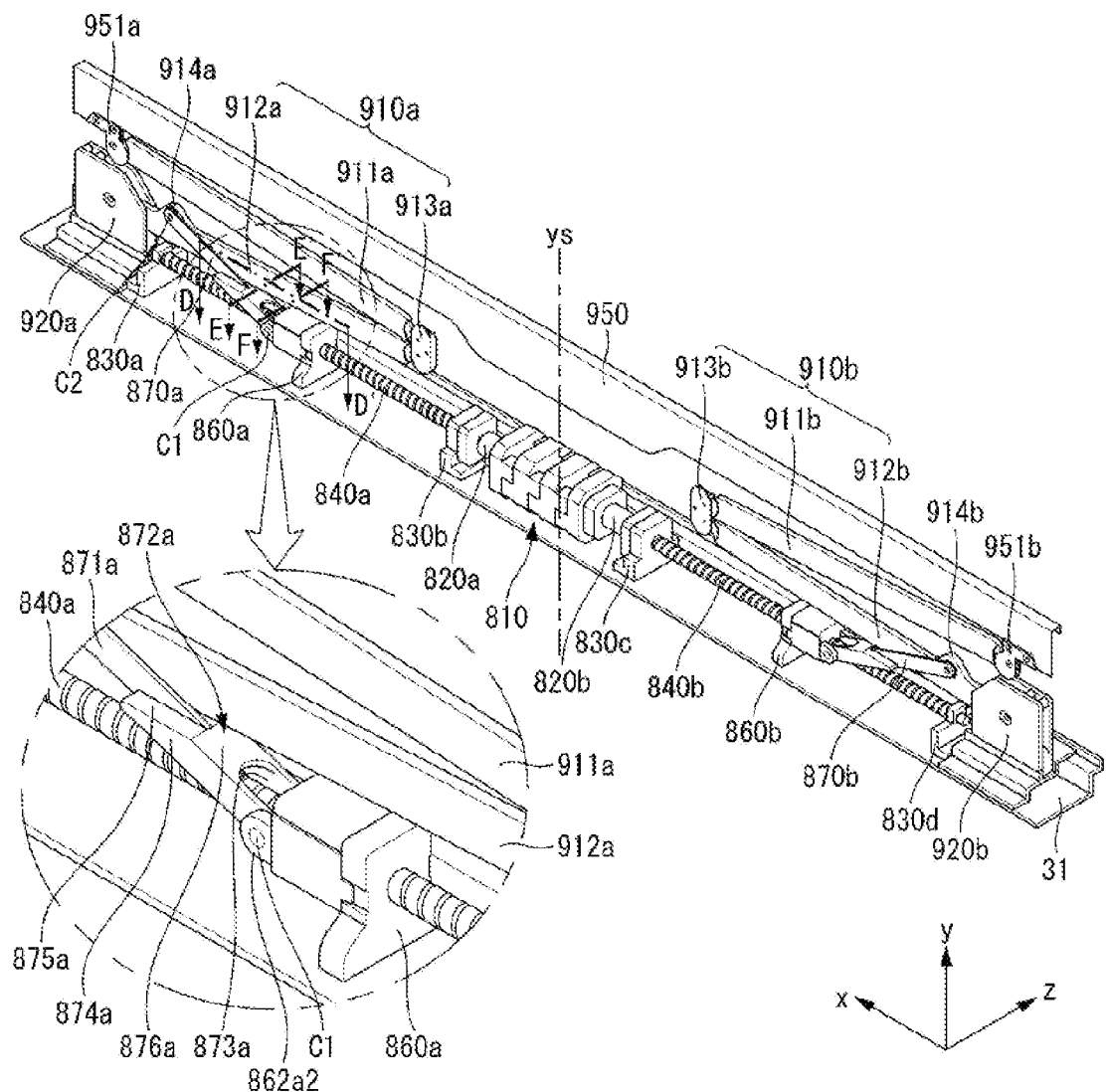
Figure 50:
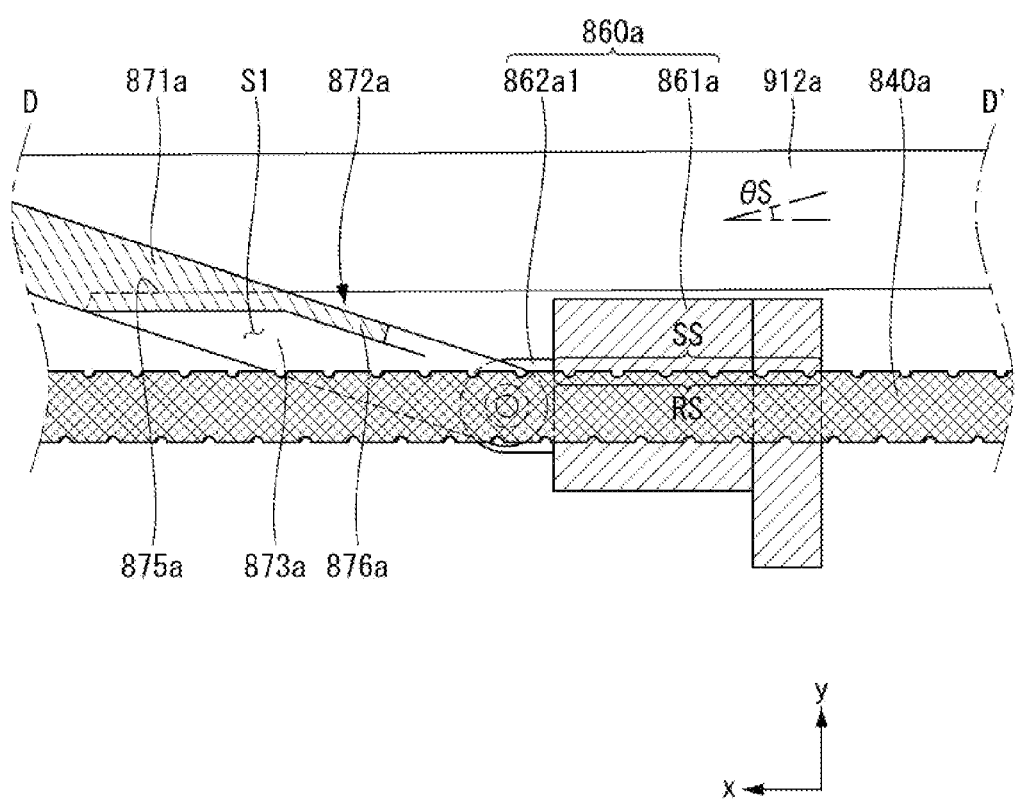
Figure 51:
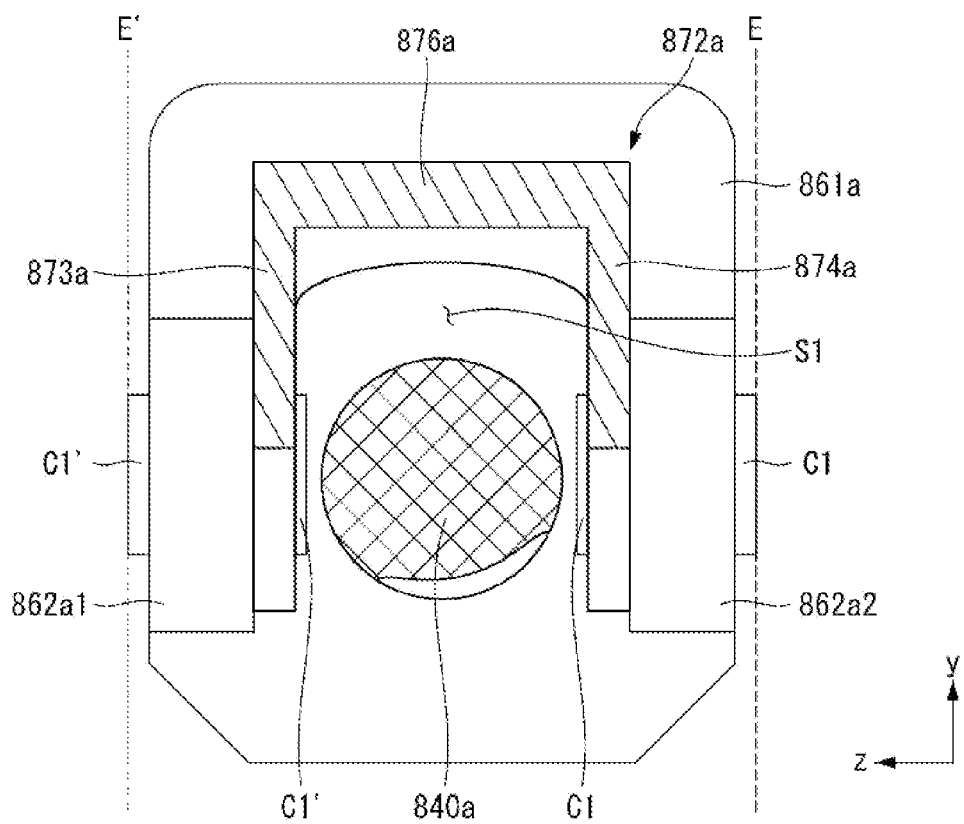
Figure 52:
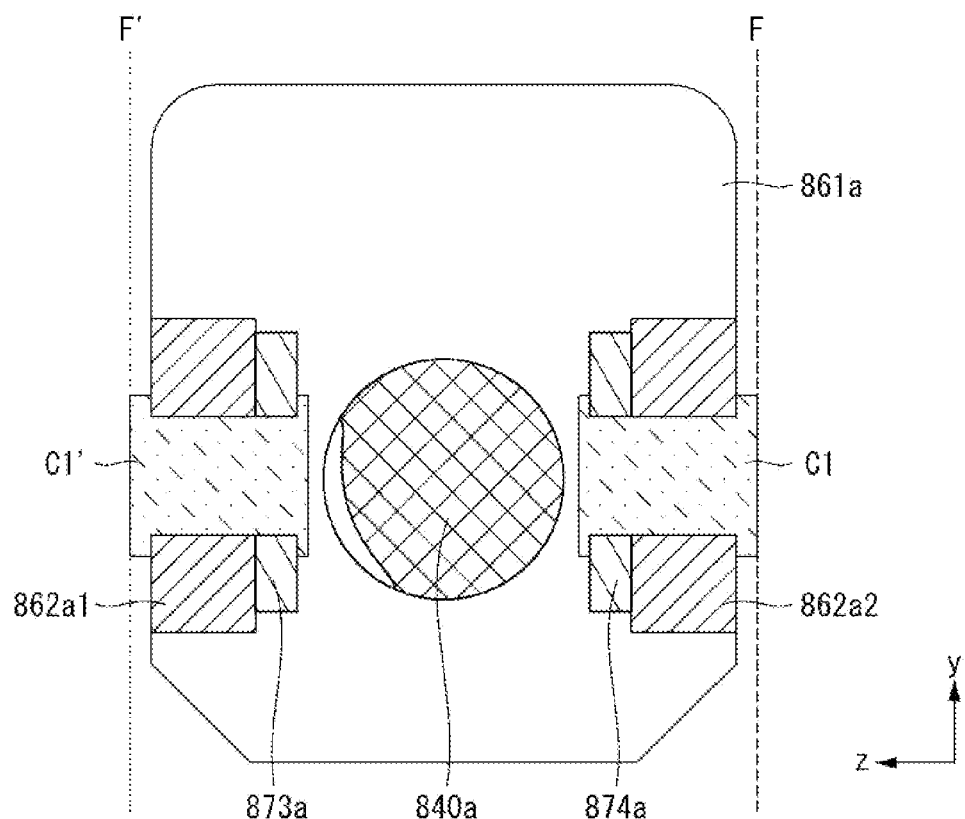

Referring to FIGS. 49 and 50, a link mount 920a, 920b may be installed in the base 31. The link mount 920a, 920b may include a right link mount 920a spaced apart from the first right bearing 830a to the right and a left link mount 920b spaced apart from the second left bearing 830d to the left.

A link 910a, 910b may be connected to the link mount 920a, 920b. The link 910a, 910b may include a right link 910a connected to the right link mount 920a and a left link 910b connected to the left link mount 920b.

The right link 910a may also be called a first link. The left link 910b may also be called a second link. The right link mount 920a may also be called a first link mount 920a. The left link mount 920b may also be called a second link mount 920b.

The link 910a, 910b may include a first arm 911a, 911b, a second arm 912a, 912b, and an arm joint 913a, 913b. One side of the second arm 912a, 912b may be rotatably connected to the link mount 920a, 920b. The other side of the second arm 912a, 912b may be rotatably connected to the arm joint 913a, 913b. One side of the first arm 911a, 911b may be rotatably connected to the arm joint 913a, 913b. The other side of the first arm 911a, 911b may be rotatably connected to a link bracket 951a, 951b.

The link bracket 951a, 951b may include a right link bracket 951a connected to the first arm 911a of the right link 910a and a left link bracket 951b connected to the first arm 911b of the left link 910b. The link bracket 951a, 951b may be connected to the upper bar 950.

The upper bar 950 may connect the right link bracket 951a and the left link bracket 951b.

A rod 870a, 870b may connect a slider 860a, 860b and the link 910a, 910b. One side of the rod 870a, 870b may be rotatably connected to the slider 860a, 860b. The other side of the rod 870a, 870b may be rotatably connected to the second arm 912a, 912b. The rod 870a, 870b may include a right rod 870a that connects the right slider 860a and the second arm 912a of the right link 910a and a left rod 870b that connects the left slider 860b and the second arm 912b of the left link 910b. The right rod 870a may also be called a first rod 870a. The left rod 870b may also be called a second rod 870b.

Specifically, a structure formed by a right lead screw 840a, the right slider 860a, the right rod 870a, and the right link 910a is described. The right slider 860a may include a body 861a and a rod mount 862a. A screw thread SS may be formed in the inner circumference surface of the body 861a. The screw thread formed in the body 861a may be engaged with a screw thread RS of the right lead screw 840a. The right lead screw 840a may penetrate the body 861a.

The rod mount 862a may be formed on the right of the body 861a. The rod mount 862a may be rotatably connected to one side of the right rod 870a. The rod mount 862a may include a first rod mount 862a1 and a second rod mount 862a2. The first rod mount 862a1 may be disposed ahead of the right lead screw 840a. The second rod mount 862a2 may be disposed behind the right lead screw 840a. The first rod mount 862a1 and the second rod mount 862a2 may be spaced apart from each other. The second rod mount 862a2 may be spaced apart from the first rod mount 862a1 in the −z axis direction. The right lead screw 840a may be disposed between the first rod mount 862a1 and the second rod mount 862a2.

The rod mount 862a may be rotatably connected to one side of the rod 870a through a connection member C1. The connection member C1 may penetrate the rod mount 862a and the right rod 870a.

The right rod 870a may be rotatably connected to the second arm 912a through a connection member C2. The connection member C2 may penetrate the second arm 912a and the right rod 870a.

The right rod 870a may include a transfer part 871a connected to the second arm 912a of the right link 910a and a cover 872a connected to the rod mount 862a of the right slider 860a. The transfer part 871a may deliver, to the right link 910a, a force generated as the right slider 860a advances or retreats along the right lead screw 840a.

The cover 872a may include a first plate 873a disposed ahead of the right lead screw 840a. The first plate 873a may be disposed perpendicularly to the base 31. Alternatively, the first plate 873a may face the right lead screw 840a.

The cover 872a may include a second plate 874a disposed behind the right lead screw 840a. The second plate 874a may be disposed perpendicularly to the base 31. Alternatively, the second plate 874a may face the right lead screw 840a. Alternatively, the second plate 874a may be spaced apart from the first plate 873a. The right lead screw 840a may be disposed between the first plate 873a and the second plate 874a.

The cover 872a may include a third plate 875a that connects the first plate 873a and the second plate 874a. The third plate 875a may be connected to the transfer part. The third plate 875a may be disposed over the right lead screw 840a.

The cover 872a may include a fourth plate 876a that connects the first plate 873a and the second plate 874a. The fourth plate 876a may be connected to the third plate 875a. The fourth plate 876a may be disposed over the right lead screw 840a.

One side of the first plate 873a may be connected to the first rod mount 862a1. The first plate 873a and the first rod mount 862a1 may be connected through a connection member Cr. The other side of the first plate 873a may be connected to the third plate 875a.

One side of the second plate 874a may be connected to the second rod mount 862a2. The second plate 874a and the second rod mount 862a2 may be connected through the connection member C1. The other side of the second plate 874a may be connected to the third plate 875a.

When the right slider 860a moves in a way to become close to the motor assembly 810, the right lead screw 840a and the right rod 870a may come into contact with each other. When the right lead screw 840a and the right rod 870a come into contact with each other, mutual interference may occur, and a movement of the right slider 860a may be limited.

A space S1 may be provided within the cover 872a. The first plate 873a, the second plate 874a, the third plate 875a, and the fourth plate 876a may form the space S1. When the right slider 860a moves in a way to become close to the motor assembly 810, the right lead screw 840a may be accommodated into the space S1 provided by the cover 872a or may escape from the space S1. The right slider 860a may move closer to the motor assembly 810 due to the space S1 provided by the cover 872a, compared to a case where the cover 872a is not present. That is, a movable range of the right slider 860a can be increased because the cover 872a provides the space S1 therein. Furthermore, there is an advantage in that the size of the housing 30 (refer to FIG. 8) can be reduced because the right lead screw 840a is accommodated in the cover 872a.

Furthermore, the cover 872a may limit a minimum value of an angle "theta S" formed by the second arm 912a and the base 31. When theta S becomes sufficiently small, the third plate 875a of the cover 872a may come into contact with the second arm 912a and may support the second arm 912a. The third plate 875a can limit a minimum value of theta S and prevent the sag of the second arm 912a by supporting the second arm 912a. That is, the cover 872a can play a role as a stopper for preventing the sag of the second arm 912a. Furthermore, the third plate 875a can reduce an initial load that makes the second arm 912a stand up by limiting a minimum value of theta S.

The lead screws 840a and 840b may be driven by the one motor assembly 810. Since the lead screws 840a and 840b are driven by the one motor assembly 810, the second arms 912a and 912b may stand up while forming symmetry. However, if the lead screws 840a and 840b are driven by the one motor assembly 810, a load applied to the motor assembly 810 in order to make the second arms 912a and 912b stand up may be excessively increased. In this case, the third plate 875a can reduce a load applied to the motor assembly 810 in order to make the second arms 912a and 912b stand up by limiting a minimum value of theta S.

A structure formed by the left lead screw 840b, the left slider 860b, the left rod 870b, and the left link 910b may be symmetrical to a structure formed by the right lead screw 840a, the right slider 860a, the right rod 870a, and the right link 910a. In this case, a symmetry axis may be a symmetry axis ys of the motor assembly 810.

Figure 53:
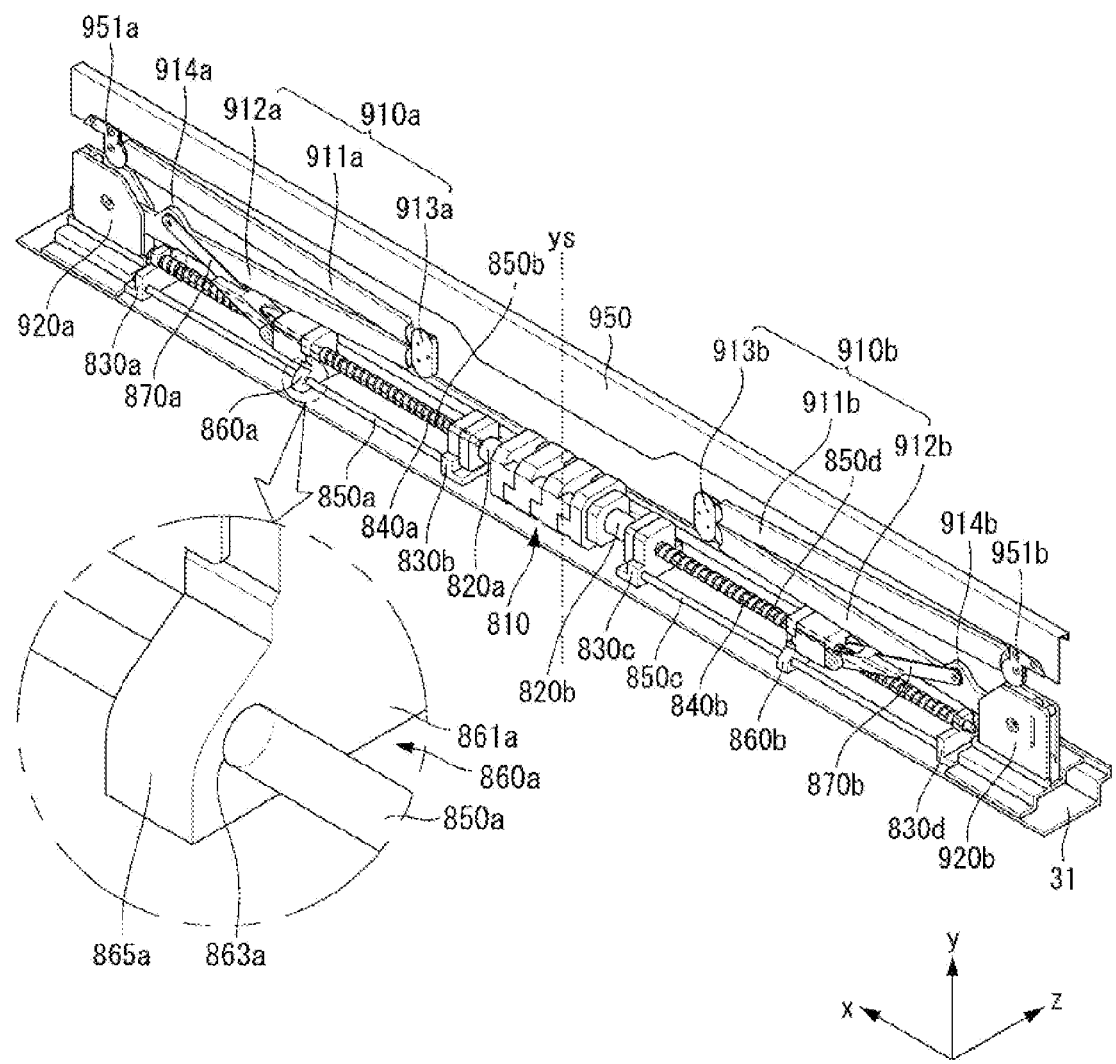

Referring to FIG. 53, guides 850a, 850b, 850c, and 850d may be connected to the bearings 830a, 830b, 830c, and 830d. The guides 850a, 850b, 850c, and 850d may include right guides 850a and 850b disposed on the right of the motor assembly 810 and left guides 850c and 850d disposed on the left of the motor assembly 810.

The right guide 850a, 850b may have one side connected to the first right bearing 830a and have the other side connected to the second right bearing 830b. The right guide 850a, 850b may be disposed in parallel to the right lead screw 840a. Alternatively, the right guide 850a, 850b may be spaced apart from the right lead screw 840a.

The right guides 850a and 850b may include the first right guide 850a and the second right guide 850b. The first right guide 850a and the second right guide 850b may be spaced apart from each other. The right lead screw 840a may be disposed between the first right guide 850a and the second right guide 850b.

The right slider 860a may include a protrusion part. Alternatively, the display device may include a protrusion part formed in the right slider 860a. The protrusion part may be formed in the body of the slider. The protrusion part may include a front protrusion part (not illustrated) that protrudes in the +z axis direction from the body 861a of the right slider 860a and a rear protrusion part 865a that protrudes in the −z axis direction from the body of the slider.

The first right guide 850a may penetrate a rear protrusion part 865a. Alternatively, the first right guide 850a may include a first hole 863a formed in the rear protrusion part. The first right guide 850a may pass through the first hole 863a. The first hole 863a may be formed in x axis direction. The first hole 863a may also be called a hole 863a.

A second right guide (not illustrated) may penetrate the front protrusion part (not illustrated). Alternatively, the second right guide may include a second hole (not illustrated) formed in the front protrusion part. The second right guide may pass through the second hole. The second hole may be formed in the x axis direction.

The right guide 850a, 850b may guide the right slider 860a so that the right slider 860a can more stably move when the right slider 860a advances or retreats along the right lead screw 840a. Since the right guide 850a, 850b stably guides the right slider 860a, the right slider 860a can advance or retreat along the right lead screw 840a without rotating around the right lead screw 840a.

A structure formed by the left guides 850c and 850d, the left bearings 830a, 830b, 830c, and 830d, the left slider 860b, and the left lead screw 840b may be symmetrical to the aforementioned structure formed by the right guides 850a and 850b, the right bearings 830a, 830b, 830c, and 830d, the right slider 860a, and the right lead screw 840a. In this case, a symmetry axis may be the symmetry axis ys of the motor assembly 810.

Figure 54:
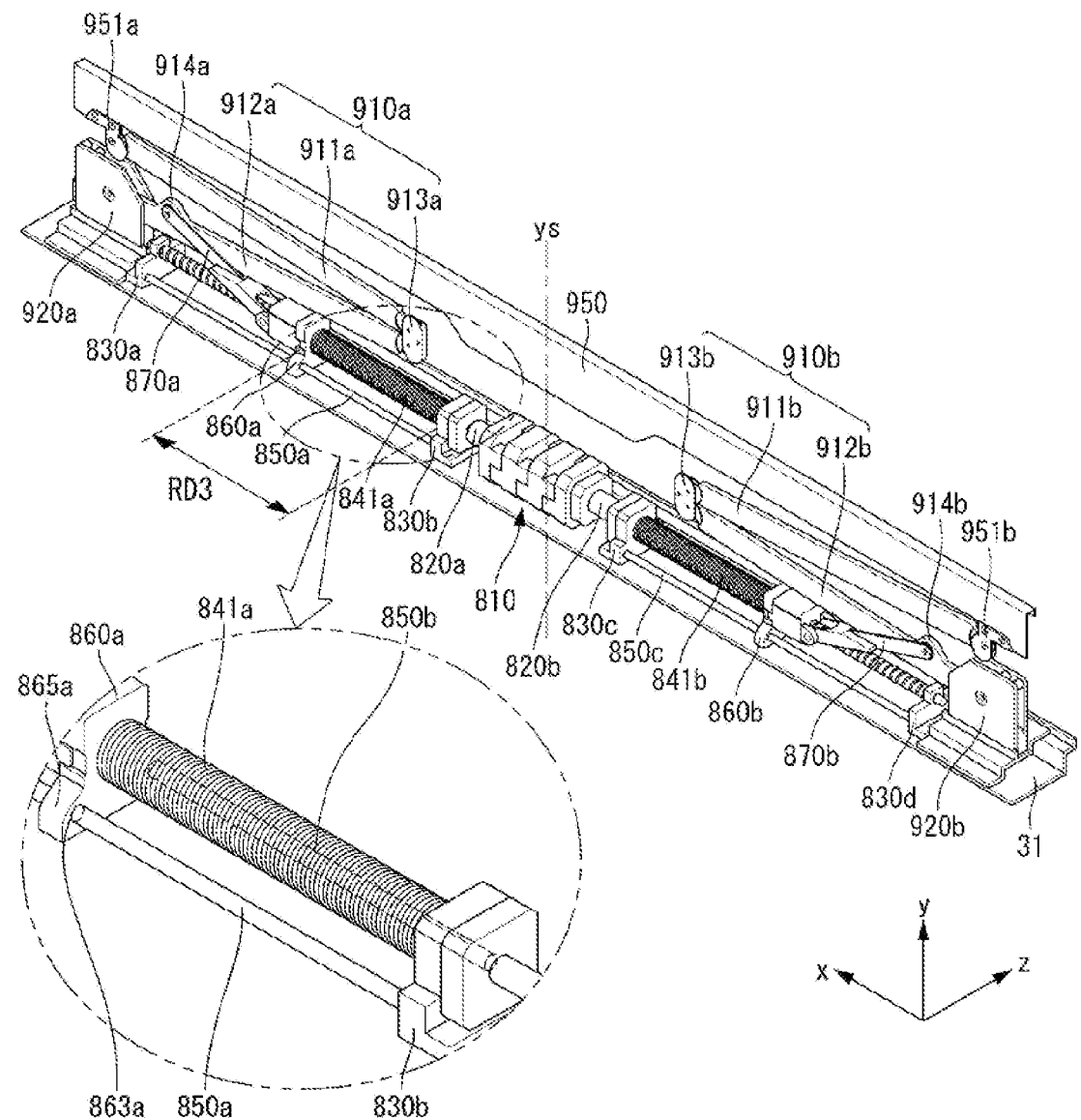

Referring to FIG. 54, a first spring 841a, 841b may be inserted into the lead screw 840a, 840b. Alternatively, the lead screw 840a, 840b may penetrate the first spring 841a, 841b. The first spring 841a, 841b may include a first right spring 841a disposed on the right of the motor assembly 810 and a first left spring 841b disposed on the left of the motor assembly 810.

The first right spring 841a may be disposed between the right slider 860a and the second right bearing 830b. One end of the first right spring 841a may come into contact with or may be separated from the right slider 860a. The other end of the first right spring 841a may come into contact with or may be separated from the second right bearing 830b.

If the second arm 912a has completely lied down with respect to the base 31, the distance between the right slider 860a and the second right bearing 830b may be a distance RD3. The first right spring 841a may have a length greater than the distance RD3 in the state in which the first right spring 841a has not been compressed or extended. Accordingly, if the second arm 912a has completely lied down with respect to the base 31, the first right spring 841a may be compressed between the right slider 860a and the second right bearing 830b. Furthermore, the first right spring 841a may provide a restoring force to the right slider 860a in the +x axis direction.

If the second arm 912a changes from the state in which the second arm 912a has completely lied down with respect to the base 31 to the state in which the second arm 912a stands up, a restoring force provided by the first right spring 841a may assist the second arm 912a to stand up. Since the first right spring 841a assists the second arm 912a to stand up, a load of the motor assembly 810 can be reduced.

The lead screws 840a and 840b may be driven by the one motor assembly 810. Since the lead screws 840a and 840b are driven by the one motor assembly 810, the second arm 912a, 912b may stand up while forming symmetry. However, if the lead screws 840a and 840b are driven by the one motor assembly 810, a load applied to the motor assembly 810 in order to make the second arms 912a and 912b stand up may be excessively increased. In this case, since the first right spring 841a assists the second arm 912a to stand up, a load of the motor assembly 810 can be reduced, and a load applied to the motor assembly 810 in order to make the second arm 912a stand up can be reduced.

Alternatively, if the second arm 912a changes from the state in which the second arm 912 has stood up with respect to the base 31 to the state in which the second arm 912 completely lies down, a restoring force provided by the first right spring 841a can reduce an impact occurring when the second arm 912a lies down with respect to the base 31. That is, the first right spring 841a can play a role as a damper when the second arm 912a lies down with respect to the base 31. Since the first right spring 841a plays a role as a damper, a load of the motor assembly 810 can be reduced.

A structure formed by the first left spring 841b, the left bearings 830a, 830b, 830c, and 830d, the left slider 860b, the left lead screw 840b, and the second arm 912a may be symmetrical to the aforementioned structure formed by the first right spring 841a, the right bearings 830a, 830b, 830c, and 830d, the right slider 860a, the right lead screw 840a, and the second arm 912a. In this case, a symmetry axis may be the symmetry axis ys of the motor assembly 810.

Figure 55:
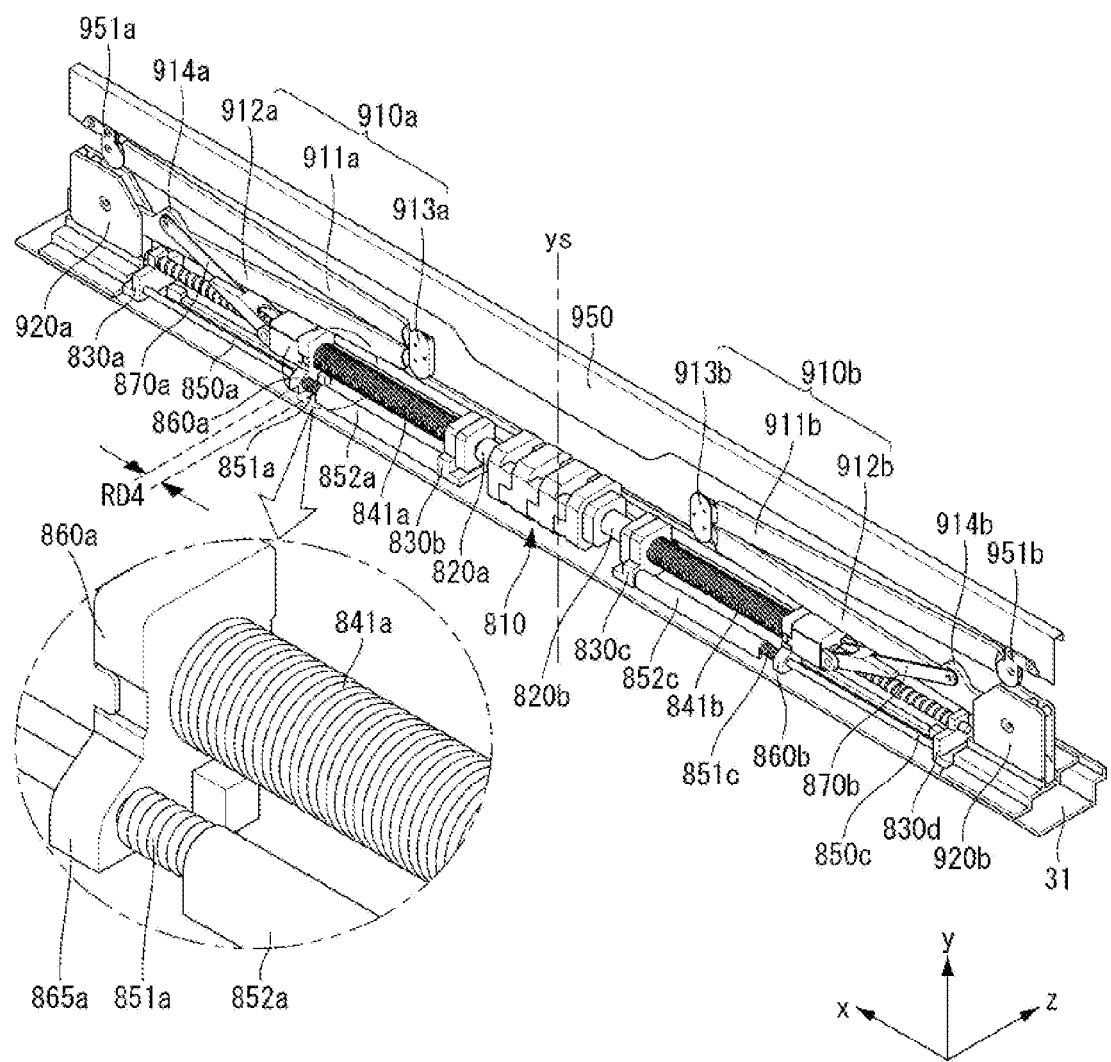

Referring to FIG. 55, a second spring 851a, 851b may be inserted into the guide 850a, 850b, 850c, 850d. Alternatively, the guide 850a, 850b, 850c, 850d may penetrate the second spring 851a, 851b. The second spring 851a, 851b may include a second right spring 851a disposed on the right of the motor assembly 810 and a second left spring 851b disposed on the left of the motor assembly 810.

The second right spring 851a may be formed in plural. The second right spring 851a may include a spring 940a, 940b inserted into the first right guide 850a and a spring 940a, 940b inserted into the second right guide 850b. Alternatively, the second right spring 851a may include the spring 940a, 940b through which the first right guide 850a penetrates and the spring 940a, 940b through which the second right guide 850b penetrates.

The guide 850a, 850b, 850c, 850d may include a hanging jaw 852a, 852b. The hanging jaw 852a, 852b may include a right hanging jaw 852a disposed on the right of the motor assembly 810 and a left hanging jaw 852b disposed on the left of the motor assembly 810.

The right hanging jaw 852a may be disposed between the right slider 860a and the second right bearing 830b. Furthermore, the second right spring 851a may be disposed between the right slider 860a and the second right bearing 830b. One end of the second right spring 851a may come into contact with or may be separated from the right slider 860a and. The other end of the second right spring 851a may come into contact with or may be separated from the right hanging jaw 852a.

If the second arm 912a has completely lied down with respect to the base 31, the distance between the right slider 860a and the right hanging jaw 852a may be a distance RD4. The second right spring 851a may have a length greater than the distance RD4 in the state in which the second right spring 851a has not been compressed or extended. Accordingly, if the second arm 912a has completely lied down with respect to the base 31, the second right spring 851a may be compressed between the right slider 860a and the right hanging jaw 852a. Furthermore, the second right spring 851a may provide a restoring force to the right slider 860a in the +x axis direction.

If the second arm 912a changes from the state in which the second arm 912a has completely lied down with respect to the base 31 to the state in which the second arm 912a stands up, a restoring force provided by the second right spring 851a may assist the second arm 912a to stand up. Since the second right spring 851a assists the second arm 912a to stand up, a load of the motor assembly 810 can be reduced.

The lead screws 840a and 840b may be driven by the one motor assembly 810. Since the lead screws 840a and 840b are driven by the one motor assembly 810, the second arms 912a and 912b may stand up while forming symmetry. However, if the lead screws 840a and 840b are driven by the one motor assembly 810, a load applied to the motor assembly 810 in order to make the second arm 912a, 912b stand up may be excessively increased. In this case, since the second right spring 851a assists the second arm 912a to stand up, a load of the motor assembly 810 can be reduced, and a load applied to the motor assembly 810 in order to make the second arm 912a stand up can be reduced.

Alternatively, if the second arm 912a changes from the state in which the second arm 912a has stood up with respect to the base 31 to the state in which the second arm 912a completely lies down, a restoring force provided by the second right spring 851a can reduce an impact occurring when the second arm 912a lies down with respect to the base 31. That is, the second right spring 851a can play a role as a damper when the second arm 912a lies down with respect to the base 31. Since the second right spring 851a plays a role as a damper, a load of the motor assembly 810 can be reduced.

A structure formed by the second left spring 851b, the left hanging jaw 852b, the left slider 860b, the left guides 850c and 850d, and the second arm 912a may be symmetrical to the aforementioned structure formed by the second right spring 851a, the right hanging jaw 852a, the right slider 860a, the right guides 850a and 850b, and the second arm 912a. In this case, a symmetry axis may be the symmetry axis ys of the motor assembly 810.

Figure 56:
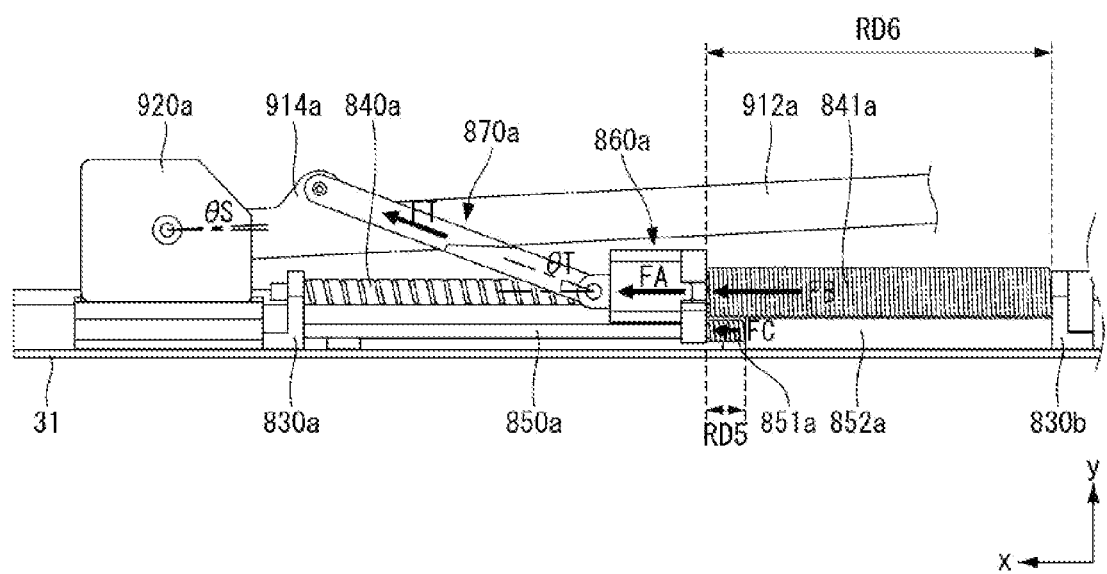
Figure 57:
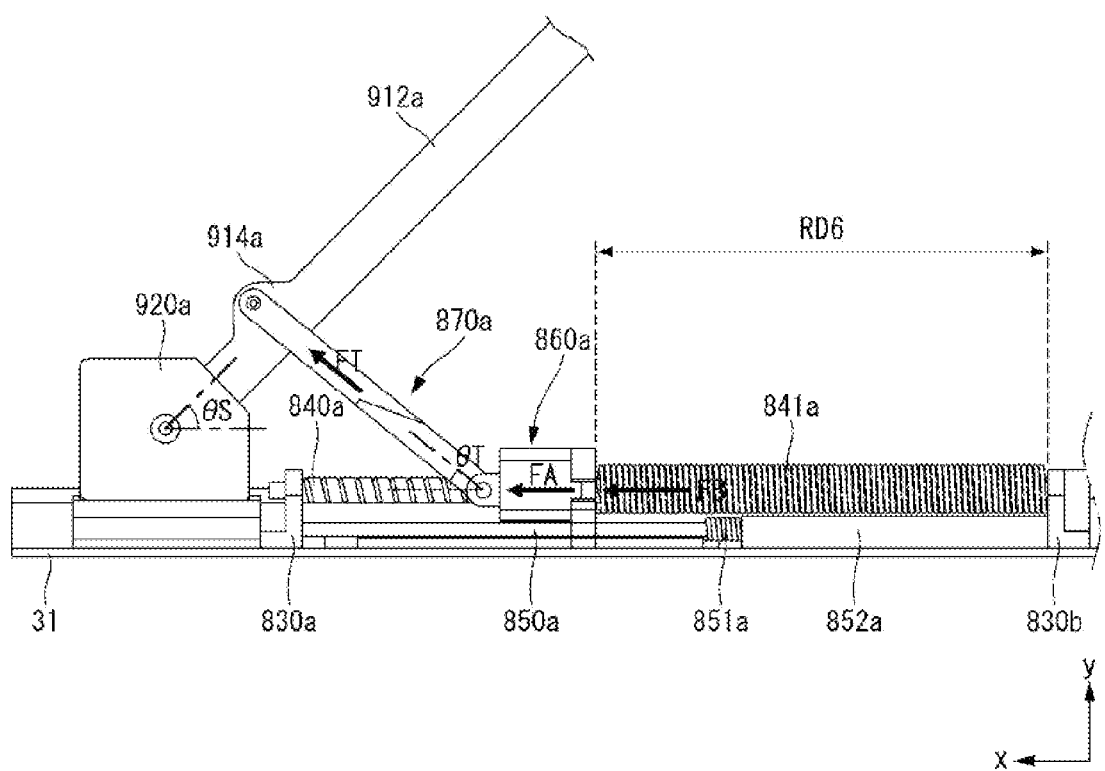
Figure 58:
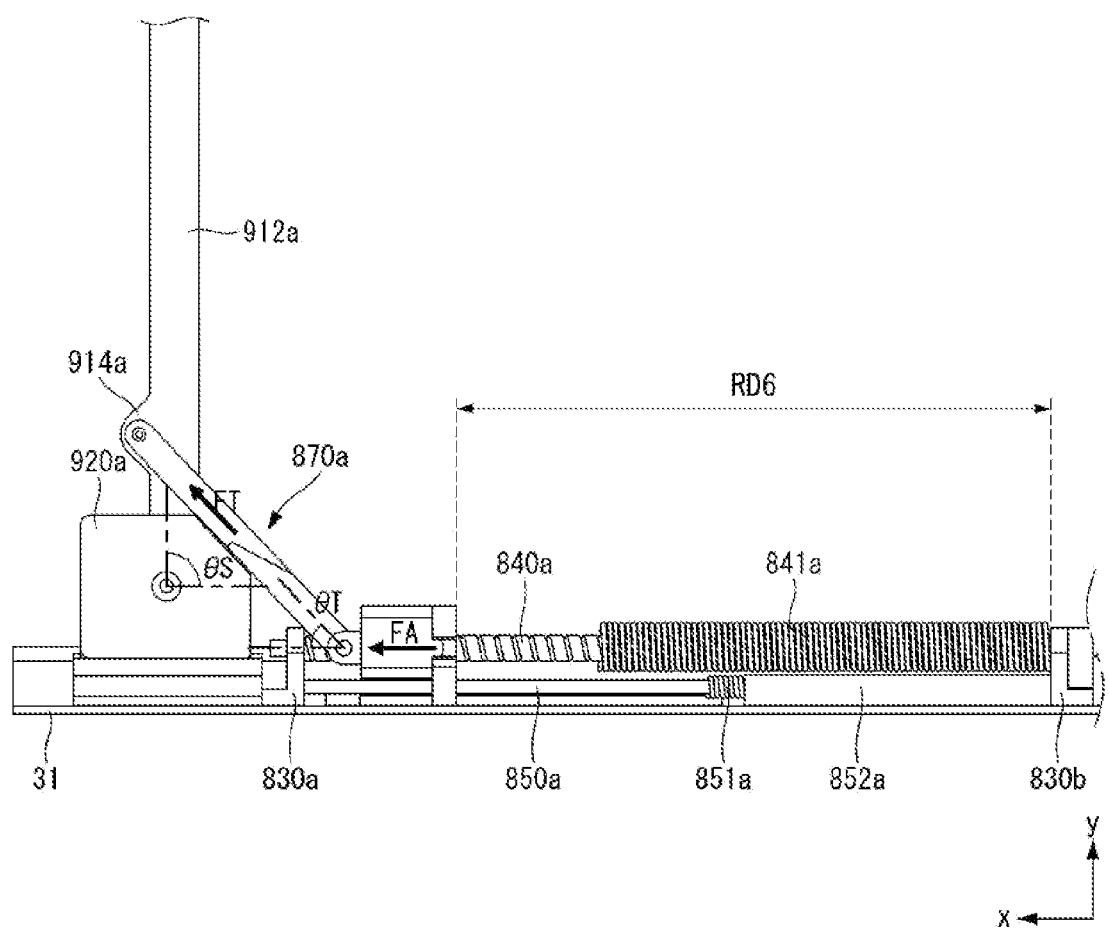

Referring to FIGS. 56 to 58, the second arm 912a may stand up by restoring forces provided by the first right spring 841a and the second right spring 851a.

An angle formed by the second arm 912a and the base 31 may be called an angle theta S. An angle formed by the right rod 870a and the base 31 may be called an angle theta T. A force that the motor assembly 810 moves the right slider 860a in the +x axis direction may be called FA. A force applied from the first right spring 841a to the right slider 860a may be called FB. A force applied from the second right spring 851a to the right slider 860a may be called FC. A force delivered from the right rod 870a to the second arm 912a may be called FT.

If the second arm 912a has completely lied down with respect to the base 31, each of the angle theta S and the angle theta T may have a minimum value. If the second arm 912a changes from the state in which the second arm 912a has completely lied down with respect to the second base 31 to the state in which the second arm 912a stands up, the angle theta S and the angle theta T may be gradually increased.

If the second arm 912a has completely lied down with respect to the base 31, the first right spring 841a may be compressed. The compressed first right spring 841a may provide the right slider 860a with the restoring force FB. The restoring force FB acts in the +x direction. If the second arm 912a has completely lied down with respect to the base 31, a compressive displacement of the first right spring 841a may be a maximum, and the size of the restoring force FB may have a maximum value. If the second arm 912a changes from the state in which the second arm 912a has completely lied down with respect to the base 31 to the state in which the second arm 912a stands up, a compressive displacement of the first right spring 841a may be gradually decreased, and the size of the restoring force FB may be gradually decreased.

If the second arm 912a has completely lied down with respect to the base 31, the second right spring 851a may be compressed. The compressed second right spring 851a may provide the right slider 860a with the restoring force FC. The restoring force FC may act in the +x direction. If the second arm 912a has completely lied down with respect to the base 31, a compressive displacement of the second right spring 851a may be a maximum, and the size of the restoring force FC may have a maximum value. If the second arm 912a changes from the state in which the second arm 912a has completely lied down with respect to the base 31 to the state in which the second arm 912a stands up, a compressive displacement of the second right spring 851a may be gradually decreased, and the size of the restoring force FC may be gradually decreased.

The force FT delivered from the right rod 870a to the second arm 912a may be a resultant force of the force FA that the motor assembly 810 moves the right slider 860a in the +x axis, the restoring force FB of the first right spring 841a, and the restoring force FC of the second right spring 851a.

If the second arm 912a starts to stand up from the state in which the second arm 912a has completely lied down with respect to the base 31, a load of the motor assembly 810 may be a maximum. In this case, the size of the restoring force FB provided by the first right spring 841a may be a maximum. Furthermore, the size of the restoring force FC provided by the second spring 851a, 851b may be a maximum.

If the second arm 912a changes from the state in which the second arm 912a has completely lied down with respect to the base 31 to the state in which the second arm 912a stands up, a restoring force provided by the first right spring 841a and the second right spring 851a may assist the second arm 912a to stand up. Since the first right spring 841a and the second right spring 851a assist the second arm 912a to stand up, a load of the motor assembly 810 can be reduced.

The first right spring 841a and the second right spring 851a can simultaneously provide the right slider 860a with a restoring force (a resultant force of the restoring force FB and the restoring force FC). The restoring force (the resultant force of the restoring force FB and the restoring force FC) may be provided to the right slider 860a until a distance RD5 between the right slider 860a and the right hanging jaw 852a becomes equal to the length of the second right spring 851a.

When the distance RD5 between the right slider 860a and the right hanging jaw 852a becomes equal to the length of the second right spring 851a, a compressive displacement of the second right spring 851a may become 0. When the compressive displacement of the second right spring 851a becomes 0, the restoring force FC provided from the second right spring 851a to the right slider 860a may become 0.

When the distance RD5 between the right slider 860a and the right hanging jaw 852a becomes greater than the length of the second right spring 851a, only the first right spring 841a may provide the right slider 860a with the restoring force FB. The restoring force FB may be provided to the right slider 860a until a distance RD6 between the right slider 860a and the second right bearing 830b becomes equal to the length of the first right spring 841a.

When the distance RD6 between the right slider 860a and the second right bearing 830b becomes equal to the length of the first right spring 841a, a compressive displacement of the first right spring 841a may become 0. When the compressive displacement of the first right spring 841a becomes 0, the restoring force FB provided from the first right spring 841a to the right slider 860a may become 0.

When the distance RD6 between the right slider 860a and the second right bearing 830b becomes greater than the length of the first right spring 841a, the motor assembly 810 can make the second arm 912a stand up without being provided with a restoring force from the first right spring 841a or the second right spring 851a.

A structure formed by the first left spring 841b, the second left spring 851b, the left hanging jaw 852b, the left slider 860b, the left guides 850c and 850d, the left lead screw 840b, the left rod 870b, and the second arm 912a may be symmetrical to the aforementioned structure formed by the first right spring 841a, the second right spring 851a, the right hanging jaw 852a, the right slider 860a, the right guides 850a and 850b, the right lead screw 840a, the right rod 870a, and the second arm 912a. In this case, the symmetry axis may be the symmetry axis ys of the motor assembly 810.

Figure 59:
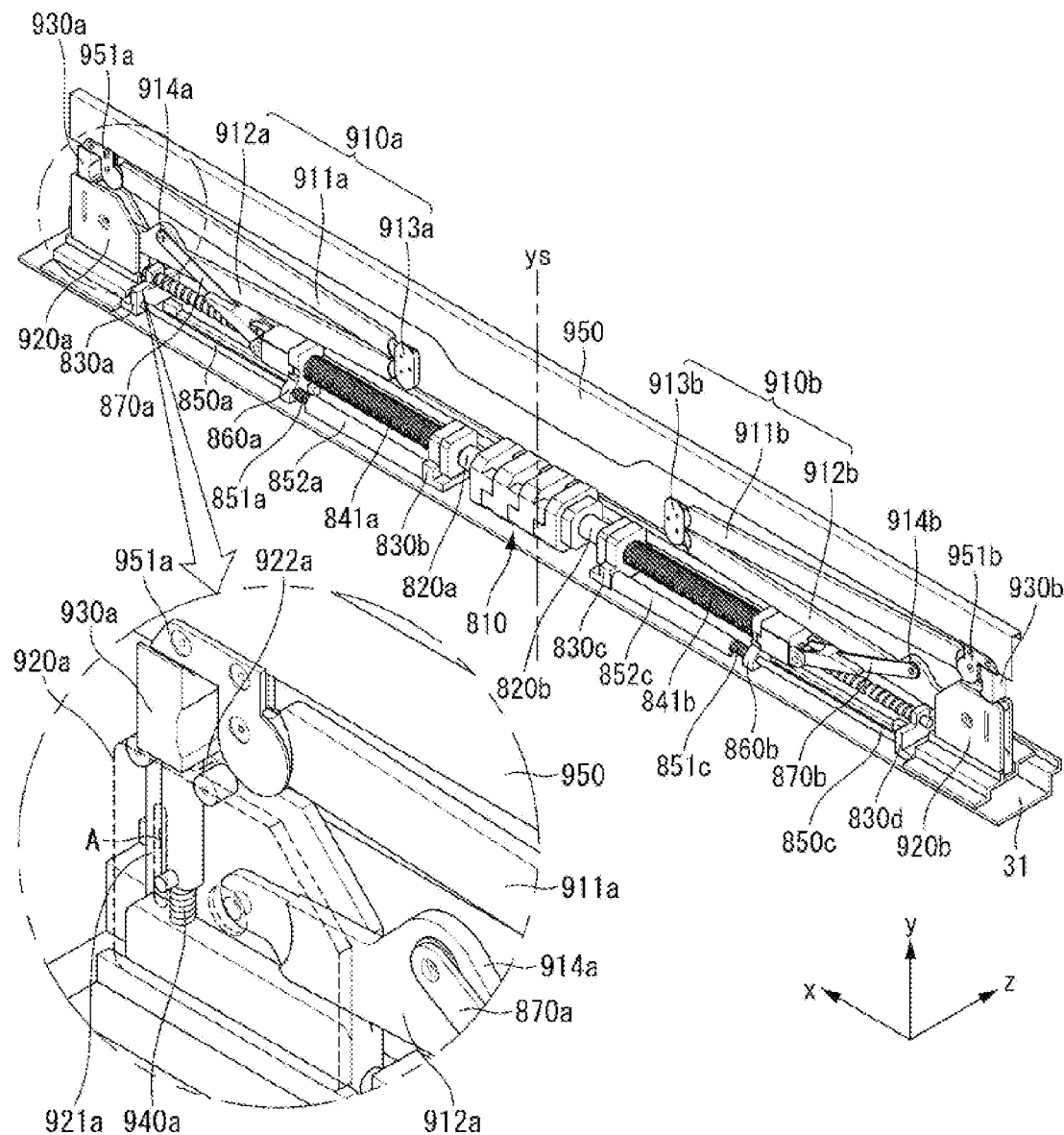

Referring to FIG. 59, a pusher 930a, 930b may be connected to the link mount 920a, 920b. The pusher 930a, 930b may include a right pusher 930a disposed on the right of the motor assembly 810 and a left pusher 930b disposed on the left of the motor assembly 810.

The link mount 920a, 920b may form an accommodation space A. The accommodation space A may accommodate a spring 940a, 940b and the pusher 930a, 930b. The spring 940a, 940b may include the right spring 940a disposed on the right of the motor assembly 810 and the left spring 940*b* disposed on the left of the motor assembly 810. The accommodation space A may also be called an internal space A.

The link mount 920*a*, 920*b* may include a first hole 922*a* that connects the accommodation space A and an external space (a first hole corresponding to 920*b* is not illustrated). The first hole 922*a* may be formed in the top of the link mount 920*a*, 920*b*. The first hole 922*a* may also be called a hole 922*a*.

The pusher 930*a*, 930*b* may be disposed perpendicularly to the base 31. Alternatively, the pusher 930*a*, 930*b* may be disposed in parallel to the y axis. The spring 940*a*, 940*b* may be disposed perpendicularly to the base 31. Alternatively, the spring 940*a*, 940*b* may be disposed in parallel to the y axis.

The pusher 930*a*, 930*b* may include a first part 931*a*, 931*b* and a second part 932*a*, 932*b*. The second part 932*a*, 932*b* may be connected to the lower side of the first part 931*a*, 931*b*. The bottom of the second part 932*a*, 932*b* may be connected to the spring 940*a*, 940*b*. A part of or the entire second part 932*a*, 932*b* may be accommodated in the accommodation space A formed by the link mount 920*a*, 920*b*. The second part 932*a*, 932*b* may have the same diameter as the first hole 922*a* or may have a smaller diameter than the first hole 922*a*. The second part 932*a*, 932*b* may pass through the first hole 922*a*.

The first part 931*a*, 931*b* may be disposed outside the link mount 920*a*, 920*b*. Alternatively, the first part 931*a*, 931*b* may be disposed outside the accommodation space A of the link mount 920*a*, 920*b*. The first part 931*a*, 931*b* may have a greater diameter than the first hole 922*a*.

The first part 931*a*, 931*b* may come into contact with or may be spaced apart from the link bracket 951*a*, 951*b*. For example, if the second arms 912*a* and 912*b* have completely lied down with respect to the base 31, the first parts 931*a* and 931*b* may come into contact with the link brackets 951*a* and 951*b*. Alternatively, if the second arms 912*a* and 912*b* have completely stood up with respect to the base 31, the first parts 931*a* and 931*b* may be spaced apart from the link brackets 951*a* and 951*b*.

When the first part 931*a*, 931*b* comes into contact with the link bracket 951*a*, 951*b*, the pusher 930*a*, 930*b* may be provided with a force from the link bracket 951*a*, 951*b*. The force applied to the pusher 930*a*, 930*b* may have the lower direction. Alternatively, the force applied to the pusher 930*a*, 930*b* may have the −y axis direction. Alternatively, the link bracket 951*a*, 951*b* may pressurize the pusher 930*a*, 930*b*. A direction in which the link bracket 951*a*, 951*b* pressurizes the pusher 930*a*, 930*b* may be the lower direction. Alternatively, a direction in which the link bracket 951*a*, 951*b* pressurizes the pusher 930*a*, 930*b* may be the −y axis direction.

When the force is applied to the first part 931*a*, 931*b*, the spring 940*a*, 940*b* may be compressed. The compressed spring 940*a*, 940*b* may provide a restoring force to the pusher 930*a*, 930*b*. The restoring force may be a direction opposite to the direction of the force applied to the first part 931*a*, 931*b*. Alternatively, the restoring force may act in the +y axis direction.

The link mount 920*a*, 920*b* may include a second hole 921*a* (a second hole corresponding to 920*b* is not illustrated). The second hole 921*a* may connect the accommodation space A and an external space. A part of or the entire spring 940*a*, 940*b* may be exposed to the outside through the second hole 921*a*. A part of or the entire pusher 930*a*, 930*b* may be exposed to the outside through the second hole 921*a*. When the display device is maintained or repaired, a service provider may check an operating state of the pusher 930*a*, 930*b* through the second hole 921*a*. The second hole 921*a* may provide the service provider with convenience of maintenance or repair.

Figure 60:
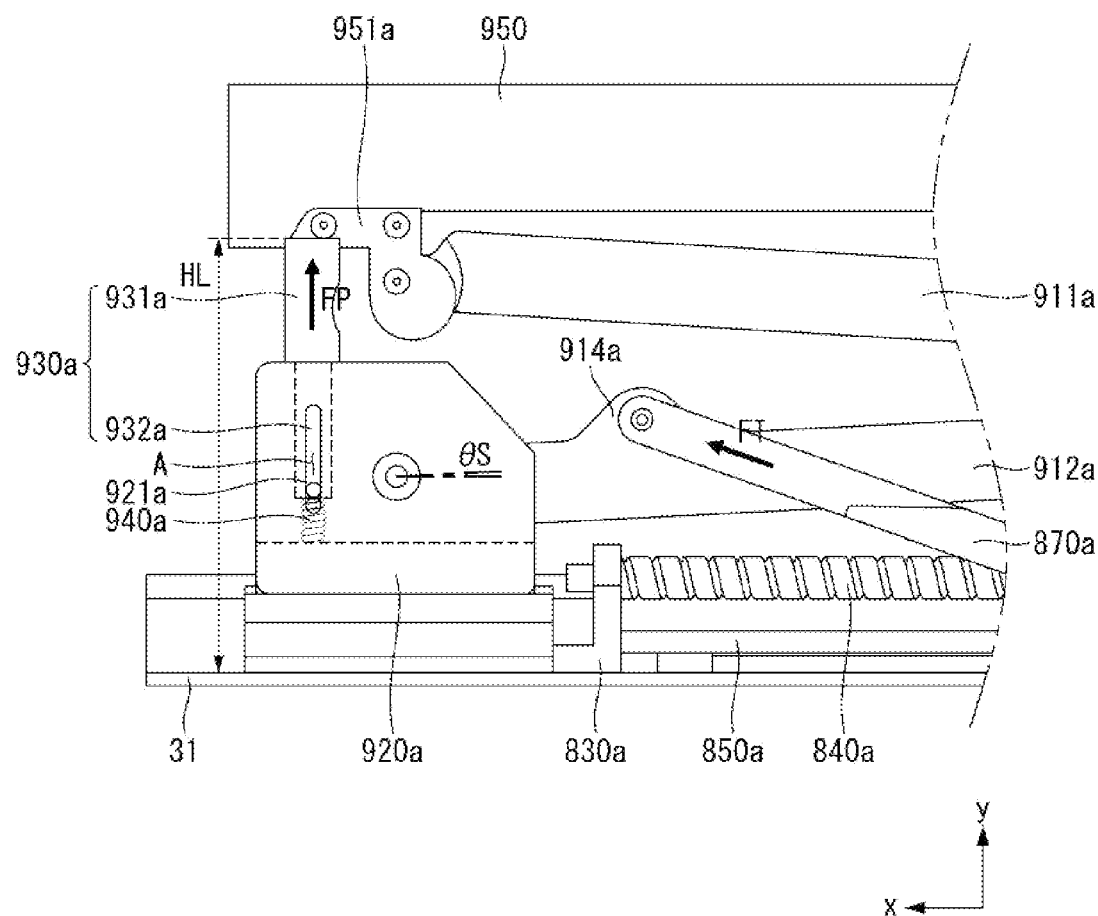
Figure 61:
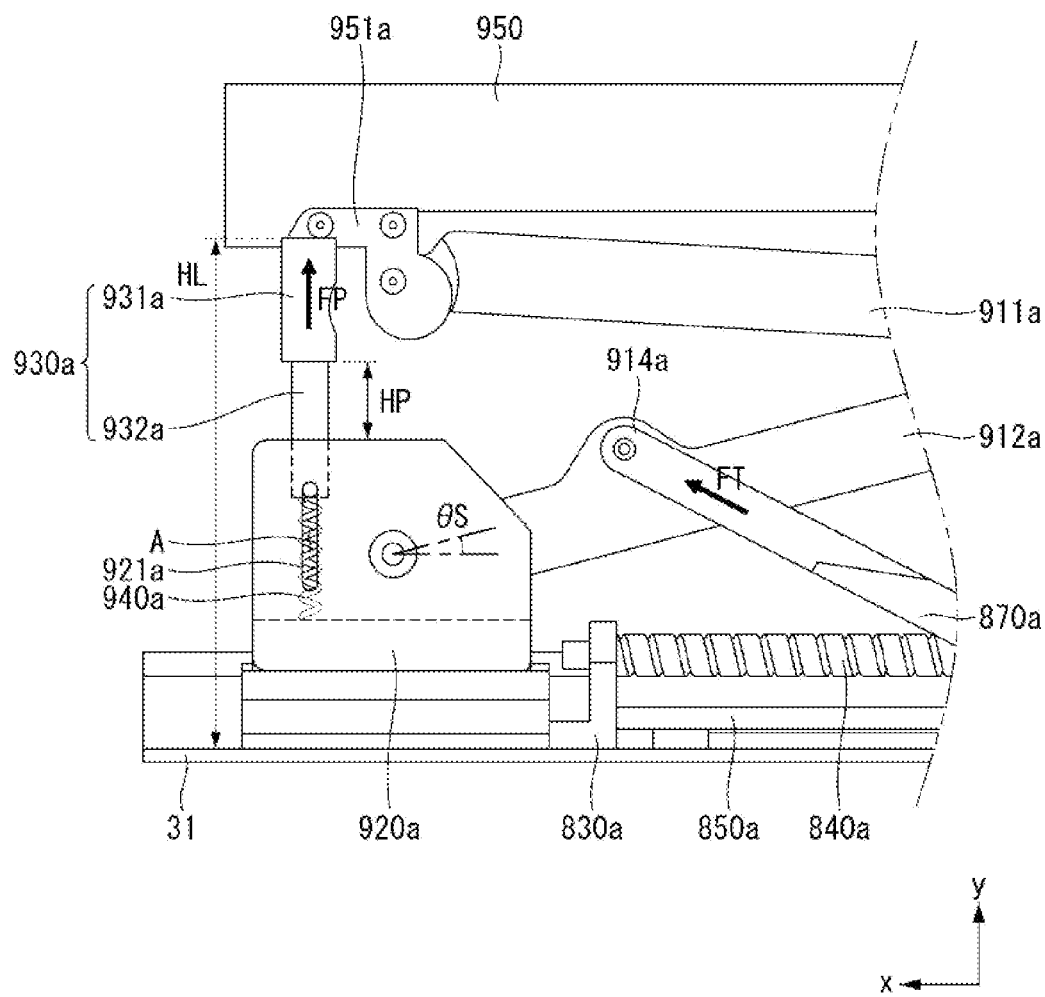
Figure 62:
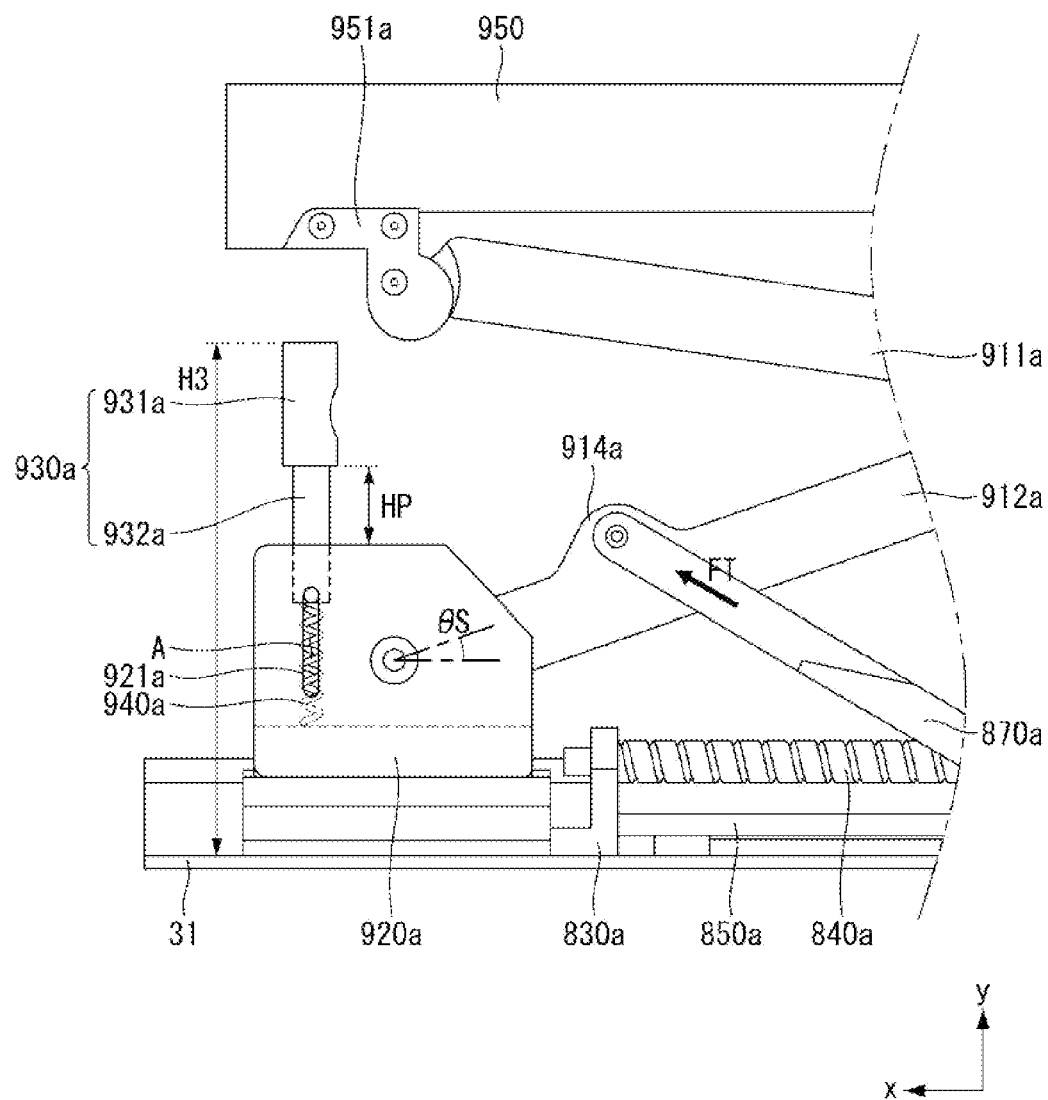

Referring to FIGS. 60 to 62, the right link 910*a* may stand up by a restoring force provided by the right pusher 930*a*. The right link 910*a* is described as a basis.

An angle formed by the second arm 912*a* and the base 31 may be called an angle theta S. A force delivered from the right rod 870*a* to the second arm 912*a* may be called FT. A force delivered from the right pusher 930*a* to the right link bracket 951*a* may be called FP.

Referring to FIG. 60, if the second arm 912*a* has completely lied down with respect to the base 31, the angle theta S may have a minimum value. The right spring 940*a* connected to the right pusher 930*a* may be compressed to a maximum extent, and the size of the restoring force FP may have a maximum value. The compressed right spring 940*a* may provide the right pusher 930*a* with the restoring force FP. The right pusher 930*a* may deliver the restoring force FP to the right link bracket 951*a*. The restoring force FP may act in the +y axis direction.

If the second arm 912*a* has completely lied down with respect to the base 31, a distance HL from the base 31 to the top of the right pusher 930*a* may have a minimum value. The first part 931*a* of the right pusher 930*a* may protrude to the outside of the right link mount 920*a*. The second part 932*a* of the right pusher 930*a* may be fully accommodated in the accommodation space 923*a* of the right link mount 920*a*.

Referring to FIG. 61, if the second arm 912*a* changes from the state in which the second arm 912*a* has completely lied down with respect to the base 31 to the state in which the second arm 912*a* stands up, the angle theta S may be gradually increased. A compressive displacement of the right spring 940*a* may be gradually decreased, and the size of the restoring force FP may be gradually decreased.

As the angle theta S is gradually increased, at least a part of the second part 932*a* of the right pusher 930*a* may protrude to the outside of the right link mount 920*a*. A length in which the second part 932*a* of the right pusher 930*a* protrudes to the outside of the right link mount 920*a* may be denoted as a length HP. The distance HL from the base 31 to the top of the right pusher 930*a* may be increased by HP compared to a case where the second arm 912*a* has completely lied down with respect to the base 31.

Referring to FIG. 62, when the standing up of the second arm 912*a* with respect to the base 31 proceeds, the right pusher 930*a* and the right link bracket 951*a* may be separated from each other. A compressive displacement of the right spring 940*a* may become 0. When the compressive displacement of the right spring 940*a* becomes 0, the restoring force FP provided from the right pusher 930*a* to the right link bracket 951*a* may become 0.

Furthermore, the length HP in which the second part 932*a* of the right pusher 930*a* protrudes to the outside of the right link mount 920*a* may have a maximum value. Furthermore, the distance HL from the base 31 to the top of the right pusher 930*a* may have a maximum value.

That is, the right pusher 930*a* can assist the second arm 912*a* to stand up and reduce a load of the motor assembly 810 by applying a restoring force to the right link bracket 951*a* while the right pusher 930*a* and the right link bracket 951*a* come into contact with each other.

The lead screws 840*a* and 840*b* may be driven by the one motor assembly 810. Since the lead screws 840*a* and 840*b* are driven by the one motor assembly 810, the second arms 912*a* and 912*b* can stand up while forming symmetry. However, if the lead screws 840*a* and 840*b* are driven by the one motor assembly 810, a load applied to the motor assembly 810 in order to make the second arm 912a, 912b stand up may be excessively increased. In this case, the right pusher 930a can assist the second arm 912a to stand up and reduce a load of the motor assembly 810 by applying a restoring force to the right link bracket 951a.

Alternatively, if the second arm 912a changes the state in which the second arm 912a has stood up with respect to the base 31 to the state in which the second arm 912a completely lies down, a restoring force provided from the right pusher 930a to the right link bracket 951a can reduce an impact occurring when the link 910a lies down with respect to the base 31. That is, the restoring force provided from the right pusher 930a to the right link bracket 951a play a role as a damper when the link 910a lies down with respect to the base 31. Since the right pusher 930a plays a role as a damper, a load of the motor assembly 810 can be reduced.

A structure formed by the left pusher 930b, the left spring 940b, the left link bracket 951b, the left link mount 920b, and the left rod 870b may be symmetrical to the aforementioned structure formed by the right pusher 930a, the right spring 940a, the right link bracket 951a, the right link mount 910a, and the right rod 870a. In this case, the symmetry axis may be the symmetry axis of the motor assembly 810.

Figure 63:
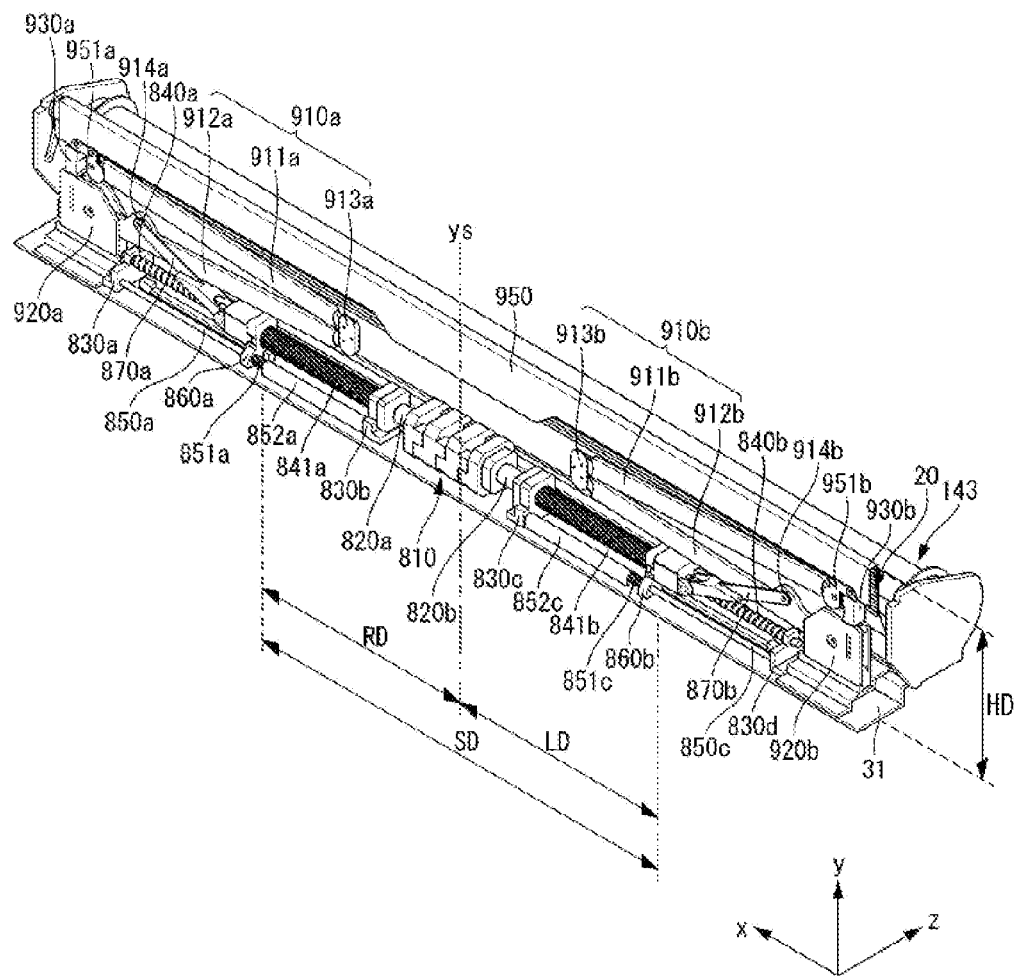
Figure 64:
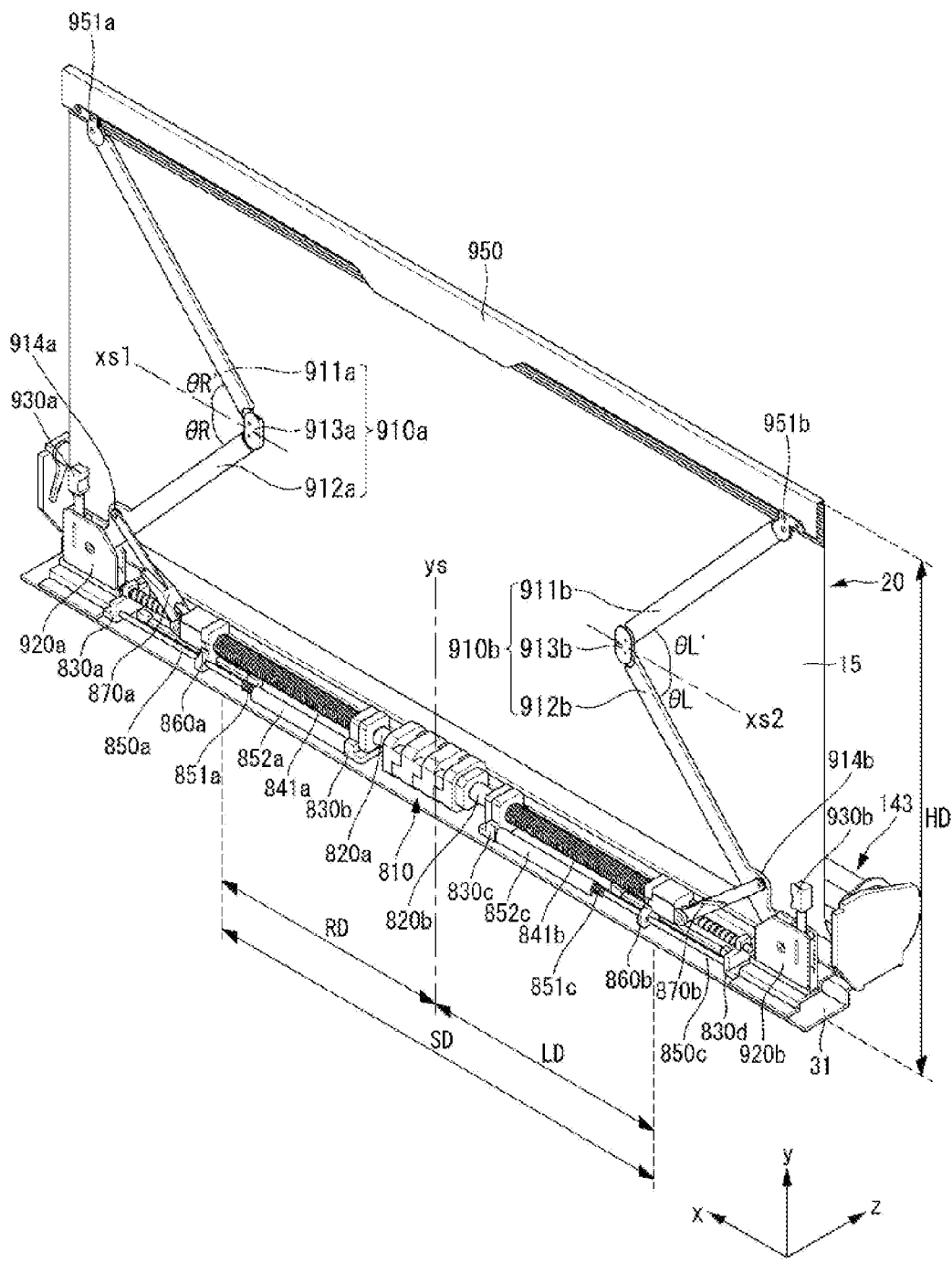
Figure 65:
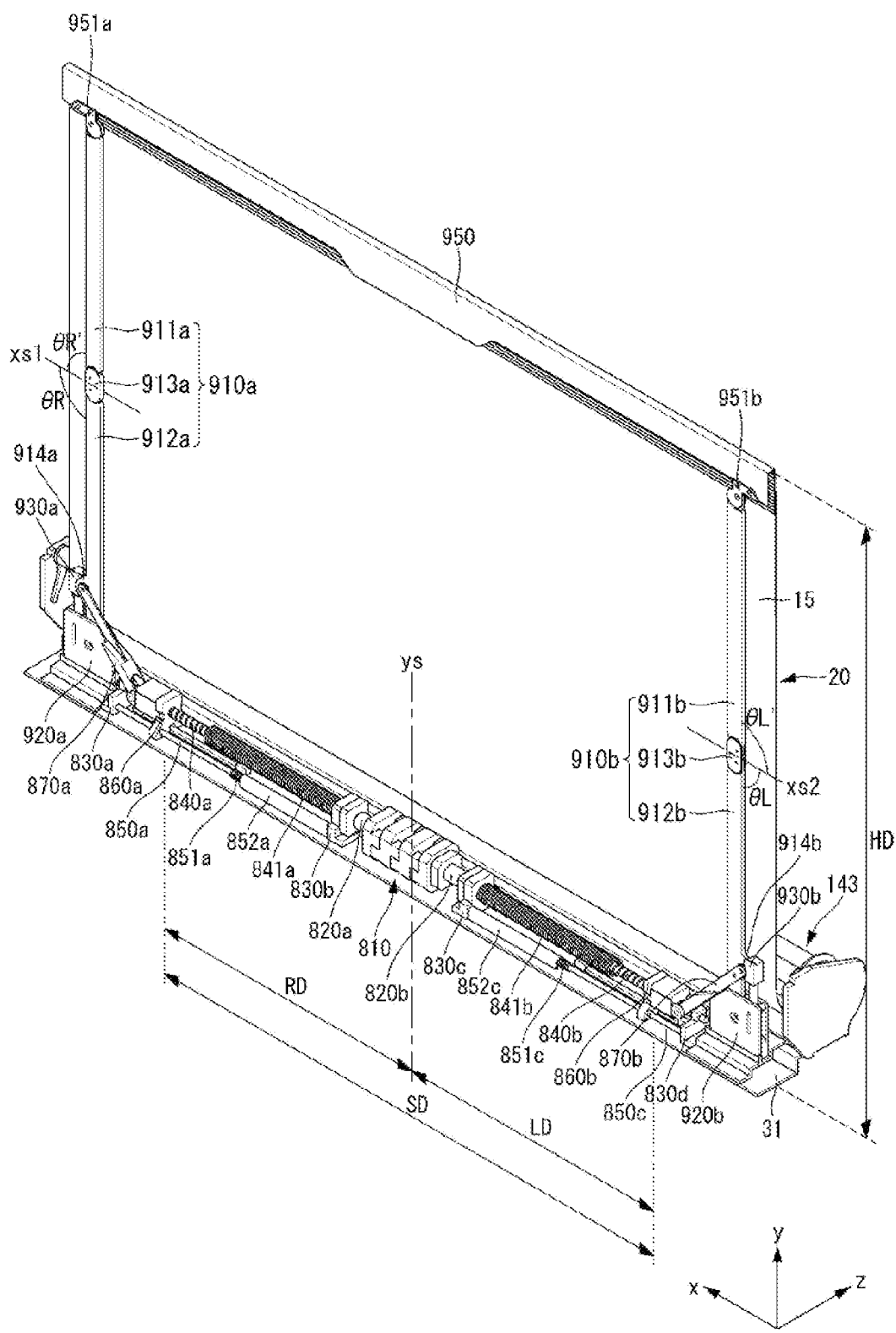

Referring to FIGS. 63 to 65, the panel roller 143 may be installed in the base 31. The panel roller 143 may be installed ahead of the lead screw 840a, 840b. Alternatively, the panel roller 143 may be disposed in parallel to the length direction of the lead screw 840a, 840b. Alternatively, the panel roller 143 may be spaced apart from the lead screw 840a, 840b.

The display unit 20 may include the display panel 10 and the module cover 15. The lower side of the display unit 20 may be connected to the panel roller 143, and the upper side of the display unit 20 may be connected to the upper bar 75. The display unit 20 may be wound on or unwound from the panel roller 143.

A distance from the symmetry axis ys of the motor assembly 810 to the right slider 860a may be called a distance RD. A distance from the symmetry axis ys of the motor assembly 810 to the left slider 860b may be called a distance LD. The distance between the right slider 860a and the left slider 860b may be called a distance SD. The distance SD may be the sum of the distance RD and the distance LD. A distance from the base 31 to the top of the display unit 20 may be called a distance HD.

Referring to FIG. 63, if the second arms 912a and 912b have completely lied down with respect to the base 31 the distance SD between the right slider 860a and the left slider 860b may have a minimum value. The distance RD from the symmetry axis ys of the motor assembly 810 to the right slider 860a and the distance LD from the symmetry axis ys of the motor assembly 810 to the left slider 860b may be equal to each other.

If the second arms 912a and 912b have completely lied down with respect to the base 31, the distance HD from the base 31 to the top of the display unit 20 may have a minimum value.

If the second arms 912a and 912b have completely lied down with respect to the base 31, the first springs 841a and 841b may come into contact with the sliders 860a and 860b. Furthermore, the second springs 851a and 851b may come into contact with the sliders 860a and 860b. Furthermore, the pushers 930a and 930b may come into contact with the link brackets 951a and 951b.

If the second arms 912a and 912b have completely lied down with respect to the base 31, the amount of compression of the first springs 841a and 841b may have a maximum value, and the size of a restoring force provided from the first springs 841a and 841b to the sliders 860a and 860b may have a maximum value.

If the second arms 912a and 912b have completely lied down with respect to the base 31, the amount of compression of the second springs 851a and 851b may have a maximum value, and the size of a restoring force provided from the second springs 851a and 851b to the sliders 860a and 860b may have a maximum value.

If the second arms 912a and 912b have completely lied down with respect to the base 31, the amount of compression of the springs 940a and 940b may have a maximum value, and the size of a restoring force provided from the springs 940a and 940b to the pusher 930a, 930b may have a maximum value.

If the second arms 912a and 912b start to stand up with respect to the base 31, the second arms 912a and 912b may stand up by restoring forces provided by the first springs 841a and 841b, the second springs 851a and 851b, and the springs 940a and 940b. Accordingly, a load applied to the motor assembly 810 can be reduced.

Referring to FIG. 64, as the standing up of the second arms 912a and 912b proceeds with respect to the base 31, the distance SD between the right slider 860a and the left slider 860b may be gradually increased. Although the distance SD is increased, the distance LD and the distance RD may be equal to each other. That is, the right slider 860a and the left slider 860b may be disposed while forming symmetry on the basis of the symmetry axis ys of the motor assembly 810. Furthermore, a degree that the second arms 912a and 912b of the right link 910a stand up with respect to the base 31 and a degree that the second arms 912a and 912b of the left link 910b stand up with respect to the base 31 may be equal to each other.

As the standing up of the second arms 912a and 912b proceeds with respect to the base 31, the distance HD from the base 31 to the top of the display unit 20 may be gradually increased. The display unit 20 may be unwound from the panel roller 143. Alternatively, the display unit 20 may be unfolded from the panel roller 143.

When the second arms 912a and 912b sufficiently stand up with respect to the base 31, the first springs 841a and 841b may be separated from the sliders 860a and 860b. Furthermore, when the second arms 912a and 912b sufficiently stand up with respect to the base 31, the second springs 851a and 851b may be separated from the sliders 860a and 860b. Furthermore, when the second arms 912a and 912b sufficiently stand up with respect to the base 31, the pushers 930a and 930b may be separated from the link brackets 951a and 951b.

The first springs 841a and 841b being separated from the sliders 860a and 860b, the second springs 851a and 851b being separated from the sliders 860a and 860b, and the pushers 930a and 930b being separated from the link brackets 951a and 951b may be independently performed. That is, the sequences in which the first springs 841a and 841b are separated from the sliders 860a and 860b, the second springs 851a and 851b are separated from the sliders 860a and 860b, and the pushers 930a and 930b are separated from the link brackets 951a and 951b may be mutually variable.

An angle formed by the second arm 912a and an axis xs1 parallel to the base 31 may be denoted as theta R. Furthermore, an angle formed by the first arm 911a and the axis xs1 parallel to the base 31 may be denoted as theta R'. The axis xs1 and the axis x may be parallel to each other.

When the second arm 912a completely lies down with respect to the base 31 or while the second arm 912a stands up with respect to the base 31 or when the standing up of the second arm 912a is completed with respect to the base 31, theta R and theta R' may be identically maintained.

An angle formed by the second arm 912b and an axis xs2 parallel to the base 31 may be denoted as theta L. Furthermore, an angle formed by the first arm 911b and the axis xs2 parallel to the base 31 may be denoted as theta L'. The axis xs2 and the axis x may be parallel to each other.

When the second arm 912b completely lies down with respect to the base 31 or while the second arm 912b stands up with respect to the base 31 or when the standing up of the second arm 912b is completed with respect to the base 31, theta L and theta L' may be identically maintained.

The axis xs1 and the axis xs2 may be the same axis.

Referring to FIG. 65, when the second arms 912a and 912b completely stand up with respect to the base 31, the distance SD between the right slider 860a and the left slider 860b may have a maximum value. Although the distance SD is a maximum, the distance LD and the distance RD may be equal to each other.

When the second arms 912a and 912b completely stand up with respect to the base 31, the distance HD from the base 31 to the top of the display unit 20 may have a maximum value.

Figure 66:
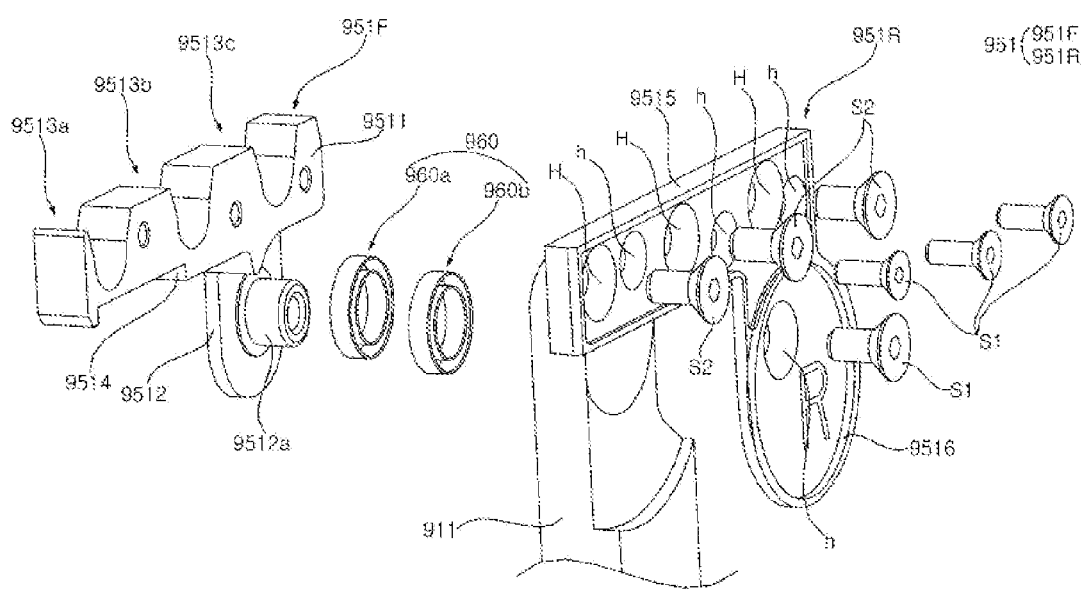

Referring to FIG. 66, the link bracket 951 may be pivotedly connected to the first arm 911. The link bracket 951 may include a supporter 951F and a coupling plate 951R.

The supporter 951F may include a horizontal body 9511, a joint 9512, 9512a, and cups 9513a, 9513b, and 9513c. The horizontal body 9511 may be a bar shape that elongates left and right. The joint 9512, 9512a may be formed under the horizontal body 9511. The joint 9512, 9512a may include a fixing plate 9512 and a pivot shaft 9512a.

A bearing 960 may be fastened to a pivot shaft 9512a. The bearing 960 may be plural in number. The plurality of bearings 960 may include a first bearing 960a and a second bearing 960b. The second bearing 960b may be stacked on the first bearing 960a. The first bearing 960a and the second bearing 960b may be inserted into the pivot shaft 9512a. A lubricant may be coated on the bearings 960. The leakage of the lubricant can be prevented because a task for assembling the bearings 960 and a task for coating the lubricant are performed simultaneously with the coupling of the first arm 911 and the link bracket 951, but can be performed independently of the fastening of other structures.

The fixing plate 9512 may be disposed under the horizontal body 9511 in a way to be eccentric to a left direction or a right direction. The fixing plate 9512 may have a shape of the plate 9512 that elongates downward from the horizontal body 9511. The pivot shaft 9512a may be formed to protrude from one surface of the fixing plate 9512.

The cups 9513a, 9513b, and 9513c may be formed as the top of the horizontal body 9511 is recessed. The cups 9513a, 9513b, and 9513c may be formed as front and rear surfaces of the horizontal body 9511 are opened simultaneously with the recessing of the top of the horizontal body 9511. For example, each of the cups 9513a, 9513b, and 9513c may generally have a U shape. The cups 9513a, 9513b, 9513c may be sequentially disposed in the length direction of the horizontal body 9511. Accordingly, a concentration of stress can be reduced, and fatigue fracture of the link bracket 951 can be improved.

The coupling plate 951R may include a supporter cover 9515 and a joint cover 9516. The supporter cover 9515 may be a plate formed in a length corresponding to the supporter 951F. The joint cover 9516 may be a circular plate that is eccentric to the right or the right under the supporter cover 9515 and that is connected to the supporter cover 9515. The coupling plate 951R may have a plurality of holes H and h.

The plurality of holes H and h may include first coupling holes h and second coupling holes H. The first coupling holes h may be for mutually coupling the supporter 951F, the coupling plate 951R, and the first arm 911.

Figure 67:
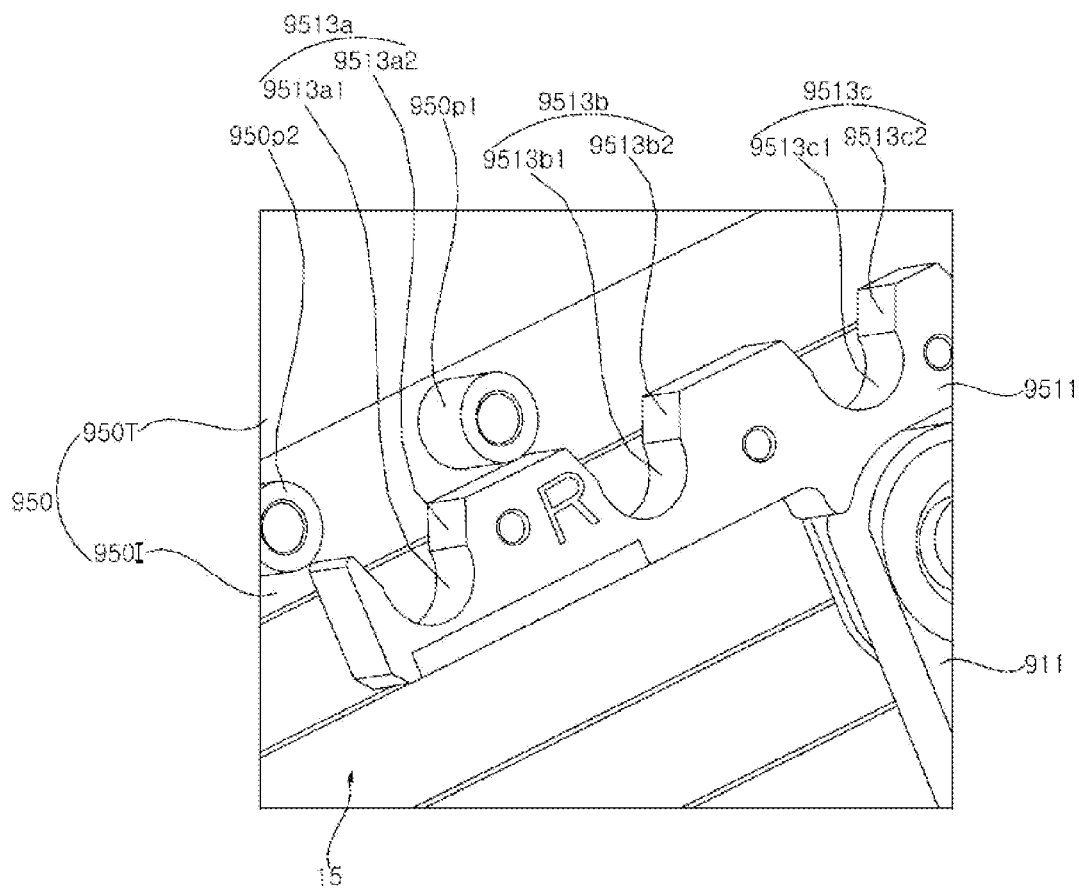

Referring to FIG. 67, the second coupling holes H may be for the coupling of the top case 950 and the link bracket 951. In this case, the cup 9513a may include a support part 9513a1 and a guide part 9513a2. The support part 9513a1 may form the lower side of the cup 9513a, and the guide part 9513a2 may form the upper side of the cup 9513a. For example, the support part 9513a1 may form a semicircle or a fan shape, and the guide part 9513a2 may be a shape that extends from the support part 9513a1 and has an inverted trapezoid and left and right sides.

The top case 950 may include an inner bar 9501 and a top cover 950T. The inner bar 9501 may be disposed on the upper side or top of the module cover 15, and may be coupled with the module cover 15. A coupling protrusion 950P1, 950P2 may be mounted on an external surface of the inner bar 9501. The coupling protrusion 950P1, 950P2 may be plural in number. The number of plurality of coupling protrusions 950P1 and 950P2 may correspond to the number of cups 9513a, 9513b, and 9513c of the supporter 951F. For example, the coupling protrusion 950P1, 950P2 may be a pem nut. The radius of the coupling protrusion 950P1, 950P2 may correspond to the radius of the support part 9513a1, 9513b1, 9513c1 of the cup 9513a, 9513b, 9513c.

Figure 68:
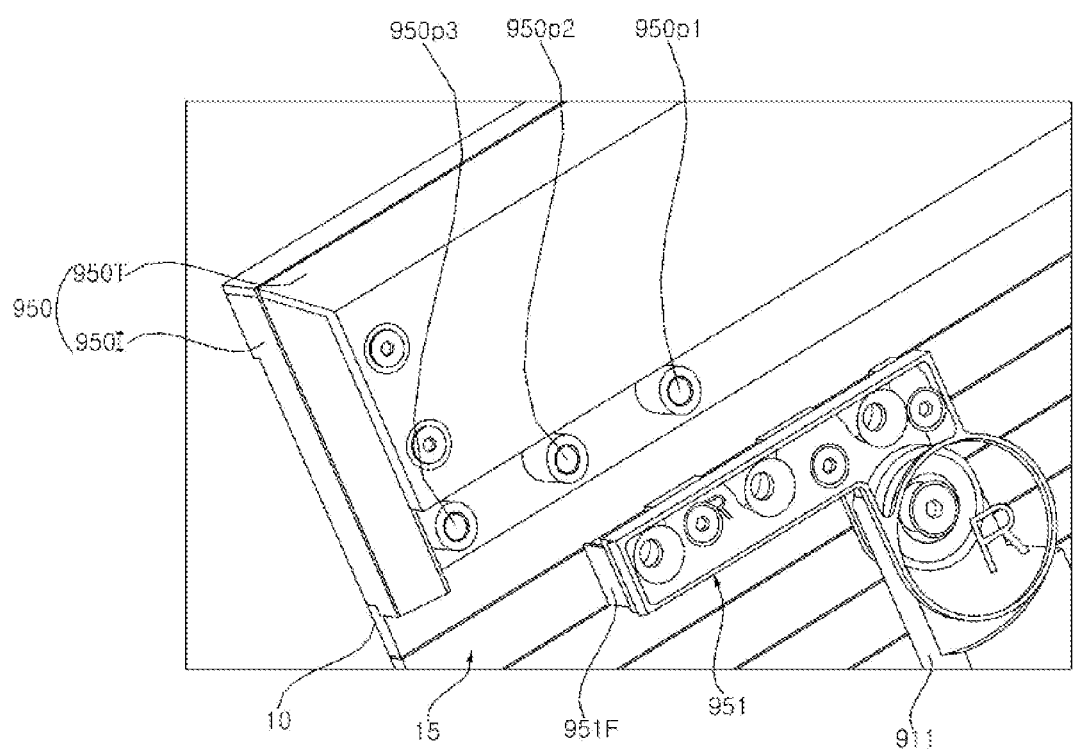
Figure 69:
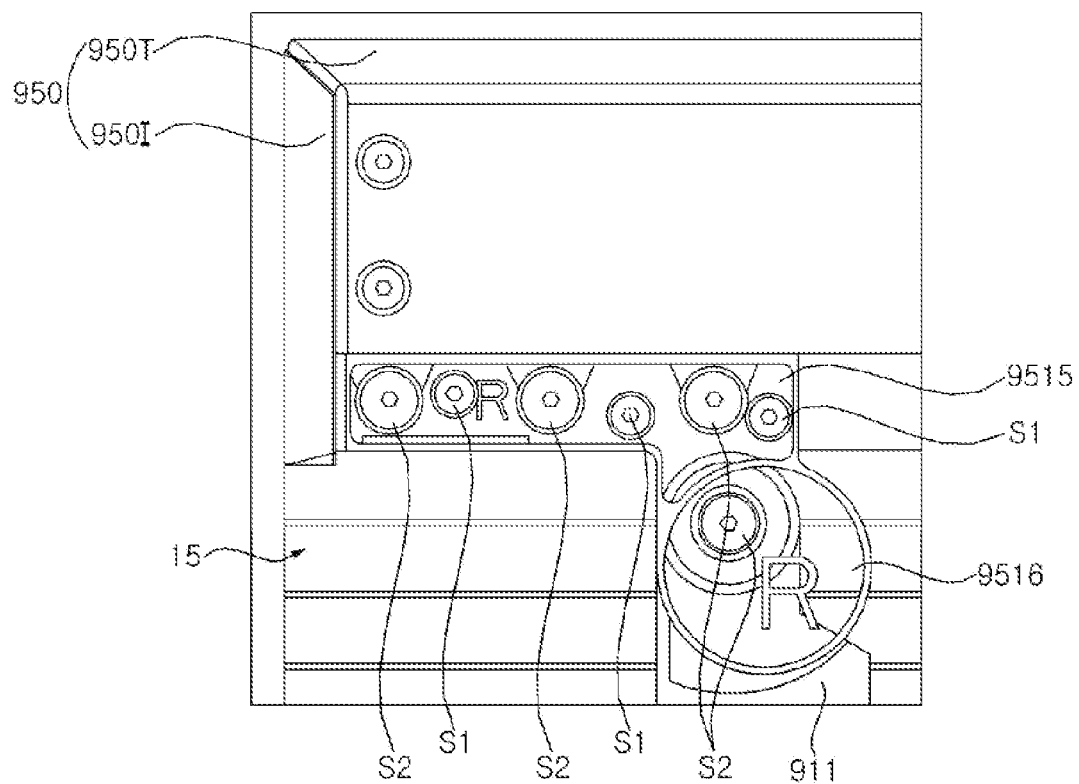

Referring to FIGS. 68 and 69, the link bracket 951 may be assembled with the top case 950 in the state in which the link bracket 951 has been coupled with the first arm 911. In this case, the link bracket 951 may move to the top case 950 in response to a movement of the link 910 (refer to FIGS. 34, 910a and 910b (refer to FIG. 54)) up and down (e.g., the y axis direction). As the supporter 951F of the link bracket 951 becomes close to the top case 950, the coupling protrusions 950P1, 950P2, and 950P3 may be inserted into the cups 9513a, 9513b, and 9513c (refer to FIG. 66) of the supporter 951F. The coupling protrusions 950P1, 950P2, and 950P3 may be inserted into the cups 9513a, 9513b, and 9513c of the supporter 951F, and the link bracket 951 and the top case 950 may be fastened to each other by a screw S2 (refer to FIG. 66).

Accordingly, the link bracket 951 can be naturally coupled with the top case 950 within a movable range of the link 910, 910a, 910b without being hard on the joints of the link 910, 910a, 910b.

Figure 70:
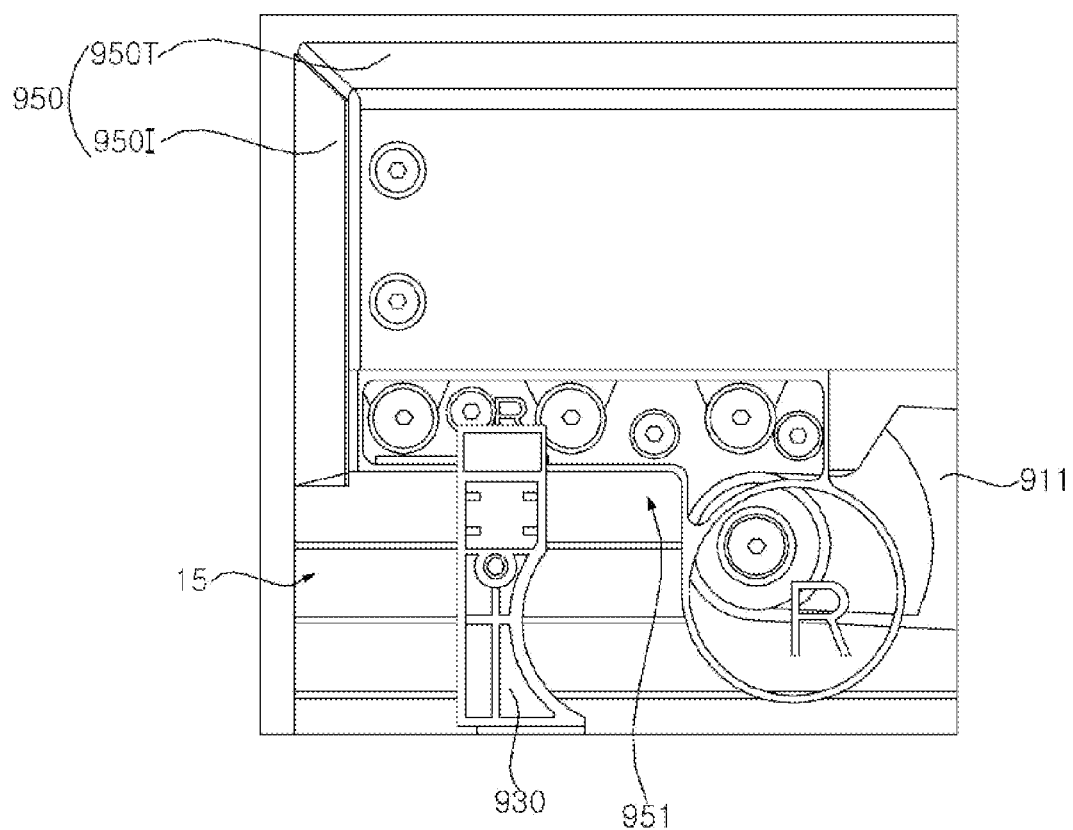

Referring to FIGS. 66 and 70, a support recess 9514 may be formed as the bottom of the horizontal body 9511 of the supporter 951F is recessed. The support recess 9514 may be eccentric and disposed at the bottom of the horizontal body 9511 on the left or right thereof. For example, if the fixing plate 9512 is disposed at the bottom of the horizontal body 9511 on the right thereof, the support recess 9514 may be disposed at the bottom of the horizontal body 9511 on the left thereof.

When the module cover 15 rolls and a state of the link 910, 910a, 910b becomes the state in which the link has completely lied down with respect to the base 31, the support recess 9514 of the supporter 951F may be placed on the pusher 930. As described above, the pusher 930 may provide the link bracket 951 with a force in the direction in which the link 910, 910a, 910b stands up in a process of the link standing up, and the pusher 930 may provide the link bracket 951 with buffer power in a process of the link 910, 910a, 910b being folded.

Certain embodiments or other embodiments of the invention described above are not mutually exclusive or distinct from each other. Any or all elements of the embodiments of the invention described above may be coupled or coupled with each other in configuration or function.

For example, a configuration "A" described in one embodiment of the invention and the drawings and a configuration "B" described in another embodiment of the invention and the drawings may be coupled with each other. Namely, although the coupling between the configurations is not directly described, the coupling is possible except in the case where it is described that the coupling is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject coupling arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a housing that is elongated;
a roller disposed within the housing;
a display panel configured to be wound on or unwound from the roller;
a module cover comprising a plurality of segments extending along a length direction of the housing and consecutively arranged in an up and down direction of the display panel from a rear of the display panel;
a top case disposed at a top of the display panel and coupled with the module cover;
a foldable link disposed behind the module cover and having a first side pivotably connected to the housing;
a coupling protrusion protruding from the top case to a rear of the module cover; and
a link bracket pivotably connected to a second side of the foldable link and configured to support the coupling protrusion,
wherein the housing comprises a first base frame and a second base frame coupled with a lower frame of the housing, and
wherein the lower frame is coupled with and fixed to at least one base frame of the first base frame or the second base frame by at least one fixing pin.

2. The display device of claim 1, wherein the lower frame is coupled with and fixed perpendicularly to the at least one base frame by the at least one fixing pin being fastened to assembly fixing portions of the at least one base frame.

3. The display device of claim 2, wherein:
the first base frame is disposed to extend along a direction perpendicular to a width direction of front and rear surfaces of the lower frame and is coupled with and fixed to the lower frame along a length direction of the lower frame; and
the second base frame is disposed to extend along the direction perpendicular to the width direction of the front and rear surfaces of the lower frame, is coupled with and fixed to the lower frame along the length direction of the lower frame, and is disposed parallel to the first base frame to face the first base frame.

4. The display device of claim 2, wherein the lower frame comprises:
at least one protrusion fixing portion that protrudes along a direction along which the first and second base frames are disposed so that the at least one protrusion fixing portion is coupled with and fixed to the at least one base frame; and
a first fixing recess portion located at the at least one protrusion fixing portion so that an end of a first side of each of the at least one fixing pin is inserted into the at least one protrusion fixing portion and the first fixing recess portion is fixed by the fixing pin.

5. The display device of claim 4, wherein the at least one base frame has at least one fixing hole into which an end of a second side of each of at least one fixing pin is inserted so that the end of the second side of the fixing pin is fixed to a corresponding assembly fixing portion of the assembly fixing portions.

6. The display device of claim 5, wherein:
a diameter of the at least one fixing hole is smaller than a diameter of the first fixing recess portion; and
an inside diameter of the end of the second side of each of the at least one fixing pin that is inserted into the at least one fixing hole is smaller than an inside diameter of the end of the first side of the fixing pin that is inserted into the first fixing recess portion.

7. The display device of claim 4, wherein:
the at least one base frame comprises at least one protrusion assembly portion that protrudes along an inward direction thereof from an outermost portion that comes into contact with the lower frame; and
the lower frame further comprises a second fixing recess located at the at least one protrusion fixing portion so that the at least one protrusion assembly portion protruding from the at least one base frame is inserted and fastened to the second fixing recess portion.

8. The display device of claim 4, wherein at least one assembly fixing portion that enables the at least one base frame and the lower frame to be fastened by the at least one fixing pin is located at at least one location of a center location of the at least one base frame, outside locations at a first end and a second end of the at least one base frame with respect to a length direction thereof, or ⅓ locations between the center location and the outside locations at the first and the second ends of the at least one base frame.

9. The display device of claim 1, wherein the link bracket comprises:
a supporter configured to pivotably couple with the second side of the foldable link and to support the coupling protrusion; and
a coupling plate coupled with the second side of the foldable link and the supporter.

10. The display device of claim 9, wherein the supporter comprises:
a horizontal body extending left and right;
a joint located under the horizontal body; and
a cup recessed from a top of the horizontal body and having the coupling protrusion inserted therein,
wherein the coupling plate is coupled with the horizontal body and the joint by a first screw.

11. The display device of claim 10, wherein the joint comprises:
a fixing plate extending from a bottom of the horizontal body;

a pivot shaft located on the fixing plate and inserted into a second side of the foldable link; and a bearing around the pivot shaft and disposed between the pivot shaft and the foldable link.

12. The display device of claim 11, wherein:

the coupling protrusion is plural in number;

the cup is plural in number;

the plurality of cups respectively correspond to the plurality of coupling protrusions, and the cups are consecutively disposed along a length direction of the horizontal body from the top of the horizontal body; and the plurality of coupling protrusions are inserted into the plurality of cups, respectively, the plurality of cups are configured to support the plurality of coupling protrusions, and the coupling plate and the plurality of coupling protrusions are coupled by second screws.

13. The display device of claim 10, wherein:

the coupling protrusion has a cylindrical shape; and the cup comprises:

a support portion having a diameter corresponding to a diameter of the coupling protrusion; and a guide portion located at a top of the support portion and having a width greater than the diameter of the support portion.

14. The display device of claim 10, wherein the joint is eccentric and disposed at a left or a right of the horizontal body.

15. The display device of claim 14, wherein the link bracket has a support recess adjacent to the joint and recessed from a bottom of the horizontal body to an upper side of the horizontal body, and further comprises a pusher installed in the housing and configured to support the support recess when the foldable link is folded.

16. The display device of claim 15, further comprising a resilient member configured to provide an elastic force from the housing to the pusher.

* * * * *